(12) United States Patent
Kim et al.

(10) Patent No.: US 11,902,135 B2
(45) Date of Patent: *Feb. 13, 2024

(54) METHOD, APPARATUS AND SYSTEM FOR DIAGNOSING NETWORK PERFORMANCE

(71) Applicant: MAGDATA INC., Seoul (KR)

(72) Inventors: Jong Min Kim, Seoul (KR); Ho Jeong Hwang, Seongnam-si (KR); Yun Young Hur, Yongin-si (KR)

(73) Assignee: MAGDATA INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,955

(22) Filed: Apr. 25, 2022

(65) Prior Publication Data
US 2022/0255827 A1 Aug. 11, 2022

Related U.S. Application Data

(63) Continuation of application No. 16/962,974, filed as application No. PCT/KR2018/016901 on Dec. 28, 2018, now Pat. No. 11,362,922.

(30) Foreign Application Priority Data

| Jan. 18, 2018 | (KR) | 10-2018-0006767 |
| Jan. 18, 2018 | (KR) | 10-2018-0006768 |
| Jan. 18, 2018 | (KR) | 10-2018-0006769 |

(51) Int. Cl.
| *H04L 43/0876* | (2022.01) |
| *H04L 43/045* | (2022.01) |
| *H04L 47/283* | (2022.01) |

(52) U.S. Cl.
CPC ........ *H04L 43/0876* (2013.01); *H04L 43/045* (2013.01); *H04L 47/283* (2013.01)

(58) Field of Classification Search
CPC . H04L 43/0876; H04L 43/045; H04L 47/283; H04L 43/18; H04L 43/0864; H04L 43/16
See application file for complete search history.

(56) References Cited

U.S. PATENT DOCUMENTS

| 9,584,390 B1 | 2/2017 | Jeong |
| 2002/0108059 A1* | 8/2002 | Canion ............... H04L 63/1458 709/224 |

(Continued)

FOREIGN PATENT DOCUMENTS

| JP | 2007-158512 A | 6/2007 |
| KR | 20060055189 A | 5/2006 |

(Continued)

*Primary Examiner* — El Hadji M Sall
(74) *Attorney, Agent, or Firm* — INVENSTONE PATENT, LLC

(57) ABSTRACT

An aspect of the present disclosure discloses a method for diagnosing a network performance in an apparatus for diagnosing network performance connected to a switching device provided between a first entity and a second entity. The method may include: obtaining at least one mirrored packet for at least one packet transmitted between the first entity and the second entity based on mirroring from the switching device, calculating performance related indicator representing performance of a network service associated with the first entity and the second entity based on at least a part of information included in the at least one mirrored packet, and storing the calculated performance related indicators.

20 Claims, 51 Drawing Sheets

(56) References Cited

U.S. PATENT DOCUMENTS

| | | | |
|---|---|---|---|
| 2003/0097481 A1* | 5/2003 | Richter | H04L 43/00 709/251 |
| 2003/0236745 A1* | 12/2003 | Hartsell | G06Q 20/102 705/40 |
| 2005/0188423 A1 | 8/2005 | Motsinger et al. | |
| 2011/0205912 A1 | 8/2011 | Leong et al. | |
| 2014/0177428 A1 | 6/2014 | Sinha et al. | |
| 2016/0217022 A1* | 7/2016 | Velipasaoglu | G06F 11/0709 |
| 2017/0142216 A1 | 5/2017 | Hinde | |

FOREIGN PATENT DOCUMENTS

| | | |
|---|---|---|
| KR | 20100036690 A | 4/2010 |
| KR | 20120010535 A | 2/2012 |
| KR | 101230500 B1 | 2/2013 |
| KR | 20140035664 A | 3/2014 |
| KR | 20150010931 A | 1/2015 |
| KR | 101641637 B1 | 7/2016 |

* cited by examiner

FIG. 12

| Alert Name | Rule Set | Alert Level | Duration | Server IP | SMS | E-Mail |
|---|---|---|---|---|---|---|
| Web traffic latency occurs | Wait > 70%<br>Latency > 5sec | Normal | 10sec | All web servers | Y | Y |
| WAS traffic server latency 5 sec or more | Latency > 5sec | High | 5sec | 1 case except 192.169.10.20 | Y | Y |
| WAS traffic Wait excess occurs | Wait > 70% | High | 5sec | 1 case except 192.169.10.20 | | Y |
| DB traffic latency occurs | Wait > 70%<br>Latency > 5sec | Normal | 10sec | All DB servers | | Y |
| BPS excess occurs | BPS > 50M | Normal | 5sec | All servers | | Y |
| 50X Error occurs | Http 50x Error > 5 | High | 5sec | All web servers | Y | Y |
| CPS excess occurs | CPS > 150 | Low | 10sec | All servers | | Y |
| Wait excess occurs | Session > 1000<br>Wait > 80% | High | 10sec | All servers | Y | Y |
| Web WAS section latency occurs | Latency > 5sec | Normal | 5sec | All Web-WAS servers | | Y |

Morning time zone load balancing

Afternoon time zone load balancing

✓ 40X error occurred application

FIG. 34A

FIG. 38

METHOD, APPARATUS AND SYSTEM FOR DIAGNOSING NETWORK PERFORMANCE

CROSS-REFERENCE TO RELATED APPLICATIONS

This application is a continuation application of U.S. patent application Ser. No. 16/962,974, filed on Jul. 17, 2020, which is the National Stage filing under 35 U.S.C. 371 of International Application No. PCT/KR2018/016901, filed on Dec. 28, 2018, which claims the benefit of earlier filing date and right of priority to Korean Application(s) No(s). 10-2018-0006767 filed on Jan. 18, 2018, KR No. 10-2018-0006768 filed on Jan. 18, 2018, and KR No. 10-2018-0006769 filed on Jan. 18, 2018, the contents of which are all hereby incorporated by reference herein in their entirety.

BACKGROUND OF THE DISCLOSURE

Field of the Disclosure

The present disclosure relates to a method for diagnosing a performance of a network service and, more particularly, to a method for diagnosing a performance of a network service for detecting a quality problem of a service in a network including a client terminal and a server.

In addition, the present disclosure relates to a method for visualizing a performance indicator, and more particularly, to a method for displaying a quality indicator of a service in a network including a client terminal and a server.

Furthermore, the present disclosure relates to a method for registering a device associated with a network service, and more particularly, to a method for registering a new device in a list associated with a network.

Related Art

Generally, a network includes various devices having a communication link and a communication capability that accesses to a communication link. Here, the devices related to a network includes various electronic products having a communication interface with a computer, a peripheral device, a router, a storage device and a processor. Here, typically, the term 'device' may include logical devices or other devices having a capability of processing and exchanging functionality and data. Further the 'device' may include general purpose computers as well as devices for family use.

The conventional network system includes a client device used by a user and various server devices associated with a web site. Generally, in order to use a web site, a client device requests an access to a server having a specific IP address and accesses to the server after a waiting time. At this time, in the case that multiple client devices access to a server by multiple users crowded at a certain time, a performance of the network service associated with the server may be degraded owing to bottleneck phenomenon. When a problem of service performance or quality occurs, owing to latency, a waiting time increases for a user, and a service availability may be decreased, which leads to decrease of productivity and sales. In addition, IT operation cost increases, and an operator of server and/or a manager of a related business has an unexpected result such as decline of competitiveness of business.

Accordingly, a cause of performance degradation should be rapidly identified, and the response should be done as soon as possible. However, a proper response has not been performed since there is no proper service for clearly identifying the cause of performance degradation.

FIG. 1 is a conceptual diagram for describing a process of performing a conventional network service management.

Referring to FIG. 1, for IT management, an IT team leader sends a command related to a quality management to a network management part, a server management part, a database development part, an application development part, and the like.

When a specific service problem occurs, the persons in charge of each of the parts determine problems of their own managed IT devices individually and report it. That is, owing to the individual access to the problems of the specific service such as "it is not an application problem", "it is not network problem" and/or "no problem in a server", the cause of problem cannot be rapidly identified, and it is unable to cope with the problem of performance degradation properly. That is, there is a problem of missing the golden time.

SUMMARY OF THE DISCLOSURE

In order to solve the problem described above, the present disclosure provides a method for diagnosing a network performance in an apparatus for diagnosing network performance for managing a business/user-centric network service.

The present disclosure also provides a method for visualizing a network performance indicator in an apparatus for visualizing a network performance indicator for managing a business/user-centric network service.

The present disclosure also provides a method and apparatus for registering a new device associated with a network in which a new device associated with a network may be automatically registered for a network service management.

In an aspect, a method for diagnosing a network performance in an apparatus for diagnosing network performance connected to a switching device provided between a first entity and a second entity may include: obtaining at least one mirrored packet for at least one packet transmitted and received between the first entity and the second entity based on mirroring from the switching device, calculating performance related indicators representing performance of a network service associated with the first entity and the second entity based on at least a part of information included in the at least one mirrored packet, and storing the calculated performance related indicators.

The information element included in the at least one mirrored packet may include a source IP, a destination IP and time information.

The first entity may include a client, and the second entity may include a server.

The step of calculating performance related indicators representing performance of a network service based on at least a part of information included in the at least one mirrored packet may include: extracting information on a first time T1 when a first packet arrives at the apparatus for diagnosing network performance from the client, from a mirrored packet for the first packet transmitted from the client to the server, extracting information on a second time T2 when a first response packet arrives at the apparatus for diagnosing network performance from the server, from a mirrored packet of the first response packet from the server for the first packet, and calculating a server round trip time (sRTT) based on the information on the first time T1 and the information on the second time T2.

The step of calculating performance related indicators representing performance of a network service based on at least a part of information included in the at least one mirrored packet may include: extracting information on a third time T3 when a second response packet arrives at the apparatus for diagnosing network performance from the client, from a mirrored packet of the second response packet from the client; and calculating a client round trip time (cRTT) based on the information on the second time T2 and the information on the third time T3.

The method may further include at least one of: a request transmission time (request time) representing a time consumed until a request is received in the server, when the client requests a response data to the server, a response waiting time (latency) representing a response latency time until the server receives a first data associated with the response data from a Uniform Resource Locator (URL) associated with the request, a response data transmission time (Response time) representing a time consumed for the server to transmit the response data to the client, and a total used time representing a time consumed after the client transmits a request for the response data to the server to a time until receiving all data associated with the response data, by using at least one of the information on first time T1, the information on the second time T2, the information on the third time T3, information on a fourth time T4 when a last data of the response data that the client requests to the server is arrived at the apparatus for diagnosing network performance from the server, the server round trip time (sRTT) and the client round trip time (cRTT).

The step of calculating performance related indicators representing performance of a network service may include calculating a page loading time for a predetermined web page based on a client time consumed by the client, a network time consumed by the network and a server time consumed by the server.

The network time may include the sRTT, the cRTT, the request transmission time (request time) and the response data transmission time (Response time), and wherein the server time may include the response waiting time (latency).

The performance related indicators may include response waiting session number (wait) information representing a session number in a state of fail to receive a response for the request sent by the client.

The performance related indicators may include at least one of: User Per Second (UPS) information representing a number of clients connected per second; Connection Per Second (CPS) information representing a number of new sessions connected per second and Transaction Per Second (TPS) information representing a number of transactions occurred per second.

The method may further include determining whether a problem of the network service occurs based on at least a part of the performance related indicators.

The step of determining whether a problem of the network service occurs based on at least a part of the performance related indicators may include: comparing at least one of response waiting time (latency) information that represents a response latency time until the server receives a first data associated with the response data from a Uniform Resource Locator (URL) associated with a request for the response data of the client for the server and response waiting session number (wait) information that represents a session number of a state of fail to receive a response for the request sent by the client with at least one of a threshold value associated with the response waiting time and a threshold value associated with the response waiting session number, and when at least one of the response waiting time (latency) information and the response waiting session number (wait) information is greater than at least one of the threshold value associated with the response waiting time and the threshold value associated with the response waiting session number, determining a problem of traffic latency or traffic excess to occur.

The step of determining whether a problem of the network service occurs based on at least a part of the performance related indicators may include: comparing at least one of Bit Per Second (BPS) information representing a transmission bit size of a data per second and Connection Per Second (CPS) information representing a number of new sessions connected per second with at least one of a threshold value associated with the BPS and a threshold value associated with the CPS, and when at least one of the CPS information and the BPS information is greater than at least one of the threshold value associated with the CPS information and the threshold value associated with the BPS information, determining a problem of BPS excess or CPS excess to occur.

The step of determining whether a problem of the network service occurs based on at least a part of the performance related indicators may include: comparing at least one of amount of occurrence of 40× error per predetermined time and amount of occurrence of 50× error per predetermined time with at least one of a threshold value associated with the 40× error and a threshold value associated with the 50× error, and when at least one of the amount of occurrence of 40× error per predetermined time and the amount of occurrence of 50× error per predetermined time is greater than at least one of the threshold value associated with the 40× error and the threshold value associated with the 50× error, determining 40× or 50× error to occur.

The method may further include notifying by using at least one of a text message, an email and/or Social Network Service (SNS) to a preregistered user of a first account for managing the network, when a problem occurrence of the network service is detected based on at least one of the performance related indicators.

The first entity may be a first server, and the second entity may be a second server.

At least one of the first server and the second server may include at least one of a web server, a Web Application Server (WAS) server and a database (DB) server.

When a packet mirrored for a packet associated with the first entity, the second entity and a third entity which are connected in serial is obtained, the performance related indicators for each section including a section between the first entity and the second entity and a section between the second entity and the third entity may be calculated independently.

The method for diagnosing a network performance may further include generating a flow map by objectifying the first entity, the second entity and the third entity on a visualization space based on the performance related indicators for each section.

The performance related indicators may be calculated and stored in real time by monitoring a packet which is transmitted and received between the first entity and the second entity in real time.

In another aspect, an apparatus for diagnosing network performance connected to a switching device provided between a first entity and a second entity may include a port for obtaining at least one mirrored packet for at least one packet transmitted and received between the first entity and the second entity based on mirroring from the switching device, a packet analysis module for calculating performance related indicators representing performance of a network service associated with the first entity and the second entity based on at least a part of information included in the at least one mirrored packet, and a storage for storing the calculated performance related indicators.

In still another aspect, a system for diagnosing network performance performing a network performance diagnosis may include a switching device provided between a first entity and a second entity, and an apparatus for diagnosing network performance for obtaining at least one mirrored packet for at least one packet transmitted and received between the first entity and the second entity based on mirroring from the switching device, calculating performance related indicators representing performance of a network service associated with the first entity and the second entity based on at least a part of information included in the at least one mirrored packet, and storing the calculated performance related indicators.

In still another aspect, a method for visualizing network performance indicators in an apparatus for visualizing network performance indicators may include calculating performance related indicators representing performance of a network service associated with a first entity and a second entity based on at least a part of information included in the at least one packet transmitted and received between the first entity and the second entity associated with the network, and visualizing the calculated performance related indicators.

The step of visualizing the calculated performance related indicators may include generating a flow map that represents a traffic flow of a network by generating the calculated performance related indicators as an object and implementing the generated object in a visualization space.

The flow map may be generated by objectifying the performance related indicators associated with the first entity, the performance related indicators associated with the second entity, and the performance related indicators associated with a link connecting the first entity and the second entity.

The objectified performance related indicators may include at least one of data transmission speed information associated with the first entity and the second entity, response waiting session number information (wait) and response waiting speed information (latency).

The objectified performance related indicators may be compared with a predetermined at least one threshold value and have a state corresponding to the comparison result, and the object may be implemented with a visualized expression corresponding to the state.

When the objectified performance related indicators exceeds a first threshold value, it has a first state, and in the first state, at least one of a color, a thickness and a shape may be differently expressed from the object of a normal state having the first threshold value or smaller.

When a request for detailed items is received by a user interface, the associated performance related indicators may be displayed based on the object selected by the user interface.

The object and the visualized space may be integrally implemented with having position information and time information, respectively.

When the information related to a packet associated with the first entity, the second entity and a third entity which are connected in serial is obtained, the step of generating the flow map may generate the objectified flow map based on the performance related indicators for each section including a section between the first entity and the second entity and a section between the second entity and the third entity.

When the flow map is generated, as configuration information on visualizing the performance related indicators, the flow map may be generated by using location template information on specifying spatial or hierarchical arrangement of the flow map, tile information (service) for generating background, project configuration information on generating dynamic contents, a rule script that defines an attribute to be marked on the flow map, a period of obtaining the performance related indicators and a run scheduler that determines an execution order of the flow map generation operation.

At least one of the first entity and the second entity may include at least one of a client, a web server, a Web Application Server (WAS) server and a database (DB) server.

The step of visualizing the calculated performance related indicators may include visualizing at least one of a server list generated based on the performance related indicators for each server included in the network, a session list generated based on the performance related indicators for each session included in the network, a user list generated based on the performance related indicators for each user included in the network and a URL list generated based on the performance related indicators for each URL included in the network.

The performance related indicators in the server list, the session list, the user list and the URL list are associated with each other with a parameter, and switch between lists may be performed based on the parameter according to a request of a user input.

In identifying detailed information of a lower layer with the parameter according to the switch between lists, log data associated with a transaction among a plurality of entities in the network may be visualized.

The performance related indicators have time information, based on the time information, at list one of the server list, the session list, the user list and the URL list may be implemented with being associated with the time information.

The step of visualizing the calculated performance related indicators may include visualizing a web page loading time analysis page that displays a loading time until at least one web page is loaded included in the network from the client in the network for each web page.

The loading time of the web page may visualize a client time consumed by a client, a network time consumed by a network and a server time consumed by a server in different visualized expressions.

The server round trip time (sRTT), the client round trip time (cRTT), the request transmission time (request time), the response data transmission time (response time) included in the network time and the response waiting time (latency) included in the server time may be visualized in different visual expression, respectively.

The web page loading time is compared with a preconfigured threshold value, and a latency web page having a web page loading time exceeding the threshold value may be visualized with different visual expression from the visual expression of the web page in a normal state.

In response to the detailed analysis request for the latency web page, a component analysis page including a time bar of each component associated with the web page, a response waiting time and response waiting session number information may be displayed.

The information included in at least one packet transmitted and received between the first entity and the second entity may be information obtained by performing mirroring from a switching device included between the first entity and the second entity.

In another aspect, an apparatus for visualizing network performance indicators may include a packet analysis module for calculating performance related indicators representing performance of a network service associated with a first entity and a second entity based on at least a part of information included in the at least one packet transmitted and received between the first entity and the second entity associated with a network and a service module for visualizing the calculated performance related indicators.

The service module may include a map generator for generating the calculated performance related indicators as an object and generating a flow map representing a traffic flow of the network by implementing the generated object in a visualized space and a user interface for visualizing the flow map.

In another aspect, a method for registering a new device associated with a network in an apparatus for registering a new device may include securing network entity information including Internet Protocol (IP) information on at least one entity associated with the network, obtaining information on at least one packet transmitted and received between a first entity and a second entity, comparing the obtained information on at least one packet with the IP information in the secured network entity information and registering a new device in the network entity information based on the comparison result.

The step of registering a new device in the network entity information based on the comparison result may include registering a device associated with the first IP information as a new device in the network entity information based on the first IP information when the first IP information, which is not present in the secured network entity information, as a result of the comparison.

The step of registering a device associated with the first IP information as a new device in the network entity information based on the first IP information includes comparing whether an IP associated with the first IP information is existed in a processable IP region associated with the network, and when the IP associated with the first IP information is existed in the processable IP region, the device associated with the first IP information may be registered as a new device in the network entity information.

The step of comparing the obtained information on at least one packet with the IP information in the secured network entity information may include comparing destination IP information included in the obtained information on at least one packet with the IP information in the secured network entity information.

The network entity information includes information associated with a link between a plurality of entities, and the device registration method associated with the network may further include extracting a source IP of a packet having the device associated with the first IP information as a destination IP, comparing the extracted source IP with the IP information existed in the network entity information, and when the extracted source IP is not existed in the network entity information, registering the link between the device associated with the first IP information with the device associated with the extracted source IP as a new device in the network entity information.

The step of registering the link between the device associated with first IP information with the device associated with the extracted source IP as a new device in the network entity information may include comparing whether both the IP associated with first IP information and the extracted source IP are existed in the processable IP region associated with the network and when the IP associated with first IP information and the extracted source IP are existed in the processable IP region, registering the link between the device associated with the first IP information with the device associated with the extracted source IP as a new device in the network entity information.

The step of registering the device associated with the first IP information as a new device in the network entity information based on the first IP information may further include visualizing a device associated with a new link in a flow map that indicates a traffic flow of the network based on the secured network entity information additionally.

The step of registering a new device in the network entity information based on the comparison result may include registering a device associated with the first IP information as a new device based on the first IP information when the first IP information, which is not present in the secured network entity information, as a result of the comparison and determining whether to register the device associated with the first IP information registered as the new device candidate in the network entity information as a new device.

The step of determining whether to register the device associated with the first IP information registered as the new device candidate in the network entity information as a new device may include displaying the device associated with the first IP information as the new device candidate, receiving a user input for the displayed new device candidate, determining whether to register a new device based on the user input, and when it is determined to register as a new device, registering the device associated with the first IP information as a new device in the network entity information.

The step of registering a device associated with the first IP information as a new device in the network entity information based on the first IP information includes comparing whether an IP associated with the first IP information is existed in a processable IP region associated with the network, and when the IP associated with the first IP information is existed in the processable IP region, the device associated with the first IP information may be registered as a new device candidate.

The step of comparing the obtained information on at least one packet with the IP information in the secured network entity information may include comparing destination IP information included in the obtained information on at least one packet with the IP information in the secured network entity information.

The network entity information includes information associated with a link between a plurality of entities, and the network device registration method may further include extracting a source IP of a packet having the device associated with the first IP information as a destination IP, comparing the extracted source IP with the IP information existed in the network entity information, and when the extracted source IP is not existed in the network entity information, registering the link between the device associated with the first IP information with the device associated with the extracted source IP as a new link candidate, and determining whether to register the link between the device associated with the first IP information with the device associated with the extracted source IP as a new link.

When the extracted source IP is not existed in the network entity information, the step of registering the link between the device associated with the first IP information with the device associated with the extracted source IP as a new link may include comparing whether both the IP associated with first IP information and the extracted source IP are existed in the processable IP region associated with the network and when the IP associated with first IP information and the extracted source IP are existed in the processable IP region, registering the link between the device associated with the first IP information with the device associated with the extracted source IP as a new link candidate in the network entity information.

The step of determining whether to register the link between the device associated with the first IP information with the device associated with the extracted source IP as a new link may include displaying the link between the device associated with the first IP information with the device associated with the extracted source IP as a new link, receiving a user input for the displayed new link candidate, and when it is determined to register as a new link, registering the link between the device associated with the first IP information with the device associated with the extracted source IP as a new link in the network entity information.

The step of registering the link between the device associated with the first IP information with the device associated with the extracted source IP as a new link in the network entity information may further include visualizing a device associated with a new link in a flow map that indicates a traffic flow of the network based on the secured network entity information additionally.

The information on at least one packet transmitted and received between the first entity and the second entity may be information obtained by performing mirroring from a switching device provided between the first entity and the second entity.

In another aspect, an apparatus for registering a new device may include a database for securing network entity information including Internet Protocol (IP) information on at least one entity associated with the network, a port for obtaining information on at least one packet transmitted and received between a first entity and a second entity, a packet analysis module for comparing the obtained information on at least one packet with the IP information in the secured network entity information and a service module for registering a new device in the network entity information based on the comparison result.

According to a method for diagnosing a network performance in an apparatus for diagnosing network performance of the present disclosure, visibility and sentiency and immediacy are secured for the entire services, and there is an effect that proactive symptom management (prevention) is established for a network service problem.

Furthermore, according to a method for visualizing a network performance indicator of the present disclosure, visibility and sentiency and immediacy are secured for the entire services, and there is an effect that proactive symptom management (prevention) is established for a network service problem.

Additionally, according to a method for registering a new device associated with a network, there is an effect that a new device may be easily registered without inconvenience task of a user.

BRIEF DESCRIPTION OF THE DRAWINGS

FIG. 12 is a table illustrating an example of configuration values for determining whether a warning associated with a network performance is occurred in a packet mirroring device according to an embodiment of the present disclosure.

FIG. 28b is a diagram illustrating a threshold configuration page.

FIG. 29a and FIG. 29b are diagrams illustrating a page related to 40x error analysis.

FIG. 34a and FIG. 34b are diagrams illustrating a page for a new device and a link registration.

FIG. 38 is a diagram illustrating a selective device automatic registration page.

DESCRIPTION OF EXEMPLARY EMBODIMENTS

Figure 1:
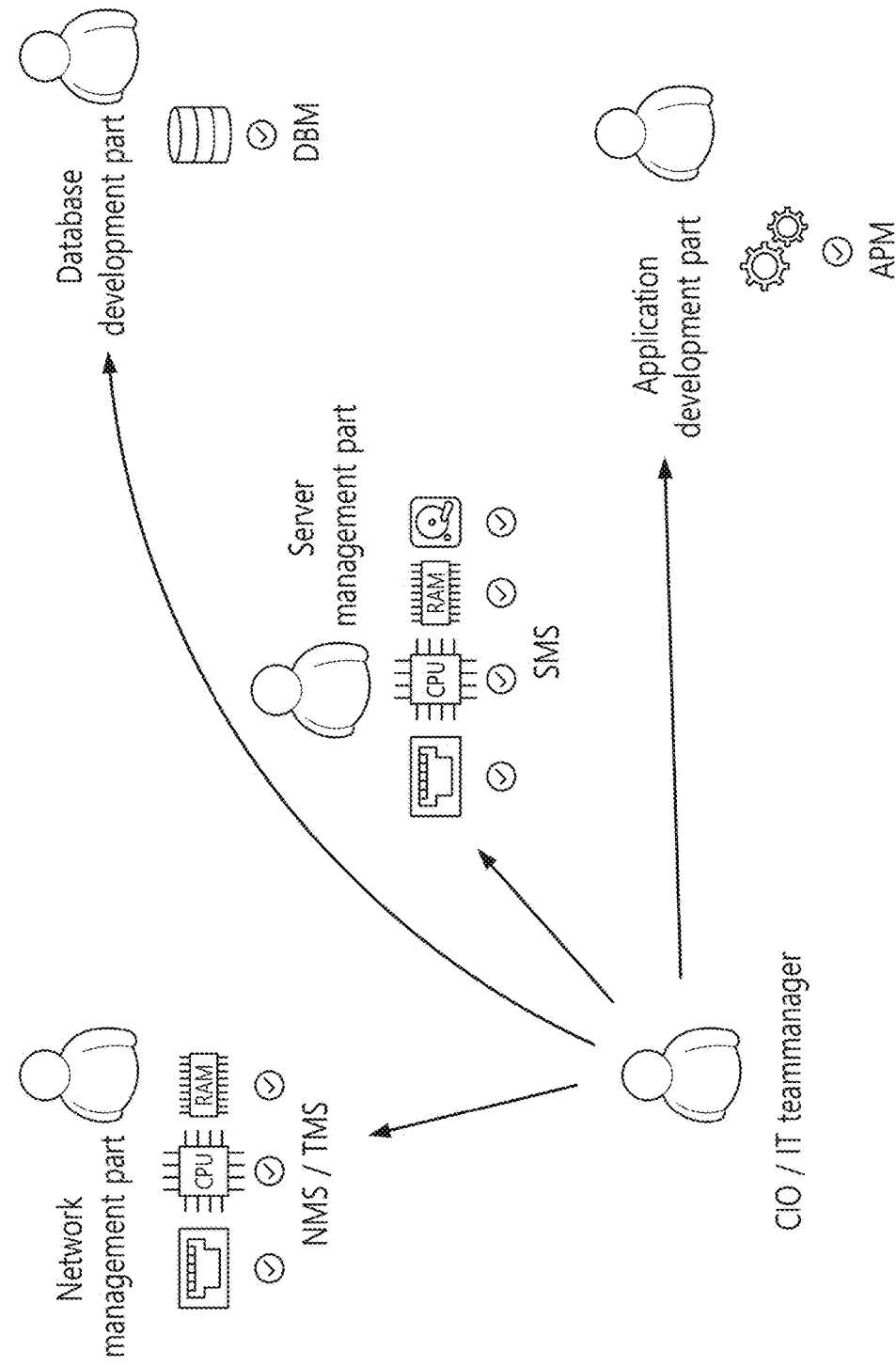
FIG. 1 is a conceptual diagram for describing a process of performing a conventional network service management.

The present disclosure may have various modifications and various embodiments and specific embodiments will be illustrated in the drawings and described in detail in the detailed description.

However, this does not limit the present disclosure to specific embodiments, and it is understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

When it is described that a component is "connected to" or "accesses" another component, the component may be directly connected to or access the other component, or a third component may be present there between. In contrast, it is understood that, when it is described that an element is "directly connected to" or "directly access" another element, it is understood that no element is present between the element and another element.

Terms used in the present application are used only to describe specific embodiments are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

Throughout the present disclosure, an entity includes various devices associated with a network, and this is the term that includes a client terminal and/or a service device.

A user means a user of a client terminal, basically. However, in some cases, a user means a user of a packet mirroring device according to an embodiment of the present disclosure. A network operator and/or a network manager is a person who manages a network associated with a packet mirroring device and may mean a user of a packet mirroring device.

A network performance diagnosing device for calculating a performance related indicator in relation to a network performance may be called a packet mirroring device. In addition, since the device may be implemented with the device for visualizing the performance related indicator of a network service, the device may also be called a network performance visualization device. Additionally, since the device may be implemented with a device for registering an entity newly associated with a network, the device may also be called a network new entity registration device. Hereinafter, although the various implementational examples, the device is called a packet mirroring device.

In addition, the term of network performance may be generally used in relation to a communication performance in a server, a communication network and a client.

Figure 2:
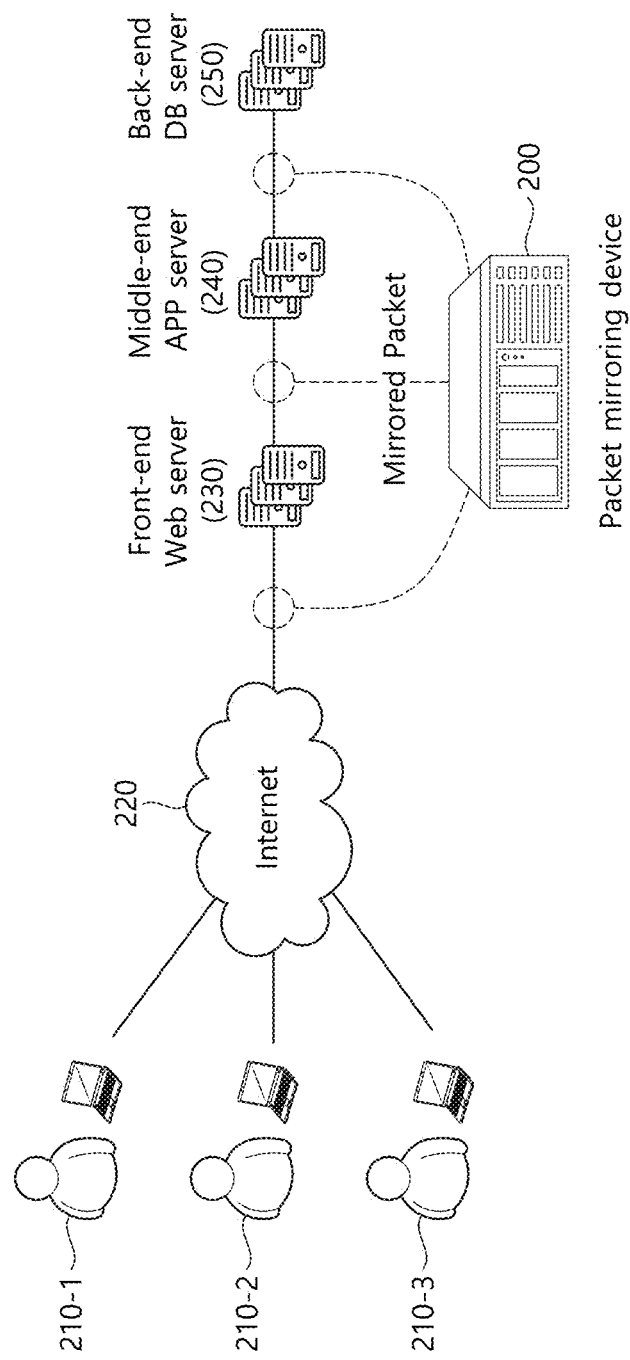
FIG. 2 is a conceptual diagram illustrating a system in which a packet mirroring device is included according to an embodiment of the present disclosure.

FIG. 2 is a conceptual diagram illustrating a system in which a packet mirroring device is included according to an embodiment of the present disclosure. As shown in FIG. 2, a packet mirroring system according to an embodiment of the present disclosure may include client terminals 210-1 to 210-3, a network 220, a server group 230 to 250 and a packet mirroring device 200.

Referring to FIG. 2, the client terminals 210-1 to 210-3 access a specific web site and/or a web application through the network 220. In this case, the access is performed at the server group 230 to 250 associated with the web site and/or the web application. The client terminals 210-1 to 210-3 request an execution of a desired pate or an application by accessing to a specific web page through a web browser. The request may include an execution of multimedia contents such as a video image and audio and/or other application as well as static contents such as a html document.

According to an embodiment of the present disclosure, the client terminals 210-1 to 210-3 may include an arbitrary device including a communication function (including function of internet access and web browser execution) and a data processing function which are operated by a user. The client terminals 210-1 to 210-3 may be referred to as the term, a Mobile Station (MS), a User Equipment (UE), a User Terminal (UT), a wireless terminal, an Access Terminal (AT), a fixed or mobile Subscriber Unit, a Subscriber Station (SS), a cellular phone, a wireless device, a wireless communication device, a Wireless Transmit/Receive Unit (WTRU), a mobile node, a mobile, a mobile station, a personal digital assistant (PDA), a smart phone, a laptop, a netbook, a personal computer, a wireless sensor, a Customer Electronic device (CE) or other terms. Various embodiments of the client terminals 210-1 to 210-3 may include a cellular phone, a smart phone having a wireless communication function, a personal digital assistant (PDA) having a wireless communication function, a wireless modem, a portable commuter having a wireless communication function, a photographing device such as a digital camera having a wireless communication function, a gaming device having a wireless communication function, a home appliance device of storing and playing back music having a wireless communication function, an internet home appliance device in which wireless internet access and browsing are available, and a portable unit or terminals integrating a combination of the functions, but not limited thereto.

Each of the client terminals 210-1 to 210-3 may include input devices such as a mouse and a keyboard and a user communication interface including a display for providing a control user interface for interacting with devices networked by a user. The user interface may include a Graphical User Interface (GUI) for providing information to a user.

The network 220 includes wired and/or wireless network. The network 220 may include internet. The network 2220 may include a serial bus that provides a physical layer (medium) for transmitting and receiving data between the client terminals 210-1 to 210-3 and the server group 230 to 250 accessed in various ways. Here, the serial bus may include 1394 serial bus. This may support both of Time-multiplexed audio/video (A/V) stream and standard Internet Protocol (IP) communication (e.g., IETF REC 2734), but not limited thereto. The network 220 may also include non-1394 network (e.g., ethernet, etc.). In addition, the network 220 may also include a home network. Each of the client terminals 210-1 to 210-3 may communicate with one or more server devices 230 to 250 in the network 220.

The server group 230 to 250 respond to requests of users using resources of the network 220 for providing services to the users. This includes a return of information (data). Furthermore, this includes performance of function (e.g., mechanical function) and return of state, data stream and return of state, acceptance of data stream and return of state or storage of states for various types of actions. The server group 230 to 250 may include on demand and embedded control program for implementing their own hardware.

The server group 230 to 250 may be associated with a specific web site and/or web application and perform operation and management related to tasks performed in the specific web site and/or web application. The server group 230 to 250 may interact with the client terminals 210-1 to 210-3 and another server group 230 to 250. Exemplary services may include MPEG sourcing/sinking and display service.

The server group 230 to 250 may process information such as interface data (e.g., HTML, XML, Java, Java script, GIF, JPEG, MPEG, graphic rupture, or other arbitrary format used for an intended purpose) that provides a command of device and an interface for control through the network 220. In a specific embodiment, each of the servers 230 to 250 may process a command of the device and information such as one or more Hypertext Markup Language (HTML) that provides a control. The server group 230 to 250 use the internet standard that represents HTML pages using a browser technique.

According to an embodiment of the present disclosure, the server group 230 to 250 may include a web server 230, an APP server 240 and a database (DB) server 250. However, the servers does not necessarily include a combination of three servers. It is also available that only the web server 230 is existed but the APP server 240 and the DB server 250 are not existed, and a server combination of other various types of formats and layers are available.

The web server 230 is a server for providing contents requested by a Web Client. The web server 230 may provide a static HTML or an image such as JPEG or GIF to a web browser through HTTP protocol. In some cases, the web server 230 may also be embedded with a container that may operate an internal application.

The APP server 240 may also be called a Web Application Server (WAS) server, and this represents a middleware software server that provides a transaction process and management, and application execution environment in client/server environment. Typically, the server group 230 to 250 may be constructed with three-layer web computing environment of a web server, an application server and a database, and in this case, the APP server 240 may play the roles of the application server in the client/server environment. The APP server 240 provides application execution environment and database access function, manages a transaction, performs a business logic for processing a work, and performs application interlink between different models of systems.

According to an embodiment of the present disclosure, an effective distribution may be derived through functional sorting of the web server 230 and the WAS 240. Static data is processed in the web server 230 which is existed in a front position structurally, and dynamic data may be processed by the WAS 240 which is existed in a rear position. For example, in response to a user request, static data such as HTML, Java script file, CSS, image, and the like is processed so as to be positioned in a front end of the web server 230, and a service request is not handed over to the WAS 240. In addition, a web application service is handed over to the WAS 240 which is positioned in a rear position such that the WAS 240 may be concentrated on an execution of the web application. The scheme of processing of the web server 230 separated from processing of the WAS 240 which is handed over may be processed through a configuration of the web server 230. It is processed whether a specific extension or directory task is handed over to the WAS 240 in the web server 230.

The database server 250 is a storage in which various types of data processed by the web server 230 and/or the APP server 240 are stored. The database server 250 may store huge amount of data according to the properties of tasks, web sites and web applications processed by the web server 230 and/or the APP server 240. These may include data associated with personal information, organization information and various types of contents (e.g., multimedia contents).

The packet mirroring device 200 may be disposed in at least one position between the network 200 and the web server 230, between the web server 230 and the APP server 240, and between the APP server 240 and the database server 250. The packet mirroring device 200 is connected to a switching device (not shown) disposed in at least one position between the network 200 and the web server 230, between the web server 230 and the APP server 240, and between the APP server 240 and the database server 250, and diagnoses a performance of network service based on a packet mirrored by a packet which is transmitted and received between the two entities. According to an embodiment of the present disclosure, the mirrored packet may be generated by a duplication based on a packet which is actually transmitted and received (user packet which is actually used), and it is not required to generate a separate intentional test packet for diagnosing a performance of network service. Particularly, the packet mirroring device 200 is available to monitor all packets in real time.

The packet mirroring device 200 may calculate various types of indicators that indicate a performance of network service based on various types of information (e.g., source ID, destination ID and time information, etc.) included in a mirrored packet in real time. The calculation of indicators may be performed in a unit of transaction. The number of calculated indicators may exceed 120 types, and this will be described with reference to FIG. 5 below. The packet mirroring device 200 may determine whether there is a problem such as a speed latency, waiting latency, traffic exceed, error occurrence in a certain section, and visualize a determination result such that an operator or a manage may identify the determination result. That is, the packet mirroring device 200 enables an error section to be rapidly identified, and based on it, a response for the error section is quickly performed. The management of network service is performed at a single point, IT management, which has been performed in a distributed manner by several persons in charge, may be progressed efficiently. A state of network services of all sections may be shown at one view, it may be supported that an error is identified immediately, and accordingly, a response thereto may be performed.

Furthermore, the packet mirroring device 200 may analyze the mirrored packet, and an access (in relation to security issue) from a malicious user may be tracked, and a response thereto may be performed in real time.

According to an embodiment of the present disclosure, the packet mirroring device 200 is connected to the switching device and may not require an agent installation that is substantially hard on the server group 230 to 250. That is, there is a load on the server group 230 to 250, which slows down a working speed. However, the packet mirroring device 200 is not necessarily configured in a hardware manner but operates with being installed on the switching device or other devices in a software manner.

Figure 3:
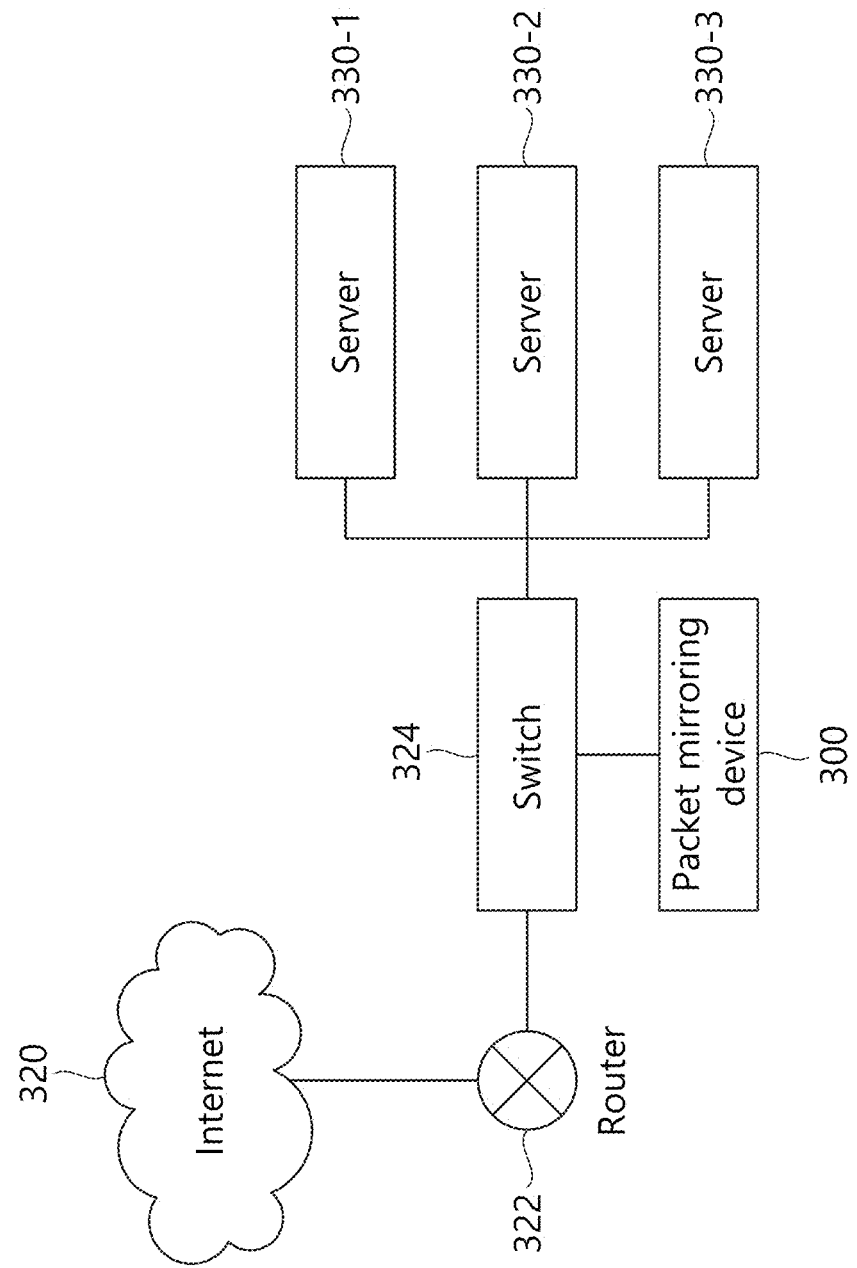
FIG. 3 is a block diagram illustrating a connection configuration between a packet mirroring device and other device in a network according to an embodiment of the present disclosure.

FIG. 3 is a block diagram illustrating a connection configuration between a packet mirroring device and other device in a network according to an embodiment of the present disclosure.

Referring to FIG. 3, a router 322 is connected in a network such as internet 320, and the router 322 is connected to a switch 324 and transmits a request to servers 330-1 to 330-3 in relation to the request of a client terminal (not shown), and transmits information in relation to a response to the request from the servers 330-1 to 330-3 to the client terminal.

The router 322 or a sharer (not shown) having a function of router extracts a position and a reception address of a packet transmitted from the client terminal through the internet 320, designates an optimal path for the position, and forwards the data packet to the switch 324 through the path. The router 322 detects an IP address and forwards data to the switch 324.

The switch 324 memorizes a unique MAC address of each of the servers 330-1 to 330-3. The switch 324 determines a place to transmit a certain packet through the address and transmits the packet provided from the router 322 to the servers 330-1 to 330-3. The switch 324 includes a switch that plays the role of OSI 2-layer, OSI 3-layer, OSI 4-layer and/or other layers (e.g., OSI 7-layer). For example, the switch 324 may perform the function of configuring a path. In addition, the switch 324 may also perform the function such as load balancing, port forwarding, QoS, and the like. The switch 324 may be called a network switch, a switching hub, a port switching hub, and the like.

The packet mirroring device 300 is connected to the switch 324 and obtains almost all packets provided to the servers 330-1 to 330-3 by mirroring through the switch 324. The packet mirroring, that is, a duplication or capture of packet may be performed in the switch 324. In some case, the packet mirroring may be performed in the packet mirroring device 300 itself. After duplicating the packet to the servers 330-1 to 330-3, the switch 324 may configure a port connected with the packet mirroring device 300 as a destination port and provide it to the packet mirroring device 300. At this time, the corresponding port may be designated as an analysis use and provided.

Figure 4:
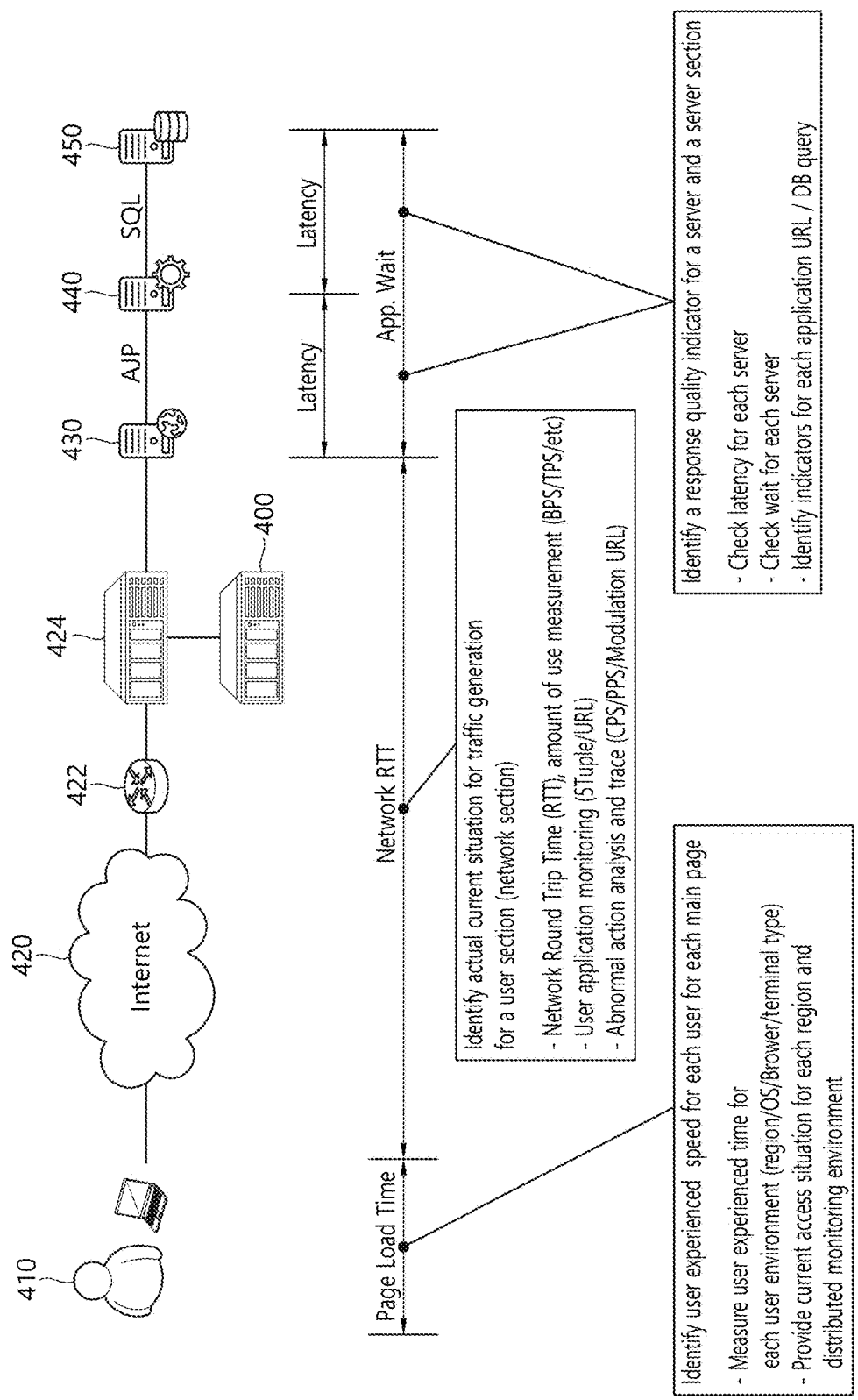
FIG. 4 is a conceptual diagram for describing an operation in each section of a packet mirroring device according to an embodiment of the present disclosure.

FIG. 4 is a conceptual diagram for describing an operation in each section of a packet mirroring device according to an embodiment of the present disclosure.

Referring to FIG. 4, as described in FIG. 2 and FIG. 3, a client terminal 410 transmits packets to server group 430, 440 and 450 through internet 420. In this case, a router 422 and a switch 424 are present between the internet 420 and the server 430, and a packet mirroring device 400 is connected to the switch 424.

The packet mirroring device 400 may analyze a mirrored packet and identify a user experienced latency time in a client terminal 410. In addition, the packet mirroring device 400 may identify information related to a traffic to an initial server 430 through the internet 420 and identify a latency time in the server group 430, 440 and 450. Particularly, response waiting times of the server group 430, 440 and 450 are determined for each section. Response waiting times of section between the web server 430 and the WAS 440 and section between the WAS 440 and the DB server 450 are separately calculated and treated. Web latency time represents a response latency time until a static URL (image (gif, png, jpg, etc.), css, js, text, etc.) receives data from the web server 430, and APP response latency time means a response latency time until receiving a first packet of a page generated from a dynamic URL or a post URL. The APP response latency time may be associated with a call that uses dynamic contents such as HTML, ASP, JSP, PHP and/or HTTP POST method. That is, this represents a response latency time associated with a task returned via the WAS server 440 and/or the DB server 450.

First, a user experienced speed in the client terminal 410 is identified as a paging loading time. This is analyzed and visualized as a user experienced speed for each user for each main web pages. That is, in the case that there are multiple users that access to a specific web page, a user experienced speed for each user environment and/or for each region of the multiple users may be identified. The user environment may be identified differently for each region, OS installed in the client terminal a type of web browser and a type of terminal. In addition, a current access situation for each region and distributed monitoring environment may be provided. At this time, the current access situation for each region may be provided with being distinguishing a global current access situation targeting the whole global area and a local current access situation targeting the local area.

The actual current situation for traffic generation for a user section (network section) to the server 430 may be represented as a network Round Trip Time (RTT). This may also be called a network time. Here, in relation to an amount of use, it is also identifiable situations of Bit Per Second (BPS) information that indicates a data transmission speed per second, User Per Second (UPS) information that indicates the number of users connected per second, Connection Per Second (CPS) information that indicates the number of new sessions connected per second and Transaction Per Second (TPS) information that indicates the number of transactions occurred per second. In addition, a user application may be monitored, and abnormal action analysis by a user may also be analyzed and traced. Through such performance related indicators, an application that occupies a network traffic may be identified, and interrelation of a user, an application and a network may be monitored.

Additionally, the packet mirroring device 400 may also identify a response latency time among servers 430, 440 and 450. That is, a response quality indicator per server section may be identified, and here, it may be identified a response latency time per server, a response waiting session number per server and an indicator per application URI and/or an indicator per DB server Query.

Figure 5:
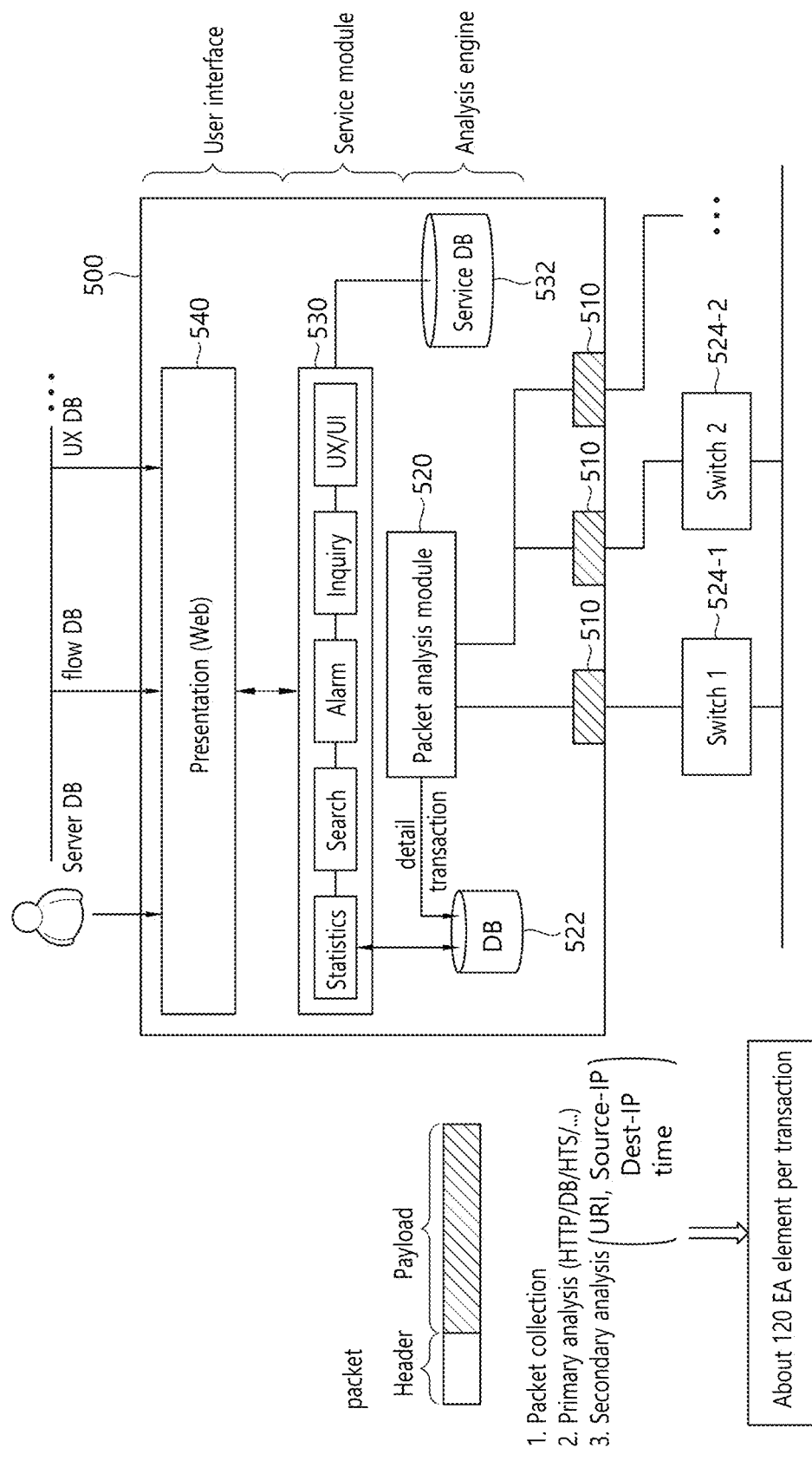
FIG. 5 is a block diagram illustrating a packet mirroring device in detail according to an embodiment of the present disclosure.

FIG. 5 is a block diagram illustrating a packet mirroring device in detail according to an embodiment of the present disclosure. As shown in FIG. 5, a packet mirroring device 500 according to an embodiment of the present disclosure may include a port 510, a packet analysis module 520, a service module 530 and a user interface 540. In addition, the packet mirroring device 500 may further include a packet analysis database 522 and a service database 532.

Referring to FIG. 5, at least one port 510 may be included and connected to switching devices 524-1, 524-2, and the like. A single port may be connected to a single switching device. The connected ports receive mirrored packet information from the switching devices 524-1, 524-2, and the like and transmit the mirrored packet to the packet analysis module 520.

The packet analysis module 520 collects a mirrored packet and analyzes the packet substantially. This may be called an analysis engine. The packet analysis module 520 analyzes a head of a packet primarily in the mirrored packet. Through this, the packet analysis module 520 analyzes the packet whether it is HTTP packet, a packet related to DB or a packet associated with TCP. That is, the packet analysis module 520 distinguishes a type of associated with a certain protocol. Through this, the packet analysis module 520 may identify a server to which request information such as "GET/web address/HTTP/1.1" is transmitted. The packet analysis module 520 perform a syntactic analysis by parsing the packet header information. "GET" becomes a request message, and "web address" indicates a web address associated with a request. Further, "HTTP/1.1" means HTTP/1.1 version, and language information (e.g., ko-kr) associated with other packets may also be identified and stored. As a request method, POST, HEAD, PUT, DELETE, and the like as well as GET may be transmitted according to a situation, and the packet analysis module 520 stores the information together with time information and the related IP.

The packet analysis module 520 provides an indicator of each packet, and based on the provided indicator, identifies a type of packet, that is, whether the packet is a request packet based on HTTP or a response packet therefor. At this time, in the case that a request packet obtained from a first entity is present, later, a response packet therefor from a second entity may be present. At this time, based on at least two sequential packets and a packet transmitted from the first entity and the second entity, a session establishment and flows of transactions may be analyzed.

In addition, the packet analysis module 520 may parse information on a browser used by a client terminal, information associated with a HOST, previous URL address information and browser support language information. At this time, the packet analysis module 520 may analyze whether a header is a general header, a request header or an entity header and parse information representing a boundary line of a header and a payload.

Thereafter, secondarily, the packet analysis module 520 analyzes a Uniform Resource Locator (URL) (or uniform resource identifier (URI)), a source IP (Source_ip), a destination IP (Dest_ip) and time information of the mirrored packet. Here, when the URL value is checked, a redirection address of the packet may be identified such as "https://www.google.co.kr/?gws_rd=ssl". In addition, the source IP may represent an IP address of the client terminal, and the destination IP may represent an IP address of a server associated with a final destination site of the request. The time information may be provided in a time stamp format. In addition, length information of the whole packet may be identified.

The packet analysis module 520 may include a packet analysis algorithm corresponding to each protocol, for example, various protocols such as HTTP, IP, UDP, TCP and DNS and extract a URL, a source IP, a destination IP and time information from the packet adaptively in accordance with each protocol and use it in analysis.

As such, with the secondary analysis, based on the information related to the extracted packet, about 120 elements of performance indicator information per 1 transaction may be generated. Preferably, 6000 transactions per second are analyzed. And then, the extracted packet related information and about 120 performance indicator information generated per transaction are stored in the database 522.

Hereinafter, it is described the indicator related to performance generated based on the packet related information of the mirrored packet in detail.

The packet analysis module 520 calculates Round Trip Time (RTT) information in a unit of transaction. That is, the packet analysis module 520 calculates round trip time information of a data signal. The algorithm related to calculation of the RTT information will be described with reference to FIG. 7 in more detail below.

In addition, the packet analysis module 520 generates session information. This may represent the number of sockets per second, which is established, that is, the number of sockets which is connected, not disconnected. In addition, the packet analysis module 520 calculates response waiting time (latency) information consumed until a client sends a request and receives a response from a specific server. This may be regarded as a waiting time consumed while querying database, performing an application and other tasks.

The packet analysis module 520 calculates BPS information that represents a size of bit transmitted or received per second, Packet Per Second (PPS) information that represents the number information of packets transmitted or received per second and UPS information that represents the number of users (based on IP) connected per second. These may be calculated based on the number of source IPs connected to a specific destination IP on how many users are connected for 1 second. In addition, the packet analysis module 520 calculates CPS information (represents how many sessions are newly connected for 1 second) that represents the number of new sessions connected per second and TPS information (represents how many transactions are occurred for 1 second) that represents the number of transactions occurred per second. Furthermore, the packet analysis module 520 calculates Hit Per Second (HPS) information that represents the number of URLs requested per second. At this time, the packet analysis module 520 calculates HPS based on the number of URLs requested per second in the corresponding server in the case of server HPS and calculates HPS based on the number of URLs requested per second in the corresponding client. In addition, the packet analysis module 520 calculates Server Per Second (SPS) information which is number information of servers connected per second. This represents the number of servers to which a client is connected per second.

In addition, the packet analysis module 520 calculates wait information that represents the number of response-waiting sessions. This is the session number in a state of fail to receive a response after a client sends a request. In the case that the number of real time sessions of a server is 100 and the number of Waits is 10 among them, the information represents that 10 sessions among 100 sessions are still in the state of fail to receive a response.

Furthermore, the packet analysis module 520 generates client_ip, server_ip, client_port and server_port information. These represent IP information of a client, IP information of a server, port information of a client and port information of a server, respectively. In this case, the client_ip and server_ip information uses a string as a unit (e.g., 222.103.141.187), and the client_port and server_port information uses a number as a unit (e.g., 1254 or 80).

The packet analysis module 520 may calculate transaction_number information. The transaction_number information is a transaction number which is generated after a session is established. The transaction_number information indicates 1 in the case that the information is the first transaction after a session is established. Normally, several transactions are generated after a session is established once, it is indicatored by increasing the number by 1 in every case. When a page is seen by a browser, in the case that several transactions are processed with a session when each of components (js, css, image, etc.) in the page is requested, these may be distinguished by indicatoring them by increasing 1 in every transaction. For example, in the case of transaction_number information of 8, it is the eighth transaction after a session is established.

The packet analysis module 520 generates start_time information, start_usec information, end_time information, end_usec information, fin_time information and fin_usec information in relation to a start and an end of a transaction. These may be obtained by analyzing detailed items on sending a request packet in a predetermined time interval between the same source (client) and destination (e.g., server) based on a source ip, a destination ip and time information of a mirrored packet, and whether all the related data are received.

The start_time information represents a transaction start time (year month day, hour minute second: e.g., 2012-07-18 22:33:06), and the start_usec information represents a transaction start time (one-millionth second). The start_usec information may become a completed time by being combined with the start_time (e.g., 2012-07-18 22:33:06.288370).

The end_time information represents a transaction end time. That is, the end_time information represents an end (a time of receiving the last Response Data of the transaction) of data. For example, the end_time information may be represented by 2012-07-18 22:33:12.

The end_usec information represents a transaction end time in a unit of one-millionth second.

The fin_time information represent a time when the transaction is completely ended since a next transaction comes after the transaction is ended (Fin is received) or ended by Timeout. For example, the fin_time information may be represented by 2012-07-18 22:35:23.

The fin_usec information represents a complete transaction end time in a unit of one-millionth second.

The packet analysis module 520 stores a transaction state with an information name, "state". This may be represented by 7 numbers as below.

Transaction state code
1—session_finish: An initial state
2-3whs_syn_sent: A state in which a client sends syn during 3 handshakes
3-3whs_syn_received: A state in which a client receives syn/ack during 3 handshakes
4-3whs_ack_received: A state in which a server receives ack during 3 handshakes
5—session_connected: A state in which a session is established
6—session_request: A state in which a client sends a request
7—session_response: A state in which a server sends a response Next, The packet analysis module 520 stores a transaction result with information name "result". This may be represented by 11 numbers as below.

Transaction state code
1—trans_finish: A state in which a transaction is ended
2—client_finish: A state in which a client ends a session (sends Finish-FIN)
3—server_finish: A state in which a server ends a session (sends Finish-FIN)
4—client_reset: A state in which a client ends a session (sends Reset-RST)

5—server_reset: A state in which a server ends a session (sends Reset-RST)

6—client_timeout: A state in which a session is ended by Timeout while a client sends a request 7—server_timeout: A state in which a session is ended by Timeout while a server sends a response 9—session_error: HTTP session error 10—req_parser_error: HTTP Request Header error 11—rsp_parser_error: HTTP Response Header error Next, the packet analysis module 520 calculates time information in relation to a response latency of a transaction. This includes tran_latency, tran_rsp_time, used_time, and fin_used_time information.

The tran_latency information represents a response waiting time of a transaction. This represents a waiting time until receiving a first data from a server after a client sends a request. This is in a unit of one-millionth second. For example, tran_latency information may have a value 76328. The tran_rsp_time is a transaction response time and represents a transmission time of a response data. That is, the tran_rsp_time represents a time when a server transmits a response data. This also uses a unit of one-millionth second. The used_time information is a total transaction use time and may be calculated as "End Time−Start Time". This represents a time consumed until both of a request of a client and a response of a server are ended after a session is established between the client and the server. The fin_used_time is a use time until complete end of a transaction and calculated as "Fin Time−Start Time".

The packet analysis module 520 calculates session_req_pkts, session_req_bytes, session_rsp_pkts, session_rsp_bytes, session_bps, sess_max_bps, session_pps and sess_max_pps information.

The session_req_pkts information represents the number of transaction request data packets and calculated based on the number of packets that a specific client sends by a request data. This is a unit of number. The session_req_bytes information represents a byte of requested data of a transaction and calculated based on an amount of byte that a specific client sends by a request data. The unit is byte. The session_rsp_pkts represents the number of transaction response packets and calculated based on the number of packets of response data that a specific server sends to a client. The unit is number. The session_rsp_bytes information represents a byte of response data of a transaction and calculated based on an amount of byte that a specific server sends by a request data. The unit is byte. The session_bps information represents a real time BPS of a session and calculated based on BPS of a currently established session. The unit is number. The session_pps information represents a real time PPS of a session and calculated based on PPS of a currently established session. The unit is number. The sess_max_pps information represents a maximum PPS of a session and calculated based on maximum PPS during the period during which a corresponding session is used. The unit is number.

Next, the packet analysis module 520 generates a domain, a URL, a method and response_code_number information.

The domain information represents information in relation to a domain of URL requested by a client. This is a unit of string. For example, the domain information represents information such as "www.lgmobile.co.kr".

The url information is a URL requested by a client and represents information such as "/jsp/front/search/include/akc.jsp". The unit is string.

The method information is a type of request methods (POST, GET, HEAD, PUT . . . ) and represent a request method type requested by a client. The unit is string.

The response_code_number is a response result which is represented by HTTP state code. For example, the response_code_number may be represented by one value of "200, 304, 404, 500 . . . " as a Response Status Code responded by a server.

The packet analysis module 520 calculates users, max_users, sessions, max_sessions, wait, max_wait, ups, max_ups, cps, max_cps, tps, max_tps, latency, max_latency and idle information in relation to a specific URL.

The users information represents the real time number of users (based on Client IP) of a corresponding URL. For example, the users information may represent "the real time number of users of /jsp/front/search/include/akc.jsp". The unit is number.

The max_users information is the maximum number of users of a corresponding URL during the time when the URL is used. For example, the max_users information represent "the maximum number of users of "/jsp/front/search/include/akc.jsp". The unit is number.

The sessions information represents the real time number of sessions of a corresponding URL, for example, represents "the real time number of sessions of /jsp/front/search/include/akc.jsp". The unit is number.

The max_sessions represents the maximum number of sessions of a corresponding URL during the URL is used, for example, represents "the maximum number of sessions of /jsp/front/search/include/akc.jsp". The unit is number.

The wait information is the real time number of Waits of a corresponding URL, for example, represents "the real time number of sessions for awaiting a response of /jsp/front/search/include/akc.jsp". The unit is number.

The max_wait information is the maximum number of response-waiting sessions of a corresponding URL, for example, represents "the maximum number of response-waiting sessions of /jsp/front/search/include/akc.jsp". The unit is number.

The ups information represents the real time UPS of a corresponding URL, for example, represents "the real time UPS of /jsp/front/search/include/akc.jsp". This means "the number of users per second connected to /jsp/front/search/include/akc.jsp". The unit is number.

The max_ups information represents Max UPS of a corresponding URL, for example, represents "the maximum UPS of /jsp/front/search/include/akc.jsp". The unit is number.

The cps information represents the real time CPS of a corresponding URL, for example, represents "the real time CPS of /jsp/front/search/include/akc.jsp". This means "the number of sessions per second connected to /jsp/front/search/include/akc.jsp". The unit is number.

The max_cps represents Max CPS of a corresponding URL, for example, represents "the maximum CPS of /jsp/front/search/include/akc.jsp". The unit is number.

The tps information represents the real time TPS of a corresponding URL, for example, represents "the real time TPS of /jsp/front/search/include/akc.jsp". This means "the number of transactions occurred per second of /jsp/front/search/include/akc.jsp". The unit is number.

The max_tps represents Max TPS of a corresponding URL, for example, represents "the maximum TPS of /jsp/front/search/include/akc.jsp". The unit is number.

The latency information is Latency of a corresponding URL, for example, represents "the real time Latency (response waiting time) of /jsp/front/search/include/akc.jsp". The unit is number.

The max_latency represents Max Latency of a corresponding URL, for example, represents "the maximum Latency (response waiting time) of /jsp/front/search/include/akc.jsp". The unit is number.

The idle information represents Idle of a corresponding URL, for example, represents "the time when there is no request of /jsp/front/search/include/akc.jsp". In the case that the corresponding URL is a URL frequently used, the Idle becomes shorter, and in the case that the corresponding URL is not a URL frequently used, the Idle becomes longer. The unit is number.

The packet analysis module 520 may analyze headers of a request packet of a client and a response packet from a server, and may generate content_len, mime, referrers, agent and cookie information.

The content_len information represents a length of contents of the response header and represents a length of contents included in a response HTTP header sent by the server. For example, the content_len information may represent "byte of /jsp/front/search/include/akc.jsp". The unit is string.

The mime information represents a type of a response header contents. For example, the mime information may be one of text, html, and the like. This is contents type information included in a response HTTP header sent by the server. The unit is string.

The referrers information represents a Referrer of a request header and represents a Referrer included in a request HTTP header sent by the client. For example, the referrers may be considered as the meaning "/jsp/front/search/include/akc.jsp is http://www.lgmobile.co.kr/jsp/front/search/include/miniAkc.html". The unit is string.

The agent information represents an Agent of a request header and represents an Agent included in a request HTTP header sent by the client. Frequently, this information is sent by being included by a browser and includes information such as OS version, browser type and version.

The cookie information represents a cookie of a request header and carries information associated with a cookie included in a request HTTP header sent by the client.

The packet analysis module 520 may generate server_countrys, server_max_countrys, server_error, server_user, server_max_user, server_sessions, server_max_sessions, server_bps, server_max_bps, server_pps, server_max_pps, server_rtt, server_max_rtt, server_ups, server_max_ups, server_cps, server_max_cps, server_tps, server_max_tps, server_hps, server_max_hps, server_wait, server_max_wait and server_idle information as information related to a network service of a specific server.

The server_countrys information represents the real time number of nations of a corresponding server. For example, the server_countrys information may mean "the real time number of nations of users connected to 203.247.157.199 server". Based on this, the fact may be analyzed that two countries are connected to 203.247.157.199 server currently.

The server_max_countrys information represents the Max Country number of a corresponding server. That is, in the case of a registered server, a criterion of MAX may represent a day. This may be a user configuration factor and changeable. For example, the server_max_countrys information may mean "the maximum number of countries connected to 203.247.157.199 server". Based on this, the fact may be analyzed that maximum ten countries have been connected to 203.247.157.199 server at the same time.

The server_error information represents the number of real time errors (400 or 500 Response Codes) of a corresponding server. For example, the server_error information may represent the number of user errors and/or server errors from 400 to 599 among the Response Status Code responded by 203.247.157.199 server.

The server_user information represents the number of real time users (based on Client IP) of a corresponding server. For example, the server_user information may represent "the number of real time users of 203.247.157.199 server".

The server_max_user information represents the maximum number of users of a corresponding server. Here, in the case of a registered server, a criterion of MAX may represent a day. For example, the server_max_user information may mean "the maximum number of users of 203.247.157.199 server".

The server_sessions represents the number of real time sessions of a corresponding server. The server_max_sessions information represents the number of MAX sessions of a corresponding server. The server_bps information represents the real time BPS of a corresponding server. The server_max_bps information represents Max BPS of a corresponding server. The server_pps information represents the real time PPS of a corresponding server. The server_max_pps information represents Max PPS of a corresponding server.

The server_rtt information represents the real time RTT of a corresponding server. The server_max_rtt information represents Max RTT of a corresponding server. For example, this may be solved by "the maximum average RTT of 203.247.157.199 server". A unit of server_rtt information and the server_max_rtt information is micro sec.

The server_ups information represents the real time UPS of a corresponding server. This may represent "the real time UPS of 203.247.157.199 server", and this means that about one user per second is connected to 203.247.157.199 server".

The server_max_ups information represents Max UPS of a corresponding server.

The server_cps information represents the real time CPS of a corresponding server, for example, "the real time CPS of 203.247.157.199 server". This means that about 15 sessions per second are connected to 203.247.157.199 server".

The server_max_cps information represents Max CPS of a corresponding server.

The server_tps information represents the real time TPS of a corresponding server, for example, "the real time TPS of 203.247.157.199 server". This means that about 79 transactions per second are occurred in 203.247.157.199 server".

The server_max_tps information represents Max TPS of a corresponding server.

The server_hps information represents the real time HPS of a corresponding server, for example, "the real time HPS of 203.247.157.199 server". This means that about 79 URLs per second are requested in 203.247.157.199 server".

The server_max_hps information represents Max HPS of a corresponding server.

The server_wait information represents the number of Waits of a corresponding server. For example, the server_wait information may represent "the number of real-time Waits of 203.247.157.199 server". This may represent that 46 sessions are waiting for response currently among 206 sessions in 203.247.157.199 server".

The server_max_wait information represents the number of Max Waits of a corresponding server.

The server_idle information represents Idle Time of a corresponding server. For example, server_idle information may represent "a time where there is no request in 203.247.157.199 server". In the case that there are many accessed users in a corresponding server, the Idle becomes shorter, and in the case that there are few accessed users in a corresponding server, the Idle becomes longer. The unit is micro sec.

According to an embodiment of the present disclosure, a unit of server_countrys, server_max_countrys, server_error, server_user, server_max_user, server_sessions, server_max_sessions, server_bps, server_max_bps, server_pps, server_max_pps, server_ups, server_max_ups, server_cps, server_max_cps, server_tps, server_max_tps, server_hps, server_max_hps, server_wait and server_max_wait information is number.

The packet analysis module 520 may generate client_country_code, client_error, client_servers, client_max_servers, client_sessions, client_max_sessions, client_bps, client_max_bps, client_pps, client_max_pps, client_rtt, client_max_rtt, client_sps, client_max_sps, client_cps, client_max_cps, client_tps, client_max_tps, client_hps, client_max_hps, client_wait, client_max_wait and client_idle information as information related to a network service of a specific server.

The client_country_code information represents a country code (KR, etc.) of a client. For example, "the country of 222.103.141.187 client may represent KR".

The client_error information represents the number of real time errors of a client. For example, the client_error information may represent "the number of errors from 400 to 599 of a Response Status Code among the transactions requested by 222.103.141.187 client".

The client_servers information represents the number of real time server accesses of a client, and this is calculated based on a server that the packet analysis module 520 monitors currently. For example, the client_servers information may represent "the number of servers that 222.103.141.187 client accesses currently". The client_max_servers information represents the maximum number of servers simultaneously of a client. The client_sessions information represents the number of real time sessions of a client. The client_max_sessions information represents the maximum number of sessions simultaneously of a client.

The client_bps information represents the real time BPS of a client, the client_max_bps information represents the maximum BPS of a client, client_pps represents the real time PPS of a client and the client_max_pps the maximum PPS of a client.

The client_rtt information represents the real time RTT of a client, the client_max_rtt information represents the real time RTT of a client, and a unit of the client_rtt information and the client_max_rtt information is micro sec.

The client_sps information represents the real time SPS of a client and represents the number of servers per second currently connected. The client_max_sps information represents the real time SPS of a client. The client_cps information represents the real time CPS of a client, and this represents the number of sessions per second which is connected. The client_max_cps information represents the maximum CPS of a client. The client_tps information represents the real time TPS of a client, and this represents the number of transactions per second which is currently occurred. The client_max_tps information represents the real time TPS of a client. The client_hps information represents the real time HPS of a client and the client_max_hps information represents the maximum HPS of a client.

The client_wait information is the real time number of Waits of a client and represents the number of sessions for awaiting a response in a specific current client. The client_max_wait information represents the maximum number of Waits of a client, and the client_idle information represents the real time Idle Time, which represents the time when there is no request in a specific client. A unit of the client_idle information is micro sec.

According to an embodiment of the present disclosure, a unit of client_country_code, client_error, client_servers, client_max_servers, client_sessions, client_max_sessions, client_bps, client_max_bps, client_pps, client_max_pps, client_sps, client_max_sps, client_cps, client_max_cps, client_tps, client_max_tps, client_hps, client_max_hps, client_wait, and client_max_wait information is number.

Additionally, the packet analysis module 520 may generate org, city_id, isp_id, os_id, browser_id, mobile_id and telcom_id information.

The org information represents an organization of an IP based client. For example, the org information may represent "an organization of 222.103.141.187 Client" is Korea Telecom.

The city_id information may represent a City Code of an IP based client. For example, the city_id information may represent "a City Code of 222.103.141.187 Client" is Seoul.

The isp_id information represents an ISP code of an IP based client. For example, the isp_id information may represent "an ISP of 222.103.141.187 Client" is Korea Telecom.

The os_id information represents an OS code of an IP based client. Through this, it may be identified information on whether the client uses Win XP, iOS or android as an OS.

The browser_id represents a Browser Code of a client. Through this, it may be identified information whether the client uses explorer, chrome or MSIE9 as a web browser.

The mobile_id information represents a Mobile Code of a client. This is device identification information of the client and represents information on whether the device is made by Samsung, Pantech or Apple.

The telcom_id information represents TelCom Code of a client. This represents information on whether a telecom company of a client. This represents information on whether a telecom company of the client is SKT, KT or LGT.

The network service performance related indicators associated with about 120 types of packets are generated in real time and stored in the database 522.

The service module 530 collects statistics based on the performance related indicators stored in the database 522. The statistics may be constructed in a unit of specific server, a unit of specific user, a unit of URL, a unit of session, a unit of server group located at a specific region, a unit of client group located at a specific region and/or a unit of web page. The service module 530 visualizes the performance related indicators using preconfigured various shapes of visualization tools such that a user may identify the performance of a service according to a current network intuitively. The visualization is performed based on the statistics. That is, indicators associated with a specific medium are collected and a meaningful shape of group or table may be generated. For example, associated with a specific client or a server, tasks may be performed such that a list of sessions generated in a specific time zone may be generated, or a table for a database query occurred at the time may be generated. That is, the performance related indicators associated with a network service are stored with time information (time stamp information) of a corresponding packet, a flow map may be generated such that a packet flow of a specific time zone may be understood in the relation between a client terminal and a server. Various statistics and the visualization method therefor will be described with reference to the following drawings in more detail.

In order to generate a specific graph or specific table/list in response to an input from a user, the service module 530 may search or make an inquiry based on criteria variables such as a desired time or a desired environment (e.g., a specific web browser type or a specific user terminal type (whether it is a mobile or a PC)). The service module 530 may sort desired data based on a selected criteria variable and generate a proper type of visualization information.

According to an embodiment of the present disclosure, the service module 530 may perform an alarm function of finding a problematic part and marking in a network service. For example, in the case that the number of waits is a threshold value or greater, the service module 530 may determine that there is a problem in response speed of a corresponding section and display that there is a problem in the corresponding section visually. The warning means according to the occurrence of problem may be implemented as a form such as transmitting a text message to a prestored contact address to a related person in charge or transmitting an e-mail as well as expressing it differently in visual manner. This is described in more detail with reference to FIG. 12.

The various types of statistics data, visualization information data, information related to visualization tool generated in the service module 530 and various types of threshold value information configured by a user may be stored in the service database 532, and return the corresponding information when the user requests arbitrary processed information through the user interface 540.

The user interface 540 includes a device that receives various types of inputs from an operator and outputs visualized information such as a graph or table which is generated in the service module 530. This may include an input means such as a mouse and a touch pad and an output means such as a monitor and a touch screen. A user may input information on database associated with a server (e.g., a server name, a server IP, an associated URL, a port, a sort number, position information of server, processible IP region, etc.), flow database associated with a connection relation (link) of various servers, a visualization tool for output to the user and/or UX/UI database information including metadata associated with the visualization. In addition, the user interface 540 may input a rule set and various types of configuration values associated with the rule set.

Figure 6:
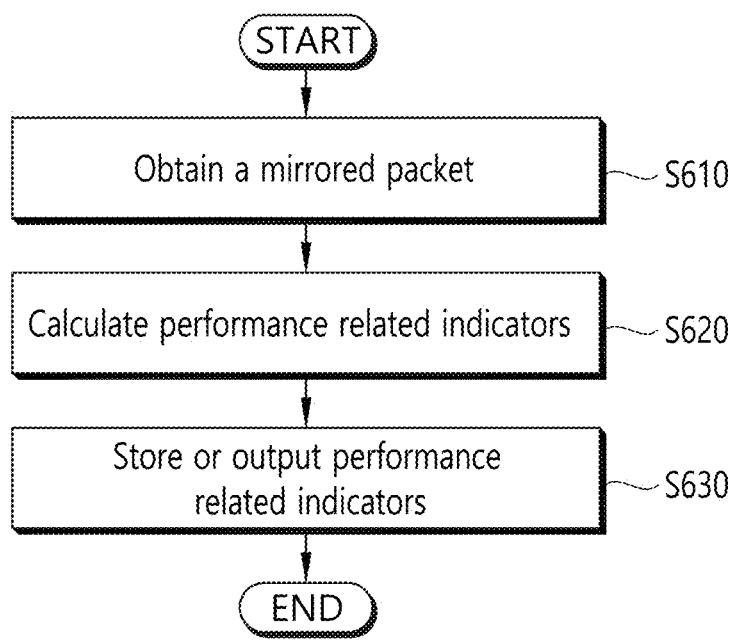
FIG. 6 is a flowchart schematically illustrating a network performance diagnosing method of a packet mirroring device according to an embodiment of the present disclosure.

FIG. 6 is a flowchart schematically illustrating a network performance diagnosing method of a packet mirroring device according to an embodiment of the present disclosure.

Referring to FIG. 6, a packet mirroring device obtains a mirrored packet from a switching device (step, S610).

And then, the packet mirroring device extracts a source IP, a destination IP and time information from the mirrored packet and calculates various types of performance related indicators (step, S620). A part of the performance related indicators may be calculated in a unit of transaction, and a specific performance related indicator may be calculated in a unit of second.

Subsequently, the packet mirroring device may store the calculated performance related indicators in a local storage or an exterior database (step, S630). Next, in order to visualize statistical information desired by a user of a client or a network manager based on the calculated performance related indicators, the packet mirroring device may collect statistics for each of the indicators, search for the desired information and return an inquiry result. In addition, in the case that a value associated with a service is a specific value or greater, the packet mirroring device may determine that it is a problem on a network and display it for each section or for each web site.

Figure 7A:
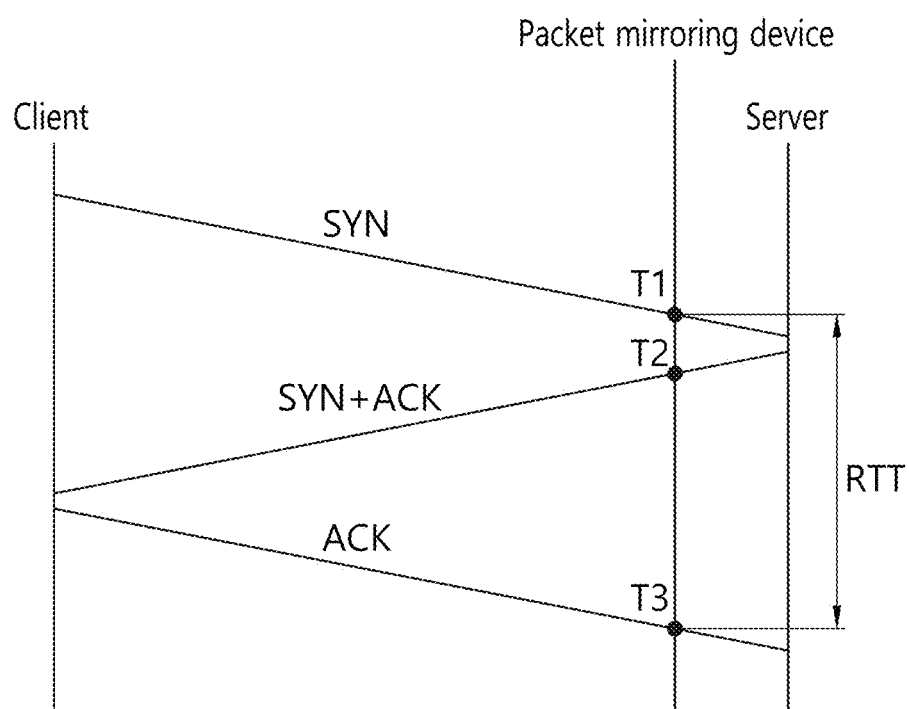
FIG. 7a and FIG. 7b are conceptual diagrams illustrating a network Round Trip Time (RTT) indicator between a user and a server calculated in a packet mirroring device according to an embodiment of the present disclosure.
Figure 7B:
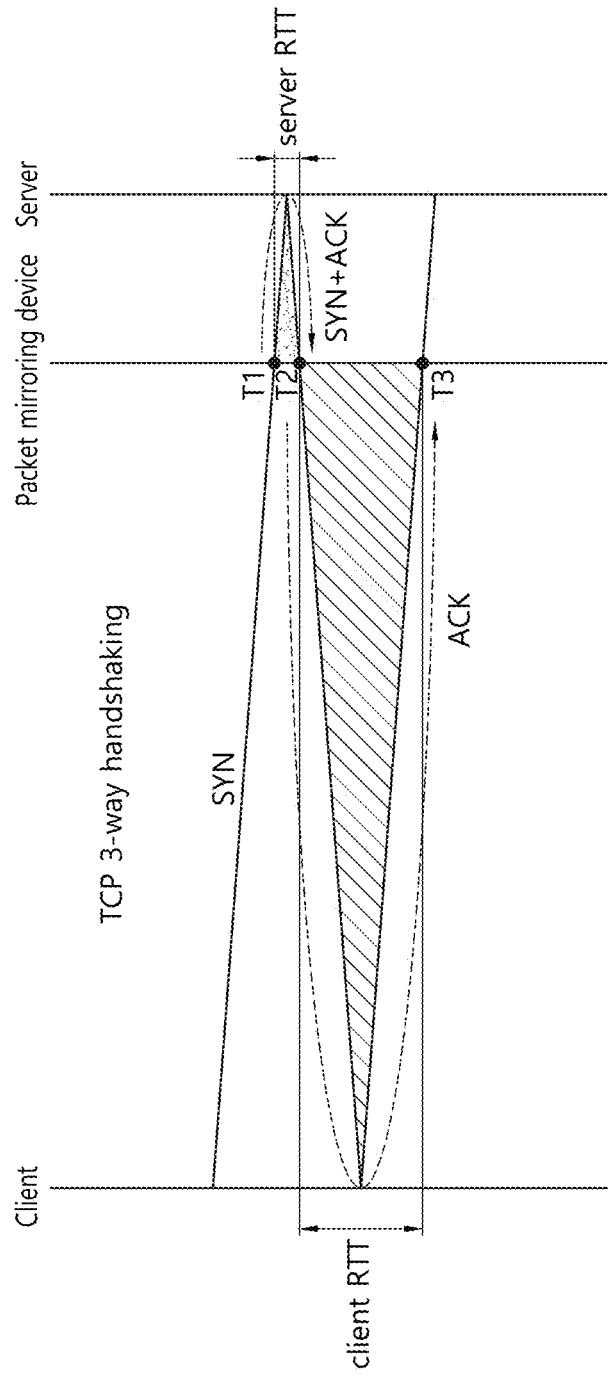

FIG. 7a and FIG. 7b are conceptual diagrams illustrating a network Round Trip Time (RTT) indicator between a user and a server calculated in a packet mirroring device according to an embodiment of the present disclosure.

Referring to FIG. 7, a packet mirroring device calculates Round Trip Time (RTT) information of a packet on a network between a user and a server. At this time, it is assumed that the packet mirroring device is positioned between a client and the server. By assuming a basic synchronization scenario, initially, the client may transmit a synchronization signal (SYN). The server may receive it and transmit a synchronization signal and an acknowledge signal (ACK) together in response to the received synchronization signal. The client may transmit an acknowledge signal (ACK) in response to the signal from the server. Such transmissions and receptions of such three signals may be called 3-way Handshake.

In such a signal transmission scenario, since the packet mirroring device is positioned between the client and the server, the mirrored packet is arrived at the packet mirroring device on T1 timing which is earlier than the time when the synchronization signal is arrived at the server actually after starting from the client. In addition, the synchronization signal and the acknowledge signal from the server arrive at the packet mirroring device on T2 timing which is earlier than the arrival time at the client. Lastly, the acknowledge signal from the client arrives at the packet mirroring device on T3 timing which is earlier than the arrival time at the server.

In such a relationship, with respect to the three transmission and reception timings, the packet mirroring device may secure T1 to T3 time information and calculate an RTT value shifted to a time earlier by a predetermined time from the arrival time at the server by using "T3−T1". This may be called network RTT.

Referring to FIG. 7b, the network RTT is more subdivided, and the RTT at the server and the RTT at the client may be separately calculated. The RTT (sRTT) at the server may represent a time delayed at the server for a single packet, and this may be calculated by using "T2−T1".

In addition, the RTT (cRTT) at the client may be calculated by using "T3−T2".

The packet mirroring device according to an embodiment of the present disclosure calculates and store the three RTTs including the network RTT, the server RTT and/or the client RTT in real time in every transaction.

Figure 8:
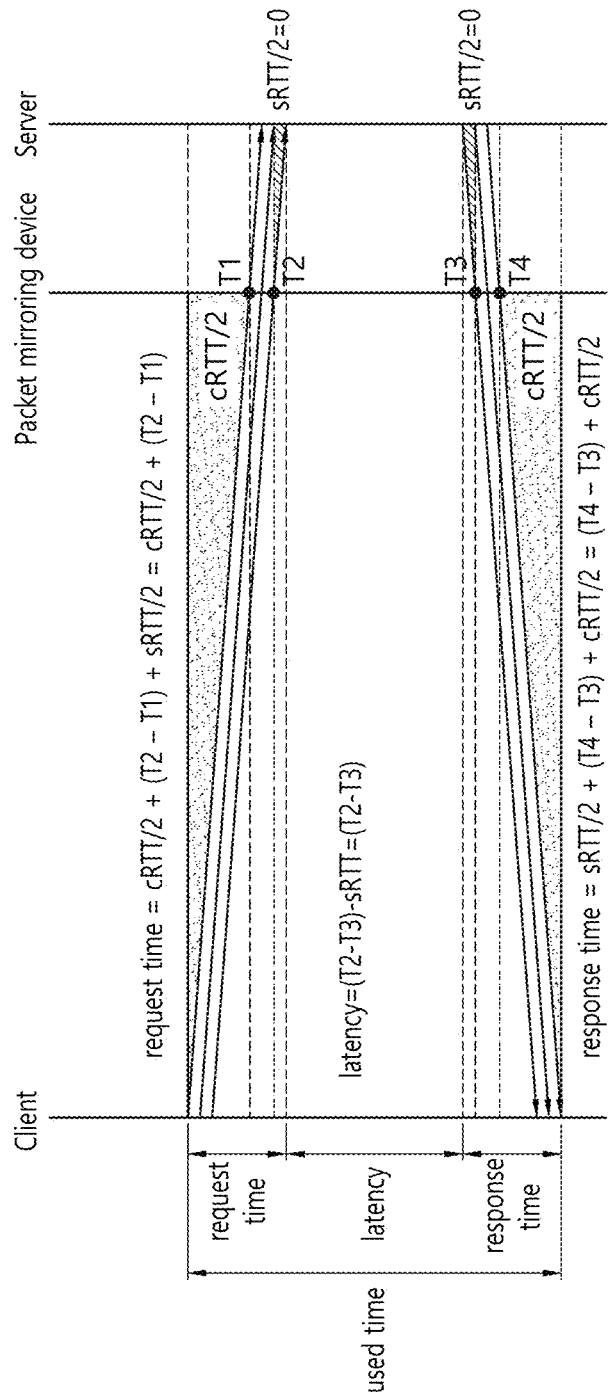
FIG. 8 is a conceptual diagram illustrating a latency indicator calculated in a packet mirroring device according to an embodiment of the present disclosure.

FIG. 8 is a conceptual diagram illustrating a latency indicator calculated in a packet mirroring device according to an embodiment of the present disclosure.

Referring to FIG. 8, a packet mirroring device may calculate various latency indicators. At this time, an embodiment is assumed that the packet mirroring device is present between a client and a server, the client transmits multiple request packets to the server, and the server transmits multiple acknowledge packets to the client in response to the multiple requests.

The packet mirroring device may obtain T1 time when an initial client request packet is arrived at the packet mirroring device, T2 time when a last client request packet is arrived, T3 time when an initial acknowledge packet is arrived from the server and T4 time when a last acknowledge packet is arrived from the server, through an arrival time of a mirrored packet.

At this time, request time information among the latency indicators may represent an interval from a time when multiple request are transmitted from the client to the server to a time when the request is arrived at the server. In relation to this, the packet mirroring device may know the time when the initial request packet is started from the client based on T1 timing using a half value of the cRTT. In addition, using the half value of the sRTT, the time when the last request packet is actually arrived at the server. Through the arithmetic analysis, it may be calculated "request time=cRTT/2+(T2−T1)+sRTT/2". Generally, since the sRTT value is very small, it is calculated by an approximated value of cRTT/2+(T2−T1) value.

Next, the response waiting time (latency) represents a response waiting time until the server receives contents or data associated with a request from URL which is associated with a request of the client. That is, assuming that the server performs a transmission of data to the client immediately after receiving the data, the response waiting time represents the time until the server receives first data in relation to a request from the URL. This is calculated as a value of (T2−T3) subtracted by the sRTT value consequently. Here, since the sRTT value may be a negligible small value, "T2−T3" may be the response waiting time.

Next, the response data transmission time (response time) represents a time consumed for the server to transmit contents in relation to a request to the client. This is calculated by using the equation "response time=sRTT/2+(T4−T3)+cRTT/2". Considering that the sRTT is very small value, this is almost identical to (T4−T3)+cRTT/2 value.

When the client calculates a used time from transmitting a request to receiving the entire response data in relation to the request, since this is a summation of the request transmission time, the response waiting time and the response data transmission time consequently, the used time is calculated by using "used time=(T4−T1)+cRTT".

Figure 9:
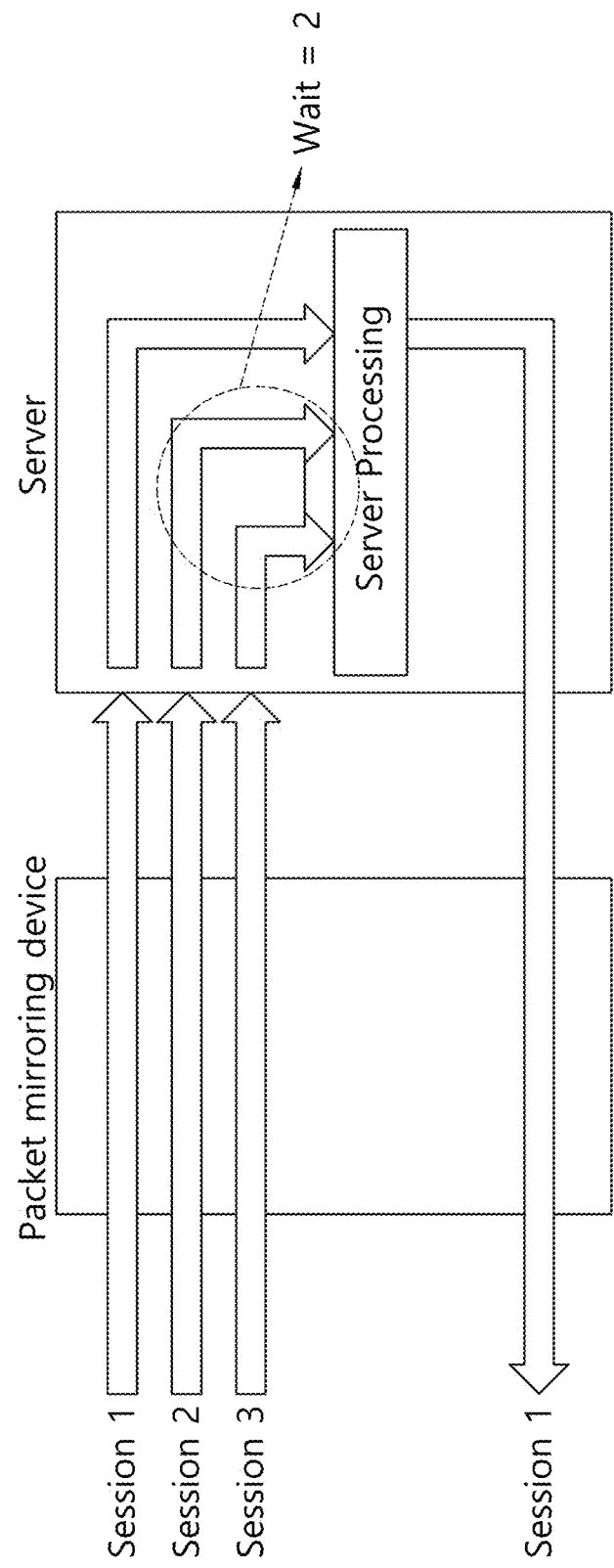
FIG. 9 is a conceptual diagram illustrating a server response waiting session number indicator calculated in a packet mirroring device according to an embodiment of the present disclosure.

FIG. 9 is a conceptual diagram illustrating a server response waiting session number indicator calculated in a packet mirroring device according to an embodiment of the present disclosure.

Referring to FIG. 9, since a server processes at least one request from multiple clients, even a single server processes a plurality of sessions in relation to the requests. In this case, when a processing time at the server becomes longer, a waiting time at a client also becomes longer, which requires patience of a user of a client device. Accordingly, the response waiting session number information at the server has very important meaning.

The response waiting session number is calculated as the number of remaining sessions subtracted by a session in which actual response data is transmitted to the client through a processing in the server among a plurality of sessions. For example, in the case that only a response to one session is done for three sessions, the response waiting session number is calculated as wait=3−1=2. That is, the packet mirroring device is present between the client and the server and securable for all mirroring packets for an actual packet which is transmitted and received therebetween, the response waiting session number which is processing in the current server may be clearly identified.

According to an embodiment of the present disclosure, it may be identified whether a processing for a specific request is completed in the server based on whether a response packet for a request for a specific URL is transmitted to the client based on a source ip and a destination ip. The response packet may be identified by checking whether the destination ip and the source ip are included in a reverse order to the request packet while the response packet is associated with the specific URL shown in the request packet.

Figure 10:
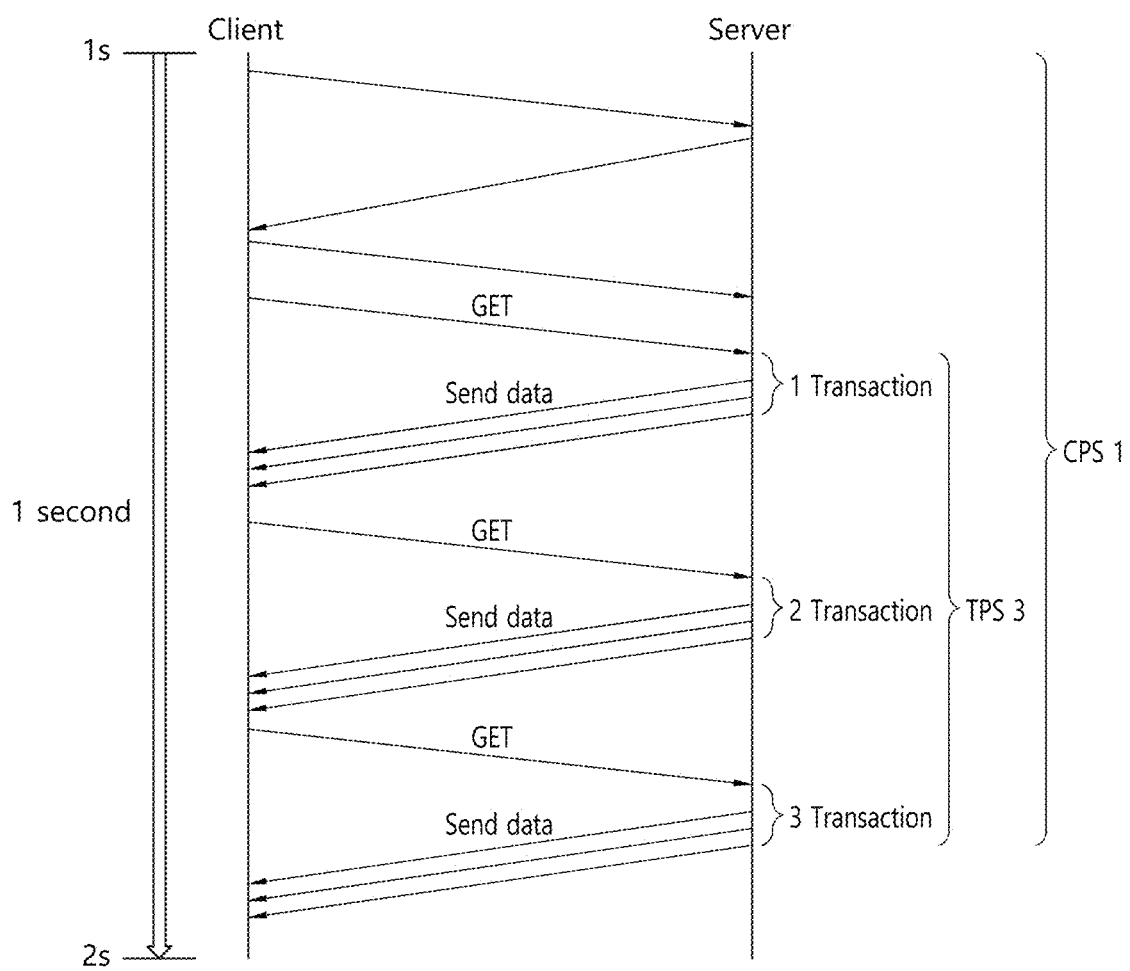
FIG. 10 is a conceptual diagram illustrating Connection Per Second/Transaction Per Second (CPS/TPS) indicator calculated in a packet mirroring device according to an embodiment of the present disclosure.

FIG. 10 is a conceptual diagram illustrating Connection Per Second/Transaction Per Second (CPS/TPS) indicator calculated in a packet mirroring device according to an embodiment of the present disclosure.

Referring to FIG. 10, a transaction includes at least one request between a client and a server and at least one response data packet according to the at least one request. In the embodiment of FIG. 10, three response data packets are included in a single transaction for a single GET request, and this does not necessarily include 1:3 relation, but it is also fine to have the relation that there are more request packets but there are fewer corresponding response data packets in response to the request packets.

The transaction may also have important meaning in relation to speed and latency of a network service. Accordingly, the packet mirroring device calculates the number of newly attempted transactions per second. This is referred to as TPS. In addition, the number of connections between a specific client and a specific server may be called a connection, and the number of newly attempted transactions per second is calculated. This is referred to as TPS.

In addition, User Per Second (UPS) information that represents the number of connected users per second and BPS information that represents the amount of data transmitted and received per second through a specific server or a specific session are also calculated periodically. PPS information that represents the number of transmitted and received packets per second, HPS information that represents the number of URLs requested per second and SPS information that represents the number of servers connected per second are also calculated periodically.

In the embodiments of FIG. 7a to FIG. 10, it is exemplified the embodiment that the packet mirroring device is present between a client and a server and calculates various types of indicators associated with network latency between the client and the server, but the packet mirroring device may be present among multiple servers of a server group and calculate latency among servers. For example, the packet mirroring device may be present between a web server and a WAS server and calculate latency indicator between the web server and the WAS server. The packet mirroring device may be present between a WAS server and a DB server and calculate latency indicator between the WAS server and the DB server. Furthermore, multiple packet mirroring devices may be disposed in a server group including multiple servers and calculate a latency indicator for each section, and by sharing the calculated latency indicator with each other, the latency indicator for each section, for each server in the whole server network may be integrally displayed.

According to another embodiment of the present disclosure, a single packet mirroring device may be connected to each of a switch between a client and a web server, a switch between the web server and a WAS server and a switch between the WAS server and a DB server, and the single packet mirroring device may calculate latency indicator for each section and/or for each server in a plurality of server sections.

Figure 11:
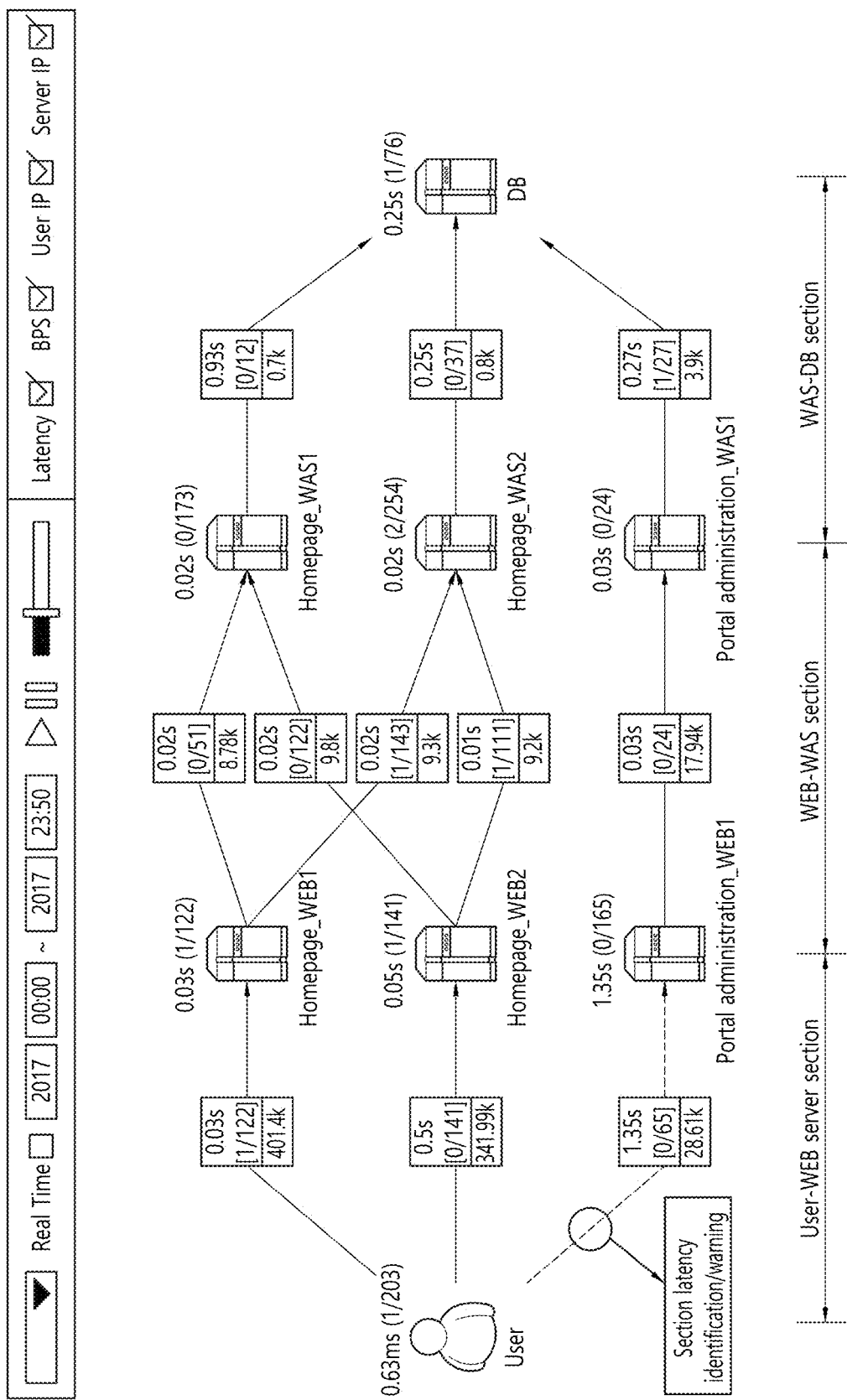
FIG. 11 is a diagram illustrating a Flow map generated based on a performance indicator calculated in a packet mirroring device according to an embodiment of the present disclosure.

FIG. 11 is a diagram illustrating a Flow map generated based on a performance indicator calculated in a packet mirroring device according to an embodiment of the present disclosure.

Referring to FIG. 11, a Flow map includes a user and at least one server and a user and links (associated with a session) between servers. This embodiment shows the system configuration in which a user is connected to three web servers, the three web servers are connected to three WAS s and the three WAS s are connected to a DB.

According to an embodiment of the present disclosure, in relation to the part of visualizing a performance indicator of a packet mirroring device, the packet mirroring device is implemented by a network performance indicator visualization device, and in this case, the performance related indicators do not necessarily use the indicator generated based on a mirrored packet. A packet is obtained in different method, and after the performance related indicators are calculated in the method described above based on information in the obtained packet, the performance related indicators are objectified and it may be generated a flow map, a server list, a user list, a URL list, a session list and a web page analysis page, and the like, that will be described below.

First, in the embodiment of FIG. 11, the packet mirroring device may generate a flow map that represents a traffic flow of a network including each entity based on the calculated performance related indicators. In an upper part of the flow map, a part for configuring a desired time interval is present. In the case that a real time configuration is done, a flow map of a current time is played back. In order to identify a performance of a network service in a past specific time, a flow map of the past time may also be played back. For example, in order to check an interval from the past 11:11 of Jan. 2, 2017 to 01:33 of Jan. 3, 2017, a user set a start time and an end time, and accordingly, it is played back the contents associated with the flow map generated based on the time. In this case, according to the set start time and the end time, a time bar is generated. With respect to the generated time bar, using a control such as fast forward movement, fast reverse movement and playback/stop, a flow map of desired time may be played back. At this time, an indicator may be selected, which is intended to show through each link, each user and each server. For example, the indicator may include at least one of a response waiting time (latency), response waiting session number information (wait), BPS, CPS, TPS and UPS. In addition, it may be selected that an IP address may be shown in each user and each server.

According to an embodiment of the present disclosure, in the flow map, a user and each server display the performance related indicators calculated above. At this time, among the performance related indicators, indicators associated with latency and/or speed of the network may be used. Each of the performance related indicators is objectified and displayed on a specific visualization space. Here, the object is a data object and objectified from the performance related indicators such that the object is shown on the flow map. For example, the object may include data such as a response waiting speed or BPS. Since each of the performance related indicators include time information, the object may be implemented to include time information and mapped on the visualization space. The visualization space represents a display space that shows the object, and a plurality of objects may be expressed in the visualization space.

In generating a flow map, the packet mirroring device determines an entity (e.g., a client, a server or a link between a client and a server) related to the performance related indicators, identifies a performance related indicator, and then, generates a flow map in accordance with a predetermined metadata on the visualization space based on contents of the identified performance related indicator (whether it is BPS, a response waiting session number (wait) or a response waiting speed (latency)) and the entity of the performance related indicator. Particularly, it is a rule that a single performance related indicator corresponds to a single object and expressed with a certain visualization form for each indicator. However, performance related indicators having high relevance (e.g., indicators such as a response waiting speed and a response waiting session number of the same user) may be objectified with a single visualization form. That is, on a single client icon, two data may be displayed together with a predetermined format. So does the performance related indicators associated with a server group and a link.

For example, a latency indicator 0.63 ms such as a response waiting speed (latency) of a user is objectified and expressed on a flow map and an associated visualization space. A link is objectified based on at least one of the performance related indicators among a plurality of entities. A server is objectified based on at least one of the performance related indicators associated with the server and expressed on the visualization space. The latency indicator displayed on the flow map does not necessarily include only the response waiting speed but may display at least one indicator among about 120 performance related indicators generated according to an embodiment of the present disclosure. At this time, the displayed response waiting speed may represent a current response waiting speed. In the case that there is a plurality of response waiting speeds in a plurality of links, according to a user configuration, a fastest response waiting speed, an average response waiting speed and/or slowest response waiting speed may be displayed.

In addition, in the flow map, in relation to a user and each server, total session number information with which the user is currently associated and session number information under waiting process may be shown in a form such as "1/203".

According to an embodiment of the present disclosure, a user may be displayed as a user group of a specific region. For example, users in a company may be displayed as group users related to a company, and in this case, the number of related users may be separately shown. In addition, the users in a group may be sorted as group 1, group 2, and the like. At this time, the criterion of sorting may be directly configured by a manager or automatically configured based on information related to a region, an organization and/or IP. Furthermore, the performance related indicators for the sorted users may be separately processed. The meaning of separate processing means that it is generated as a separate object when it is objectified in a flow map. That is, in the group of 50 company members, group 1 may be sorted as 15 persons and group 2 may be sorted as 35 persons. At this time, user 1 represents performance related indicators of 15 persons of group 1, and group 2 may be objectified based on the performance related indicators of the remaining 35 persons and marked on the flow map.

The server may show the session number information, which is on processing, not completed in processing in comparison with total session number connected to the server like "1/122". Here, the information associated with a session may be represented changeably to information associated with a transaction and/or information associated with a connection (or link) according to a user configuration. That is, about 120 performance related indicators calculated in the packet mirroring device described above may be properly shown on the flow map.

In the embodiment of FIG. 11, each link is associated with sessions in both sides of packet transmission and reception. In the information displayed with being objectified in a square box shape in the middle of link, latency speed indicators such as a response waiting speed, response waiting session number information and BPS may be included. For example, in the case of a user and homepage_WEB 1, a response waiting speed of 0.03 s is shown for a specific packet between two entities currently, and 122 sessions are present. It is identified at a glance that most of them are processed and only one session is in a response waiting state. In addition, a service is performed with high speed of 401.4 k of BPS.

On the other hand, between portal administration_WEB 1 at a lower side and the user, very low speed of 1.35 s is shown as a response waiting speed, and it is shown a ratio 0/65 of a response waiting session number in comparison with the total sessions currently and relatively slow BPS of 28.61 k. Accordingly, owing to the low response waiting speed and BPS, a warning in relation to "section latency" is marked in the link. The warning sign may be expressed through a method of distinguishing the link by a color of line that represents the link and a method of distinguishing the link by a thickness of line or a shape of line. For example, a threshold value associated with a plurality of response waiting speeds is configured and the configured threshold value is compared with a current response waiting speed value, and accordingly, a state is distinguished. The state may be determined by a Rule set described below and distinguished into multiple sections through a plurality of threshold values. For example, it may be distinguished with states such as "normal", "warning" and "problem occurs", for example, and the state may be determined based on a comparison result with the threshold value. There is a visual expression corresponding to the determine state, and the corresponding state may be marked with the corresponding visual expression. For example, a scheme may be used that the worst state is marked with red color that represents "problem occurs" and the next worse state is marked with yellow color that represents "warning". That is, different visual expressions may be shown for each of a plurality of sections that corresponds to a plurality of threshold values. The visual expression includes at least one change of a color, a thickness and a shape of the object. Particularly, with respect to the state in relation to the link, "normal" state may be marked with a black line, "latency" state may be marked with a red line, "network problem" state may be marked with a block dotted line and "network latency" state may be marked with a red dotted line such that an operator may understand intuitively at a glance.

Additionally, in the flow map, the web server is interlinked with at least one WAS server. Particularly, two web servers (homepage_WEB 1 and homepage_WEB 2) at an upper side are connected to two WAS servers (homepage_WAS 1 and homepage_WAS 2) with establishing multiple links. That is, the web server (homepage_WEB 1) is connected to two WAS (homepage_WAS 1 and homepage_WAS 2), and the web server (homepage_WEB 2) is also connected to the two WAS (homepage_WAS 1 and homepage_WAS 2). Accordingly, four links are generated, and performance related indicators are shown for the four links, respectively.

In such a scheme, the web server_WAS section and the WAS-DB section as well as the user-web server section may be expressed. Using the visual expression, the user may identify a section and a server in which a problem occurs on a current or past network service intuitively.

According to another embodiment of the present disclosure, it is not necessarily shown with three sections of the user-web server section, the web server_WAS section and the WAS-DB section, but shown with one section (e.g., the user-server section) or the DB server section is stratified with multiple layers and represented multiply such as DB slave, DB master and DB end. So does the web server or the WAS. The entire flow map configuration may be generated through a user configuration (this may be stored as metadata).

In relation to a generation of the flow map, the packet mirroring device may configure the web server, the WAS server and the DB server associated with the user request based on the central user (i.e., IP of the client terminal) based on the mirrored packet analysis contents. That is, the server group in relation to a destination IP and/or URL in the mirrored packet may be extracted as an element of the flow map, and the relationship of the flow map may be generated and visualized based on IP of each of the extracted server. Alternatively, a central specific server is firstly configured, and the flow map may be generated by interlinking the user that sends a request to the server, a configured server and associated other servers.

The metadata associated with the flow map configuration may be prestored in the service database (532 of FIG. 5). The metadata may store a color, a font, a position of physical file, a tile background, and the like as well as information related to a shape of target object (e.g., a user, a server and a link) which is objected and the position coordinate. This will be described in more detail.

FIG. 12 is a table illustrating an example of configuration values for determining whether a warning associated with a network performance is occurred in a packet mirroring device according to an embodiment of the present disclosure.

Referring to FIG. 12, in expression of a flow map or other visualized expression, a packet mirroring device displays a warning by comparing performance related indicators associated with a current network service with various threshold values and supports a user to prevent a big traffic problem in advance. Accordingly, in relation to warning determination, configurations of various threshold values may be required.

Generally, the determination for warning situation may be divided into a server warning and a section warning. With respect to a server section, the determination may be performed based on a server state (service down), a part for service down, a session number, a response waiting session number, a response waiting time, CPS, TPS, BPS, HTTP 40× or 50× error. The section warning may be determined based on the response waiting session number and the response waiting time.

As shown in FIG. 12, the packet mirroring device determines whether a problem of network service occurs based on at least a part of the performance related indicators. Based on the response waiting time (latency) information that represents a response latency time until the server receives a first data associated with contents from a URL associated with a request for the contents of a client and the response waiting session number (wait) information that represents a session number of a state of fail to receive a response for the request sent by the client, it may be determined web traffic latency, WAS traffic server latency, WAS traffic Wait excess, DB traffic latency, web WAS section latency occurrence, and the like. The packet mirroring device may determine whether a problem occurs through a measurement for a duration during which a value of performance related indicator higher than a threshold value is existed, as a result of the comparison of the performance related indicator with the threshold value.

First, the web traffic latency may occur in the case that a response waiting session number is 70% or more of the entire sessions and a response waiting time exceeds 5 second targeting for all web servers. Depending on a user configuration, when the time is 10 second or greater, it may be determined that there is a problem in the web traffic latency.

In addition, in relation to the WAS traffic server latency, targeting the WAS server, in the case that a state that a response waiting time is 5 second or more is maintained for 5 second or more, it may be determined that a problem occurs. In relation to the WAS traffic Wait excess occurrence, for the WAS server, in the case that a state that a response waiting session number is 70% or more is maintained for 5 second or more, it may be determined that a problem occurs.

The DB traffic latency occurrence may occur in the case that a response waiting session number is 30% or more and a response waiting time exceeds 5 second targeting for all DB servers. Depending on a user configuration, when the time is 10 second or greater, it may be determined that there is a problem in the DB traffic latency.

Furthermore, in relation to the web WAS section latency occurrence, targeting to all web servers and WAS servers, in the case that a state that a response waiting time is 5 second or more is maintained for about 5 second or more, it may be determined that a problem occurs.

In addition, the packet mirroring device may determine whether a problem occurs by comparing a speed related indicator such as BPS with a threshold value. The BPS excess occurrence is targeted for all servers, and in the case that a state that BPS exceeds 50 M is maintained for 5 second or more, it is determined that a problem occurs.

In relation to the CPS excess occurrence is targeted for all servers, and in the case that a state that CPS exceeds 150 is maintained for 10 second or more, it is determined that a problem occurs.

In relation to the 50× and/or 40× error, for all servers, and in the case that a state that HTTP 50× error (or HTTP 40× error) exceeds 5 is maintained for about 5 second or more, it is determined that a problem occurs.

In relation to the wait excess occurrence is targeted for all servers, and in the case that a state that total session number exceeds 1000 and a ratio of response waiting session number exceeds 80% is maintained for about 10 second or more, it is determined that a problem occurs.

Various threshold values in relation to such a problem occurrence, a related duration threshold values, a target server IP and the warning level therefor is changeable by a user configuration.

According to an embodiment of the present disclosure, a warning level may be determined to match such a problematic situation, and a warning state is expressed in accordance with the warning level in the flow map or other various visualization tool according to the warning level. In addition, as a measure matched to a problematic situation, it may be performed an operation of notifying the warning situation with a SMS text, email and/or Social Network Service (SNS) associated with a preconfigured account of a person in charge.

According to another embodiment of the present disclosure, since a packet mirroring device stores data for network performance related indicators depending on a time persistently, the stored data becomes big data. A machine learning algorithm is applied to the big data stored as such, and a rule set may be generated proper for a warning situation adaptively. For example, the packet mirroring device may set a threshold value higher or lower for a WAS server in which WAS traffic latency problem occurs frequently based on data for an average response latency time and/or a response waiting session number of past WAS servers.

In addition, in the state that a response latency time and/or a response waiting session number, BPS or TPS values in a normal range are stored through past big data, in the case that there is a different of a threshold value or greater in an average response latency time and/or a response waiting session number, BPS or TPS values in a normal range, an occurrence of problem is determined.

Otherwise, in the connection relation between a web server and a WAS server or between a WAS server and a DB server, in the case that a service speed latency is occurred intensively in a single server, a speed latency occurrence of a threshold value or greater in comparison with an average speed latency value of other servers is determined and a warning is displayed.

Figure 13A:
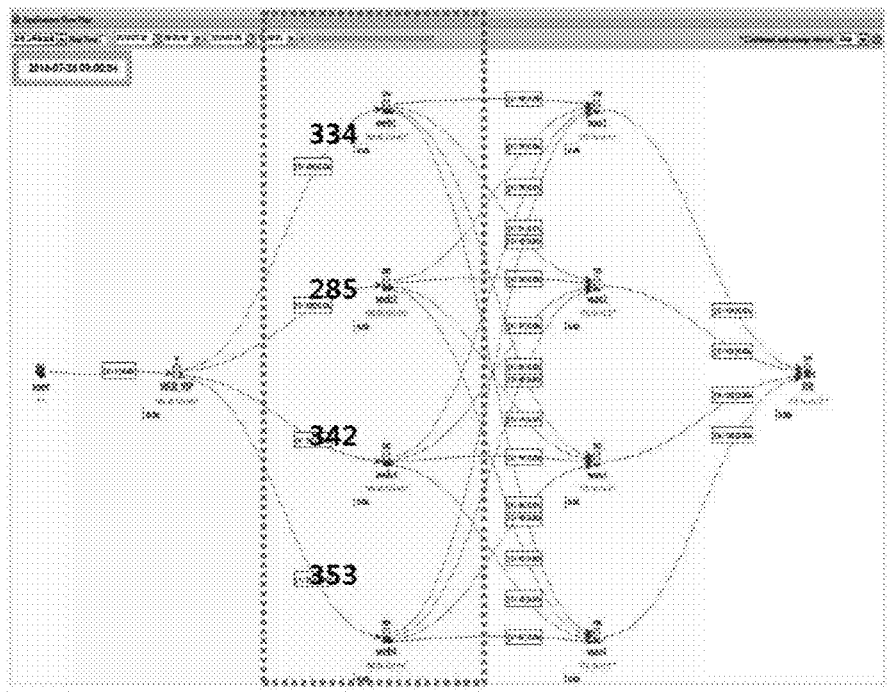
FIG. 13a and FIG. 13b are diagrams illustrating exemplary features of a response speed analysis for each section according to a flow map.
Figure 13B:
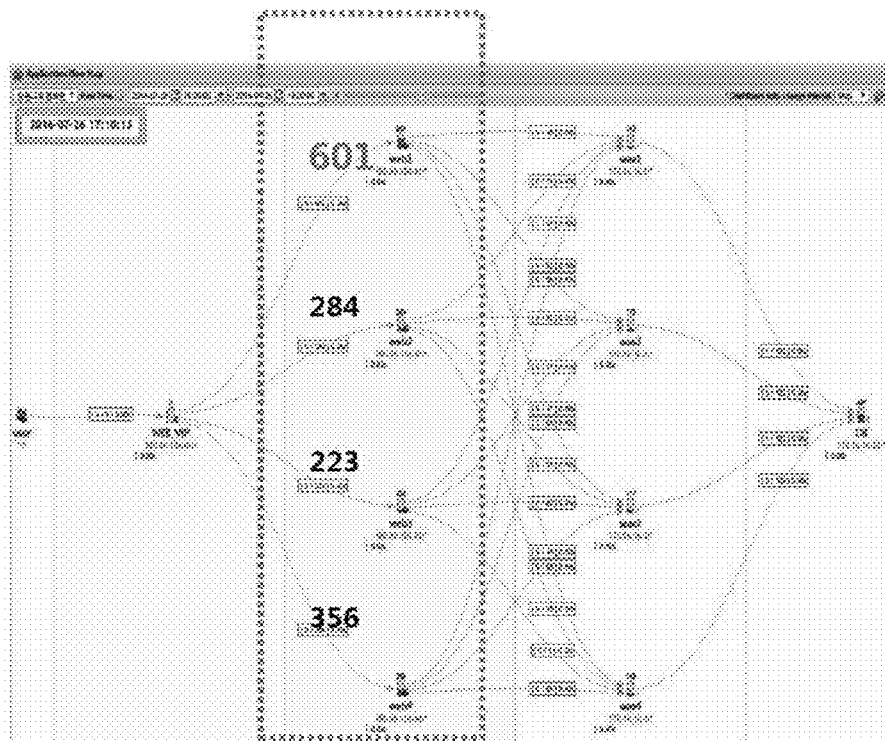

FIG. 13a and FIG. 13b are diagrams illustrating exemplary features of a response speed analysis for each section according to a flow map.

FIG. 13a shows a load balancing situation of morning time zone for a specific network service, and it is identified that the network service is operated as a normal situation. FIG. 13b shows a load balancing situation of afternoon time zone in relation to the specific network service. Here, in a web server at the uppermost side, 601 number of transactions are shown, and it is displayed that excessive number of transactions are processed.

As such, through the flow map, a service state of present and past specific time may be intuitively identified. Since WEB 1 server processes more transactions in comparison with other servers in the afternoon time zone in which many accesses are present in comparison with the morning time zone, this may be notified to an operator using a warning sign such as a magnified figure or a red colored sign. Particularly, such a warning sign may be performed through a comparison with other servers. That is, in the case that an amount of processing transaction in a specific server is significantly greater than an average amount of processing transaction in multiple servers present in a position on a uniform server section, an occurrence of problem may be determined through comparison with a configured threshold value and a warning may be notified.

Figure 14:
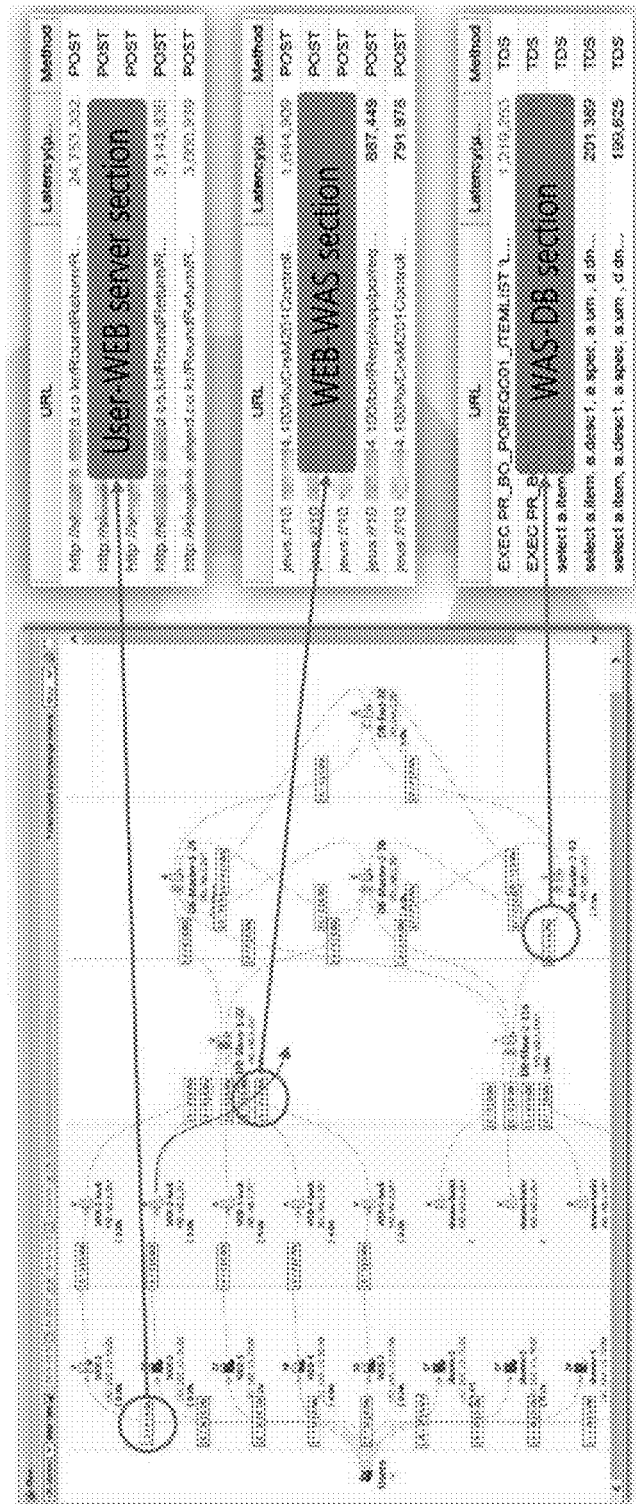
FIG. 14 is a diagram illustrating a feature of dashboard for visualizing performance indicators between a user and a server.

FIG. 14 is a diagram illustrating a feature of dashboard for visualizing performance indicators between a user and a server.

Referring to FIG. 14, a flow map identifies a problem for each user, for each server and for communication section and visualizes it. This may be updated in a predetermined period (e.g., 1 second). In the case that it is wanted to examine a detailed performance related indicator for a specific link in the flow map specifically, when the link is clicked, then it is identified the detailed performance related indicator therefor.

When one of a plurality of links in a user and a web server section, the performance related indicators of URL information associated with the link, response waiting time information and method information list of packets may be output. In the section between a web server and a WAS and a section between a WAS and a DB server, a list of the related performance related indicators may be output. Through this, when a user requires a detailed analysis for a problem for a specific section, the user may identify it in detail with watching detailed items for the related performance related indicators. The performance related indicators displayed in the list shown in each section may be different with each other.

Particularly, in the case that it is represented that there is a problem in a specific link, the specific link is determined as a parameter, and detailed items list associated with the specific link which is a parameter is called. And then, the detailed items list is displayed. At this time, the packet mirroring device displays the performance related indicator (e.g., performance related indicator showing an indicator higher than a threshold value) that causes a problem to be differently displayed visually from the indicators of a normal range with a red color in the list, and accordingly, a user may identify the detailed cause at a glance. That is, the flow map and the problem occurred part of a related list/page may be displayed to be matched with each other based on the parameter.

According to an embodiment of the present disclosure, a configuration related to drill-down movement to a specific page (or list) in a specific map may be stored through a user configuration and changeable as a template desired by a user. That is, the page (or list) may have hierarchy Information, and when a specific area of the list is clicked, with the information associated with the area as a parameter, the packet mirroring device loads a page (or list) of a lower layer having the same parameter.

Figure 15:
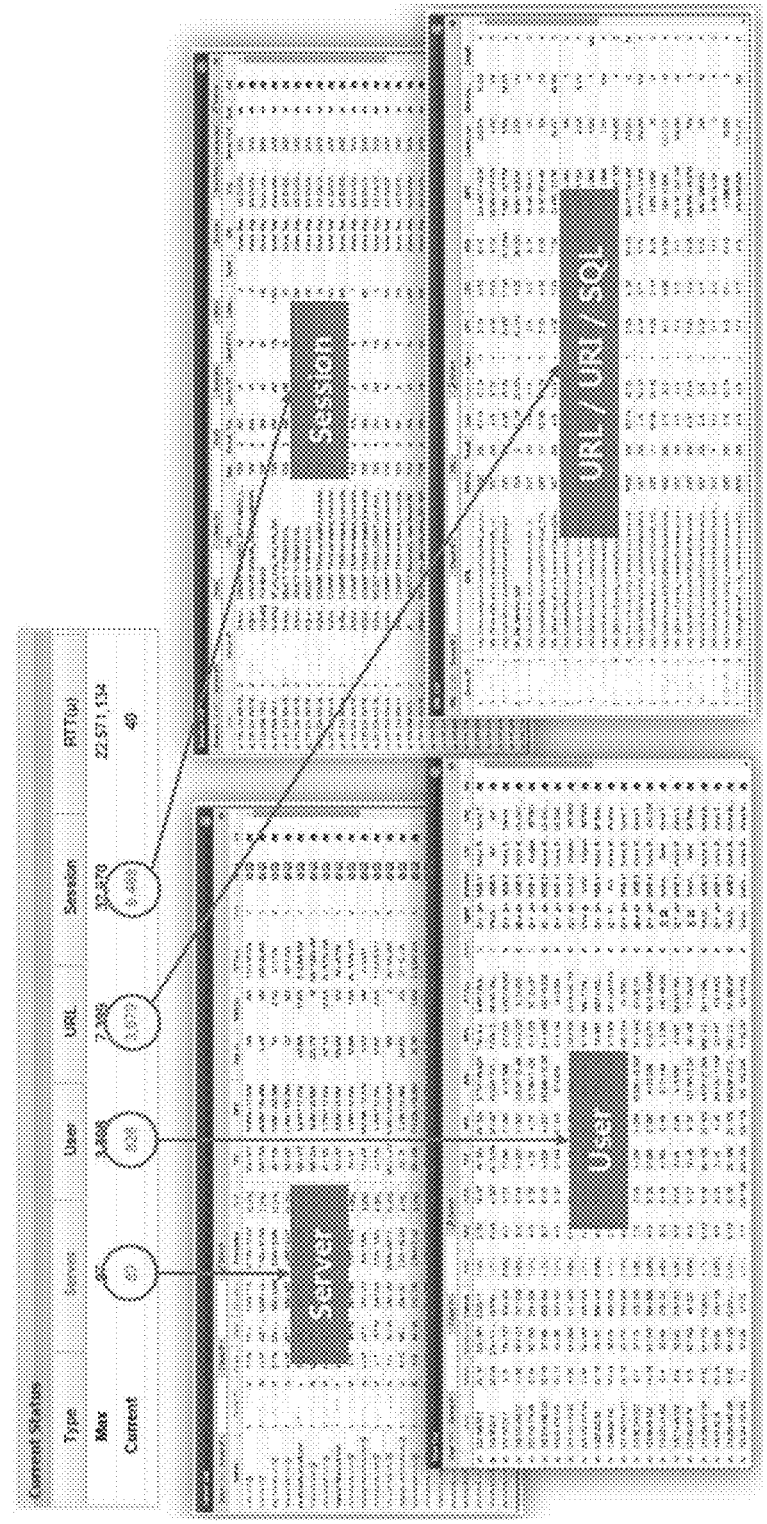
FIG. 15 is a diagram illustrating a page in which a server, a user, a URL and detailed traffic for each session are monitored.

FIG. 15 is a diagram illustrating a page in which a server, a user, a URL and detailed traffic for each session are monitored.

Referring to FIG. 15, a packet mirroring device may display a current state in a table format so as to be identified at a glance with performance related indicators of a server, a user, a URL and a session associated with the packet mirroring device. The packet mirroring device may generate a list for each of a server to manage, a user associated with the server, and a URL and a session in relation to a network. This is performed by monitoring and storing detailed traffic in relation to the list periodically (e.g., a unit of 1 second). Here, the Max part represents a maximum value associated with the server like server_max_xxxx information (e.g., server_max_user information). That is, the Max part may represent the maximum number of servers to manage, the maximum number of users of the server, the number of URLs and the number of sessions, and the Current part may represent the number of servers currently used in real time, the number of users, the number of URLs and the number of sessions.

In this case, when the server is clicked, like the drill-down scheme of FIG. 14, a server list is displayed, which includes information of servers which are currently managed by the packet mirroring device. The server list may display a name of server to manage, a server IP, a country, the number of users, the number of sessions, the number of transactions, the number (ratio) of response waiting sessions, TPS, BPS, the APP latency, web latency, RTT, an error, information related to states, and the like.

When the user part is clicked, the packet mirroring device displays a user list including information of users associated with all clients associated with the current server to manage. The user list may display an IP of client terminal, a server currently connection requested by a user, a session, a transaction, the number (ratio) of response waiting sessions, SPS, CPS, TPS, HPS, BPS, PPS, RTT, an error, an agent, a web browser, a city, information related to an organization, and the like.

When the session is clicked, a session list including information of sessions currently managed by the packet mirroring device is displayed. The session list may display an IP of client terminal of a user related to the session, an IP of server associated with the session, a related URL, a method, a result code value, the number of transactions, a response waiting time, an agent, a city, an organization and state information.

When the URL is clicked, a URL list including information of URLs currently managed by the packet mirroring device is displayed. The URL list may display an IP of server associated with the URL, a URL address, a method, a result code value, the number of sessions (the number of sessions currently connected in comparison with the entire sessions), a response waiting session number, UPS, CPS, HPS, BPS, a response waiting time, the number of downloads, information related to length.

In the right end side of each list, there is an icon signed as Act. When the Act icon is clicked, a specific server is displayed in the server list, a specific user is displayed in the user list, a specific session is displayed in the session list, and a detail of packets associated with a specific URL is displayed in the URL list. Here, a variable mediating a switch between lists is referred to as a parameter, and in this embodiment, a specific server (e.g., WEB_administration portal 1 server), a specific user, a specific session and a specific URL become parameters. That is, in a switch of list, for a request for detailed items (this may be regarded as a list switch request) through a user click, a specific parameter by the click is determined, and then, a different shape of list associated with the specific parameter is displayed. The switch of list and the drill-down movement of pages having higher-lower layer relation are described in detail below.

Figure 16:
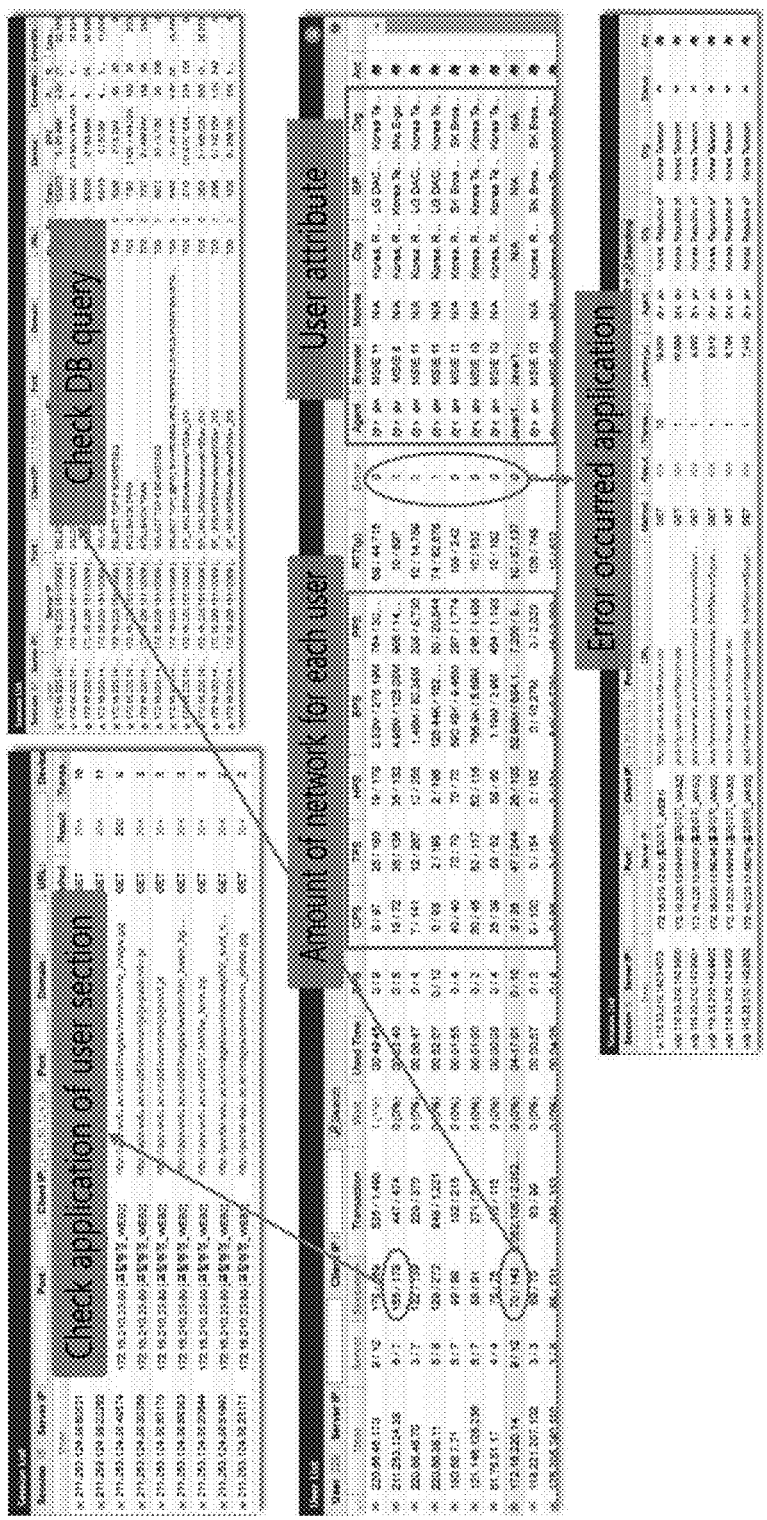
FIG. 16 is a diagram illustrating a page for identifying a content for detailed session information and an error of application.

FIG. 16 is a diagram illustrating a page for identifying a content for detailed session information and an error of application.

Referring to FIG. 16, as described above, each of the lists managed by the packet mirroring device may be displayed with a connection relation, a parameter. That is, when a specific session of a session list is clicked, the specific session is determined to be a parameter, and a user list, a server list, and the like in relation to the specific session may be identified. In this case, since the information included in the mirrored packet and the information related to performance related indicators are stored with time information, detailed information included in each list may also have time information, and detailed items on a timing desired by a manage may be returned.

In the embodiment of FIG. 16, in the user list, when a specific session is clicked, as a parameter for the corresponding session, information related to the parameter session is extracted, and a new session list is displayed (refer to the list at top left of FIG. 16). Here, when a session of a specific user is clicked, the packet mirroring device determines a session of the user associated with the clicked area to be a parameter, and extracts data related to 155 sessions which are currently connected among maximum 178 session data associated with the specific user and displays it in a list form. That is, the user may identify an application related to the specific session associated with the user with watching the session list. The corresponding session list may display an IP of a client terminal of a user related to the sessions of the specific user, an IP of a server associated with the server, a related URL, a method, a result code value, the number of transactions, a response waiting time, an agent, a city, an organization and state information.

In addition, in the user list of the embodiment of FIG. 16, in the session (70/143) of 172.18.220.14 user, a session list associated with the session is displayed like the list shown in a right end of the left side. Here, it is identified a user, a server IP and a related URL. In addition, particularly, a DB query is identified. For identifying the DB query, the packet mirroring device extracts contents of packets associated to a DB query sentence sent to a specific DB server and network performance indicators of the packets and generates and visualizes it in a list form.

Furthermore, as described above, the user list may display information associated with a use amount of network for each user such as CPS, TPS, HPS, BPS and PPS. In addition, it may be identified information of an agent, a web browser, whether it is a mobile device and information of a city, an ISP and an organization, and information associated with an error occurrence is displayed. In this case, when the error part is clicked, stored information having an error code that a user wants to see is extracted, and a session list is generated and displayed based on information of sessions associated with the extracted information. In the embodiment of FIG. 16, it is displayed that total 6 errors are occurred in the user list, and when the error part is clicked, 6 sessions related to the 6 errors may be displayed in a form of session list.

Figure 17:
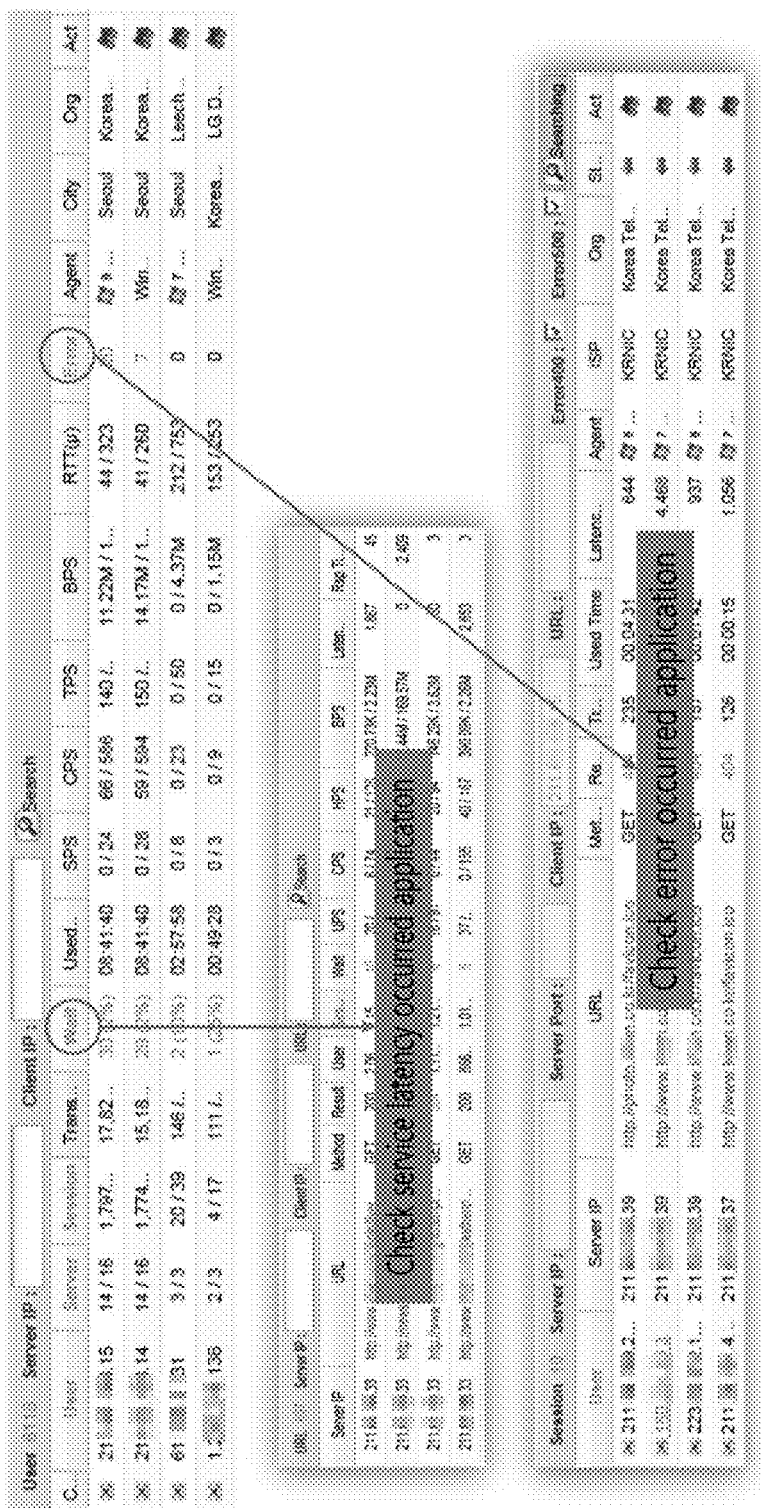
FIG. 17 is a diagram illustrating a page of identifying a correlation associated with a problem factor by a Drill-Down scheme.

FIG. 17 is a diagram illustrating a page of identifying a correlation associated with a problem factor by a Drill-Down scheme.

Referring to FIG. 17, during outputting a user list through a packet mirroring device, in order to identify an application in which service latency occurs, when a response waiting session number (Wait) part is clicked, it may be displayed a URL list and/or a session list representing the response waiting session number of a specific threshold value or greater or a specific threshold ratio or greater. A user may watch the URL list and/or the session list and may clearly identify the application in which service latency occurs currently. And then, the user may rapidly respond it and take a measure for it.

In addition, in order to watch details of the error part, in the session list, when error 400 and error 500 are clicked, a session list including the sessions related to the error is output, and the user may identify the application associated with the error occurrence while watching the session list associated with the error occurrence.

Figure 18:
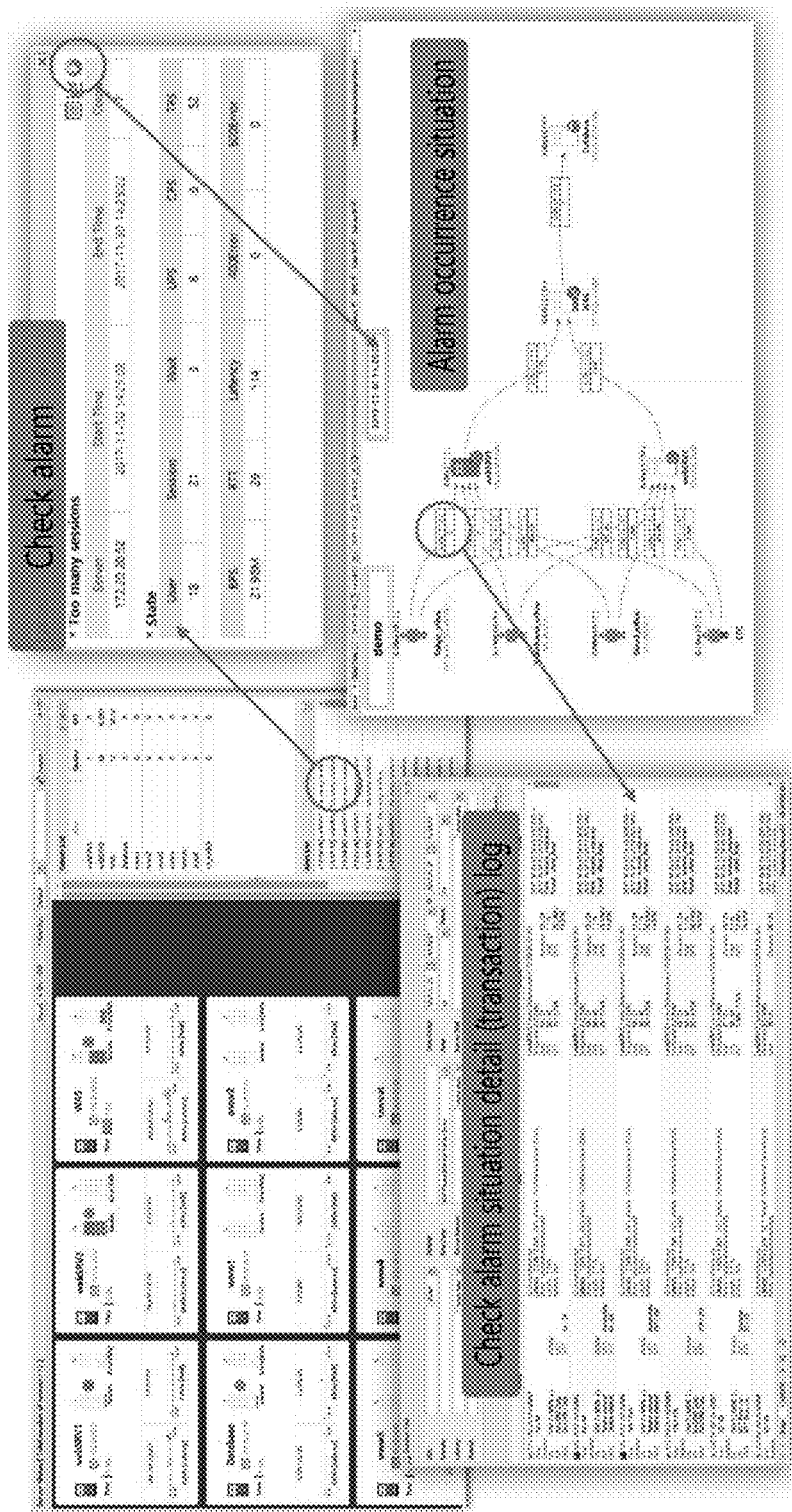
FIG. 18 is a diagram illustrating a procedure of identifying a real time service state for each server and detailed information on each warning.

FIG. 18 is a diagram illustrating a procedure of identifying a real time service state for each server and detailed information on each warning.

Referring to FIG. 18, a real time service state and detailed information on each warning for each server may be identified. A packet mirroring device according to an embodiment of the present disclosure may generate a page of displaying server state information. A server name and a server IP are displayed in the page, and it is displayed the number of sessions which is currently connected among the allowable total sessions. This may be expressed in the form that a predetermined part is filled in an empty box shape. That is, 10% may be expressed in the form that a color is filled in only one box among 10 empty boxes. In addition, information related to the number and/or ratio may also be expressed in the box shape. Furthermore, it may be displayed graphs of change of response waiting time depending on time and change of response waiting session number depending on time together. As such, the packet mirroring device displays the server state information such that multiple parts are disposed on a page, and a user may identify the state information on at least a part of servers among the servers managed by the packet mirroring device at a glance.

In this case, a server list may be displayed in a table form at a top right side of the server state information, and the warnings associated to a server to manage may also be displayed in a list form at a bottom right side of the server state information. Among these, one part (e.g., warning part of "too many sessions") is clicked, a detailed item associated with the warning in the clicked area is displayed (refer to a top left window of FIG. 18). In response to the warning detailed item request, the packet mirroring device extracts performance related indicators on the corresponding timing of the server, and therein, extracts indicators associated with an error. And then, the packet mirroring device displays the information related therefor (e.g., including a server IP, a start time and an end time of problem occurrence related to the warning) in a list. The number of warnings is also displayed. In addition, as state information, it is displayed performance related indicators such as the number of users associated with the session, the number of sessions, a response waiting session number, UPS, CPS, TPS, BPS, RTT, a response waiting time, 400 error and 500 error.

In the warning item part, when a playback icon is clicked, a start time and an end time related to warning are automatically set, and a flow map in the corresponding time zone is played back (refer to the flow map at a bottom right side of FIG. 18). Here, it may be detected an abnormality of a link or a server associated with a specific session.

At this time, when the link related to the alarm situation, it may be identified an alarm situation detailed log of sessions (particularly, transaction) associated with two subjects (Tokyo_office) and a server (webSRV1) of a link on the corresponding timing (refer to log data at a bottom left side of FIG. 18). This includes a log for a transaction in the corresponding time zone. Here, it is displayed a client IP, the number of users, OS, ISP, RTT as client detailed information, and it is displayed a URL address, response waiting time information, a length, a referrer and the like as related URL information. In addition, it is displayed a server name, a response waiting time, a user, a session, TPS, response waiting session number information, RTT and BPS information as server information. Furthermore, a time duration during which the transaction is present is displayed as time information, and it is displayed together current state information, for example, information whether it is a situation of waiting a response from a server in a session (session_response) and result information (e.g., client_finish).

Figure 19:
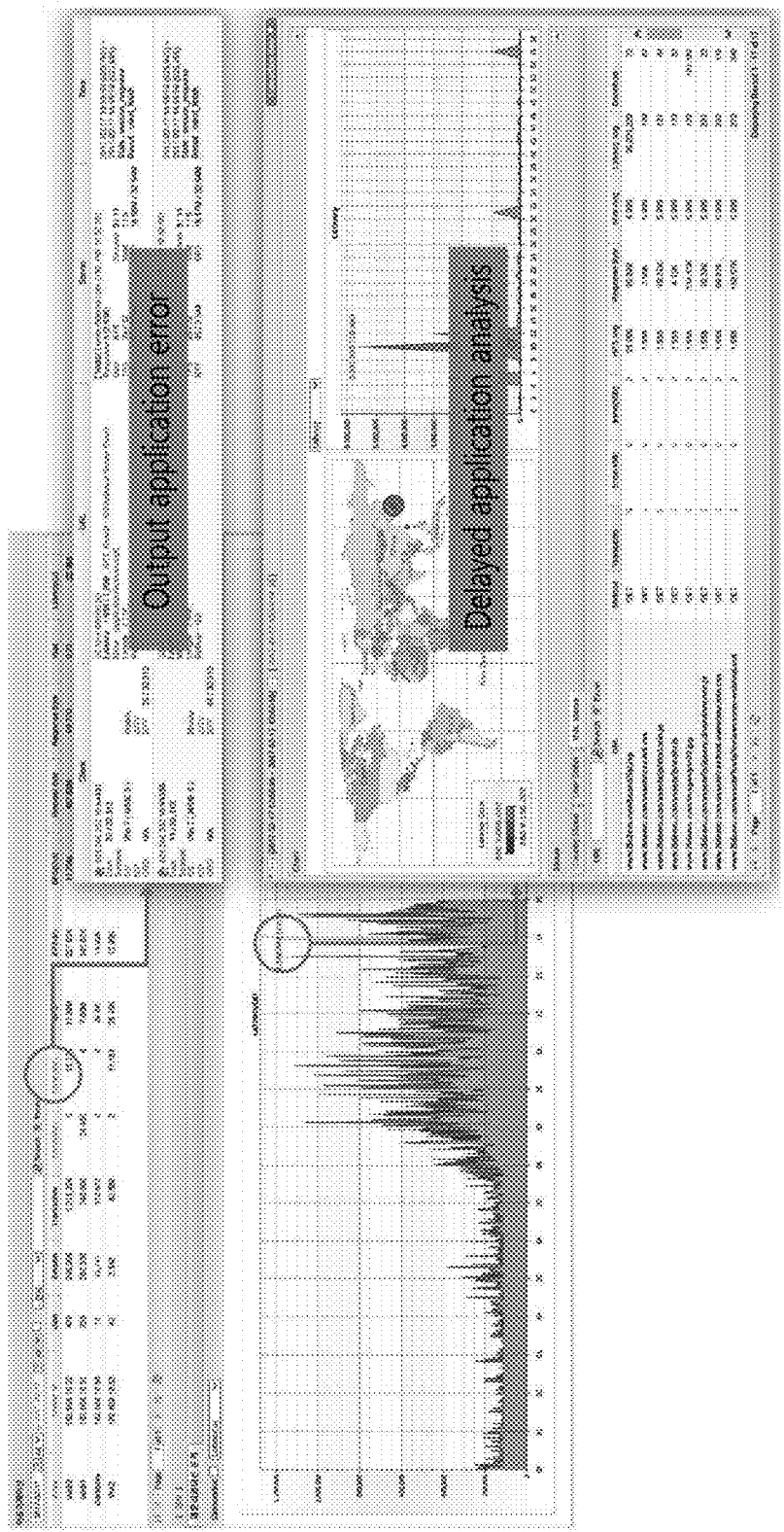
FIG. 19 is a diagram illustrating a diagnosing analysis page for a detailed log of an application.

FIG. 19 is a diagram illustrating a diagnosing analysis page for a detailed log of an application.

Referring to FIG. 19, a packet mirroring device may arrange information related to an application as an application list and display it (a top left list shown in FIG. 19). Here, it is displayed a name and IP of a server associated with the application, the number of users, the number sessions, the number transactions, error information, BPS, an amount of requested data, an amount of responded data, a response waiting session number, response waiting time information, and the like. At this time, if it is desired to watch a part related to an error of the application, the error part may be clicked.

Then, the packet mirroring device determines the part related to the clicked area to be a parameter. And then, the packet mirroring device finds transaction data associated with the application, which is a parameter. In addition, among them, the packet mirroring device extracts data marked by an error sign and outputs log data related to the error of the application. This is transaction log data and displayed in the similar form as the bottom left log list of shown in FIG. 18. Here, it is identified a timing on which the application error occurs and a section between a client and a server in which the application error occurs.

In addition, the packet mirroring device may display a response latency time of a specific application in a graph form depending on time. Particularly, when a specific timing is clicked, the packet mirroring device specifies the clicked timing (e.g., the timing may be specified in a preconfigured unit (a unit of 1 minute) and extracts packets (or performance related indicator based on it) associated with the application on the specified timing. Here, servers may be expressed in a chart form based on positions of servers related to the application on a map with being interlinked with the map that represents geographical information. In this case, the server may express it in different forms based on response waiting time information (latency) generated during the process of requesting and responding the application.

That is, the server having a first response waiting time is marked in green color, the server having a second response waiting time is marked in yellow-green color and the server having a third response waiting time is marked with yellow color, such that degrees of latency of the servers associated with the application are identified only with the colors in the map. And then, state information may be shown in a bottom part of a chart and a response waiting time graph. The state information includes a country state, a user state, and a URL state. Here, the URL state is information related to a URL associated with the application and may include URL address information, method information, transaction number information, error information, HPS, an amount of response data, average response waiting session number information, average response waiting speed, download number information and the like.

Figure 20:
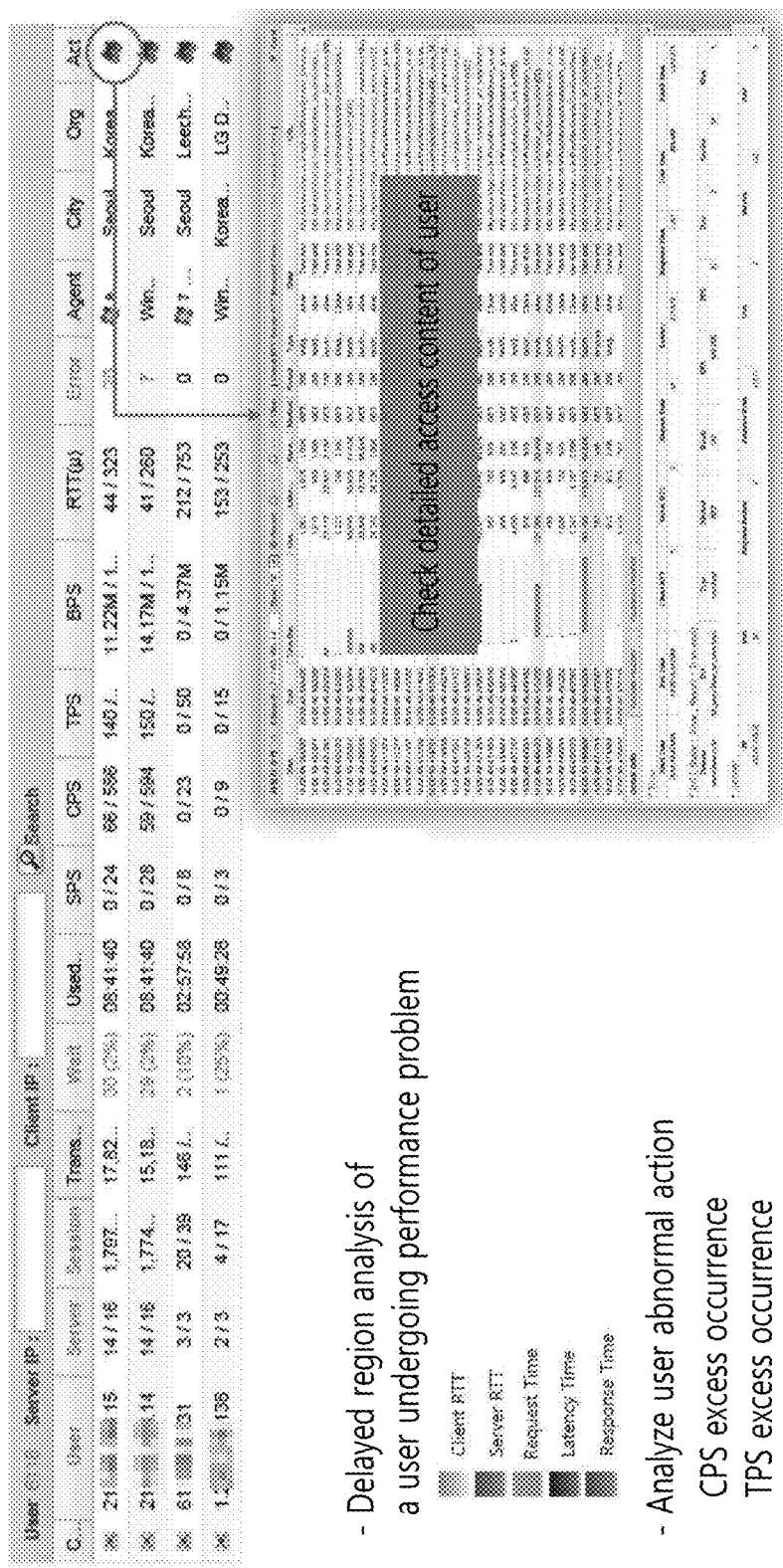
FIG. 20 is a diagram illustrating a process of tracking a user by estimating an abnormal access.

FIG. 20 is a diagram illustrating a process of tracking a user by estimating an abnormal access.

Referring to FIG. 20, a packet mirroring device may track an abnormal access user by using a specific user list. In the user list, when an action icon is clicked, the packet mirroring device may extract all of access contents in a specific time zone of the corresponding user and display it in a list form.

In this case, the packet mirroring device may display a session start time and a session end time in a time bar form in side by side manner for each session based on the specific time zone. At this time, it is not necessarily displayed for each session, but may be displayed for each transaction or for each accessed URL.

At this time, the time bar may be displayed through different visualization expressions. Particularly, a client RTT, a server, a request time, a response waiting time and a response data transmission time are displayed in different visualization expressions (e.g., different colors, different forms, different thickness, etc.). Accordingly, it may be intuitively understood an action in a certain detailed time zone of a specific session.

In addition, the packet mirroring device may extract and display a use time, a response waiting time, a method, a result value, type information associated with a URL and the related URL information.

Additionally, in the case that detailed information related to a specific session is requested, the packet mirroring device may extract data related to a packet associated with the specific session in the corresponding time zone and display time information, cRTT information, sRTT information, a request time, a response waiting time and a response data transmission time in numerical values which are clearer than a time bar. The URL information may also be expressed with a related domain, a URL address, a type, a method, a result, BPS, PPS, the number of users, the number of sessions, response waiting session number information. In addition, as related server information, it may be displayed a server IP, a port, a response data packet number, an amount of response data, the number of users, the number of sessions and response waiting session number information.

Since the packet mirroring device may traceback actions of all users in a specific time zone, a user accessed through an abnormal root may be tracked, and it may be trace backed a user of an abnormal action (e.g., CPS excess, TPS excess and/or error response excessive induction).

Figure 21:
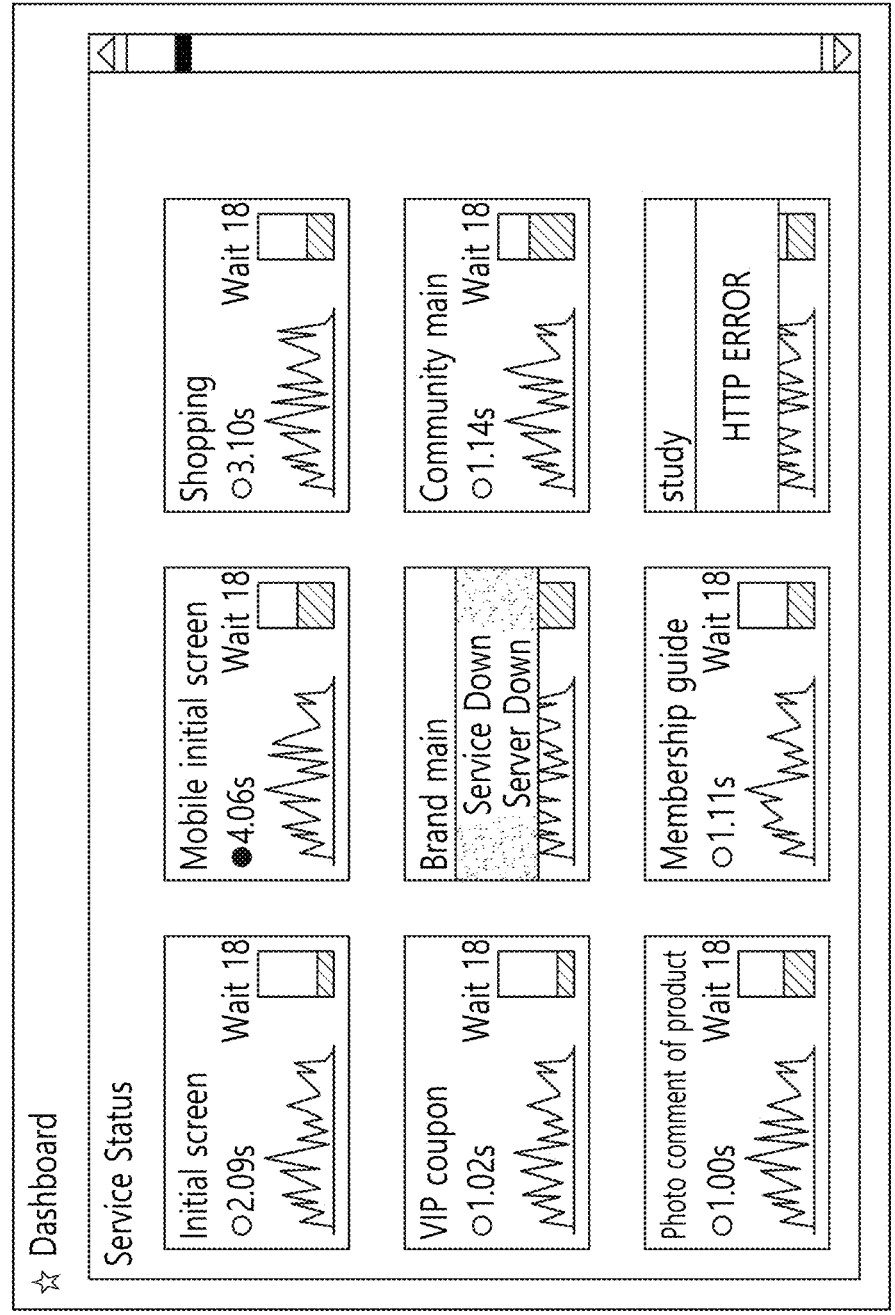
FIG. 21 is a diagram illustrating a page visualizing a user experienced speed until access of a user for each main page.

FIG. 21 is a diagram illustrating a page visualizing a user experienced speed until access of a user for each main page.

Referring to FIG. 21, a packet mirroring device may calculate an arrival time at a corresponding web page based on the web page associated with a user request in a mirrored packet based on the above sRTT, cRTT, a request time, a response waiting time and a response data transmission time information. In addition, in relation to a flow map configuration, the packet mirroring device may calculate a time until receiving response data according to a request transmission based on the number of sessions, a response waiting time according to a session and a response waiting session number (wait) information. That is, the packet mirroring device may calculate a user experienced response speed until a specific web page in a user aspect and display it in a single page. For example, the packet mirroring device may utilize a used time as the user experienced response speed.

The packet mirroring device may display user experienced response times for a plurality of web sites by converting the user experienced response times as time values. In addition, it is compared with a threshold value related to a configured user experienced response time, and in the case that it is a threshold value or greater, the packet mirroring device may determine it as a situation of an important problem being occurred such as a warning, service down and server down.

The packet mirroring device may express the response waiting session number associated with a corresponding web site in comparison with a total allowable number of sessions, as well as the user experienced response time as individual information on a plurality of web sites. In addition, the packet mirroring device may briefly arrange and express a change of the response waiting time according to a time flow through a graph.

Figure 22:
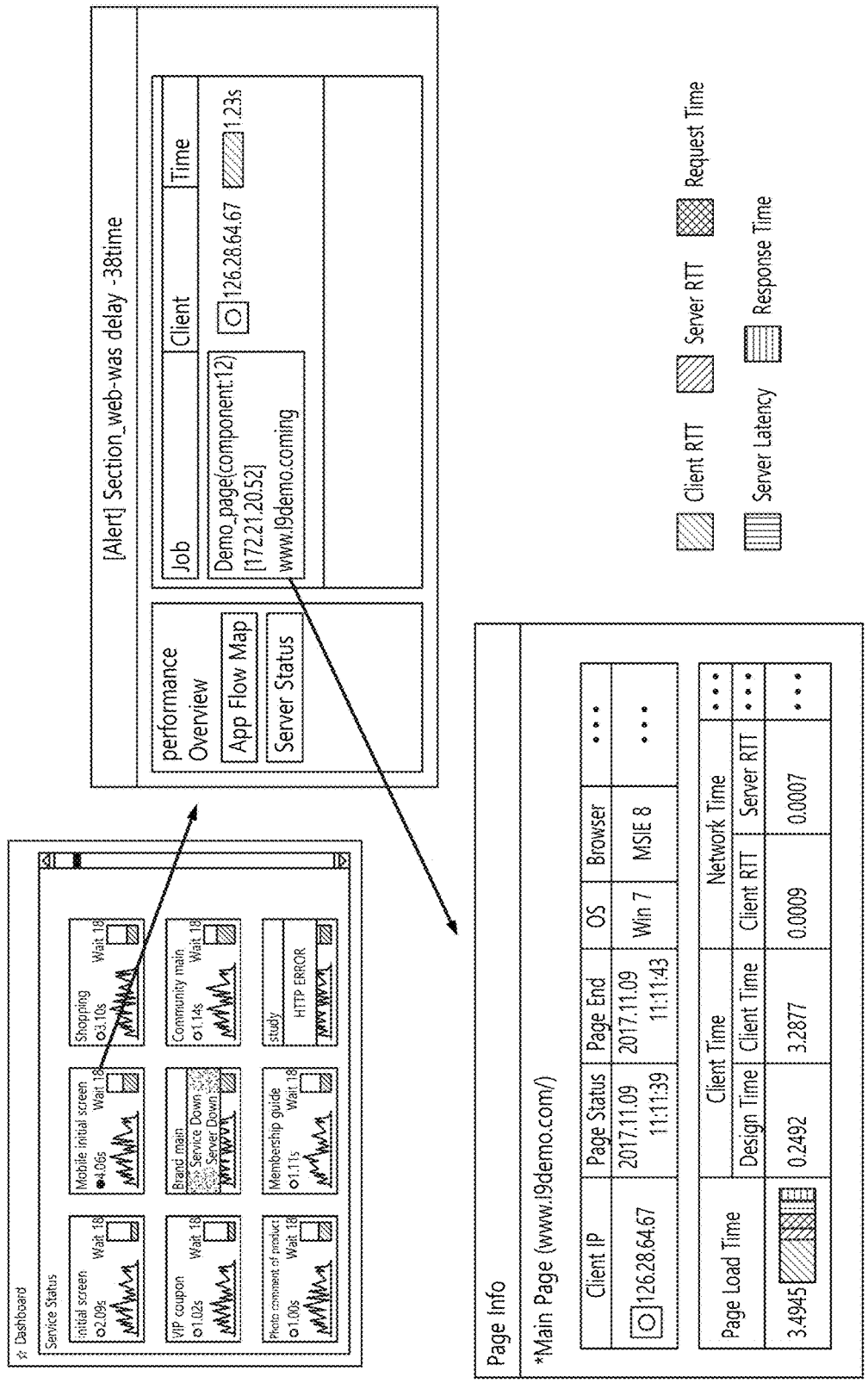
FIG. 22 is a diagram illustrating a page visualizing a user experienced response speed of a user targeted to a main page according to a warning.

FIG. 22 is a diagram illustrating a page visualizing a user experienced response speed of a user targeted to a main page according to a warning.

Referring to FIG. 22, when a web site in a warning state is clicked, a packet mirroring device may display a performance analysis page according to a warning. For example, the performance analysis page may include a warning content for web-WAS latency, and for this, in the analysis page, related actions are arranged and displayed in a list based on information in mirrored packets associated with a speed latency on the timing.

At this time, sessions associated with a specific web site is analyzed, and actions occurred on the timing may be arranged and displayed. For example, it may be extracted an access action to an IP of a server associated with the corresponding web page. In addition, an IP (country, OS and use of mobile may be displayed together) of a client, which is a subject of the corresponding access action and a time consumed for the corresponding access action may be displayed together. Particularly, the consumed time may be divided into cRTT, sRTT, a request time, a response waiting time and a response data transmission time and expressed in a time bar form.

In further specifying it, it may be displayed detailed information on a session generated on a specific time or a transaction (or connection) for a specific web page. In the corresponding page, it is displayed a client IP associated with the session (or transaction), a page start time, a page end time, an OS, a browser, information whether it is mobile, communication company information, ISP information and city information.

In addition, page load time information may be provided in a time bar form in which cRTT, sRTT, a request time, a response waiting time and a response data transmission time are distinguished. Alternatively, the page load time information may be displayed in a time bar form in which it is divided by a client time, a network time and a server time. In addition, each of the client time, the network time and the server time may be displayed. The client time means a time consumed at a client and includes a page design time and a client itself consumed time. The network time includes cRTT information, sRTT information, a request time and a download time. The server time includes a response waiting time. At this time, the page design time represents a time consumed for playback of data associated with a received web design in a client terminal, and the client itself consumed time may mean a time consumed for loading a page internally a client device such as a time for generating a request information associated with a web page in a client without regard to a network state. This may be calculated by considering a time consumed from a state of state code 5 meaning a state in which a session is established based on a transaction state code to a state associated with state code 6 in which a session request is performed among performance related indicators generated in the packet mirroring device. Alternatively, it may be calculated based on a session result code.

In addition, in relation to a use of web page, it is displayed use component information, an amount of request packet, an amount of response data, user information, session information, response waiting session number information, TPS information and error related information.

Additionally, a plurality of sessions included in the corresponding time is arranged in a time sequence and detailed items (analysis for each component) are displayed, but it is provided in a time bar form in which cRTT, sRTT, a request time, a response waiting time and a response data transmission time are distinguished. Here, URL information, used time information, response waiting time information and the like may be expressed. Based on it, a latency component may be extracted.

Figure 23:
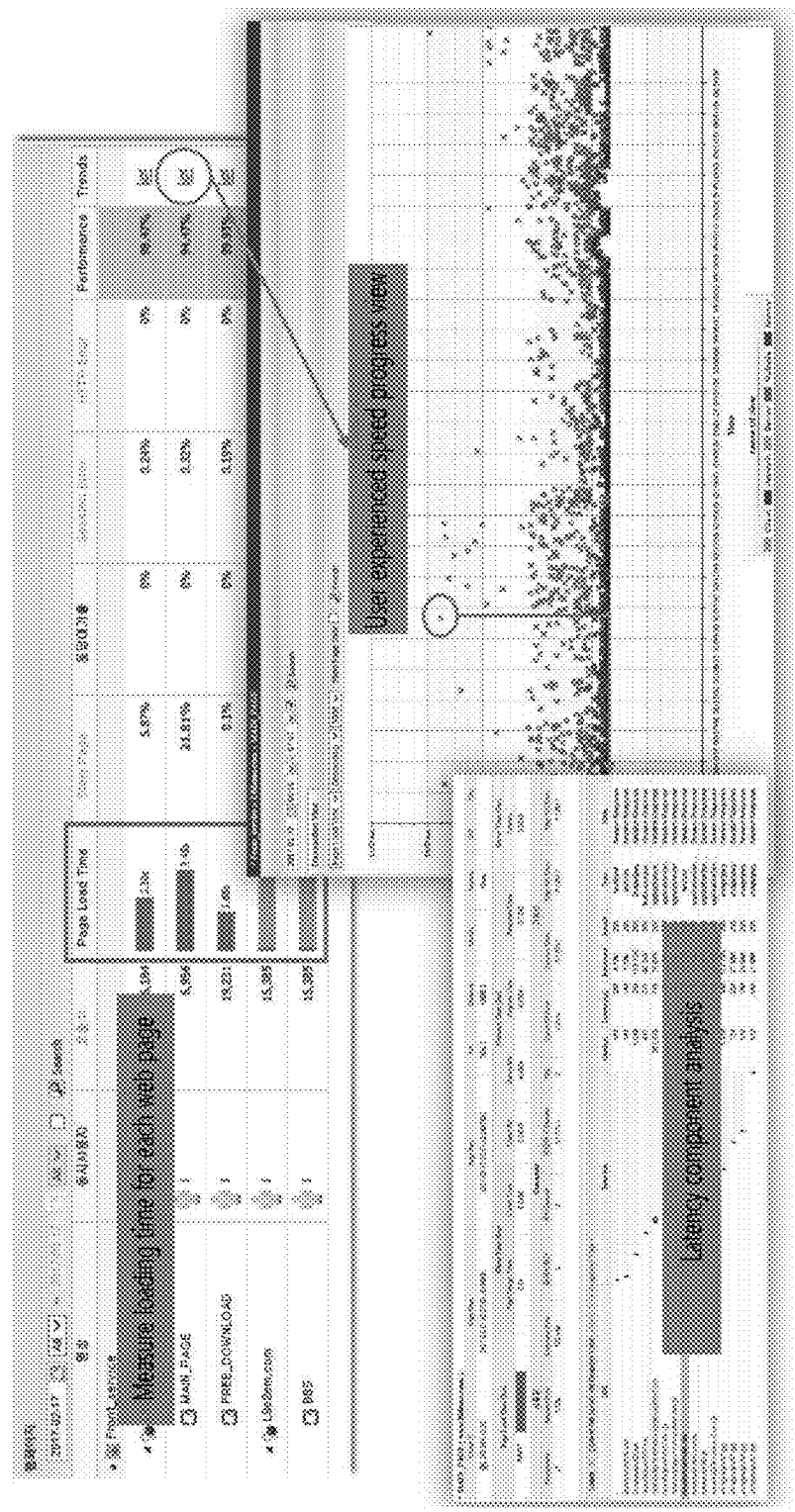
FIG. 23 is a diagram illustrating a page in which a user experienced speed of a user is analyzed according to a response latency analysis screen for a specific web site.

FIG. 23 is a diagram illustrating a page in which a user experienced speed of a user is analyzed according to a response latency analysis screen for a specific web site.

Referring to FIG. 23, a packet mirroring device generates and displays a response latency analysis screen for a web site. At this time, associated with a specific web site in a specific time zone, the packet mirroring device extracts information of generated packets and performance related indicators generated from the packets and generates an analysis page based on the extracted information.

In the analysis page, configured time information is displayed, and in the page, page loading time information related to response latency is expressed in a time bar form in which cRTT, sRTT, a request time, a response waiting time and a response data transmission time are distinguished. In addition, like the web site analysis page at a bottom side of FIG. 22, page loading time information, client time information, network time information and server time information are displayed. In addition, it is arranged and displayed use amount information (including call number, amount of request and amount information of response data), current state information (including simultaneous user information, simultaneous session number information, TPS information and response waiting session information) and availability information (including information related to an error). Here, the page loading time may be calculated based on a server response waiting time and/or total use time. Alternatively, the page loading time may be calculated as a value of a client time added by a used time. That is, this may be a time value measuring from a time of transmitting a request to a time when loading of the entire data of the response data packet for the request related packet is completed.

In addition, in detail, it is displayed response speed related information on each service (or component) associated with the web page. According to the embodiment of FIG. 23, contents analyzing two service user-experienced speed are displayed. First, since the page loading speed of iinju-k service is 4.78 second, which is relatively slow, and a ratio of latency page is 63.64%, it is identified that a plurality of users undergoes latency. The latency page means a page of a page loading speed of a specific speed or greater, and the ratio may be calculated based on the number latency pages in comparison with a call number from a user. Next, a page loading speed of gne service is 4.95 second, and it is also identified that the speed is relatively slow.

In addition, more particularly, through the user experienced speed latency section analysis, it is identified that a section in which the user experienced speed latency is occurred is a client section (Page Design Time, Client Time).

Figure 24:
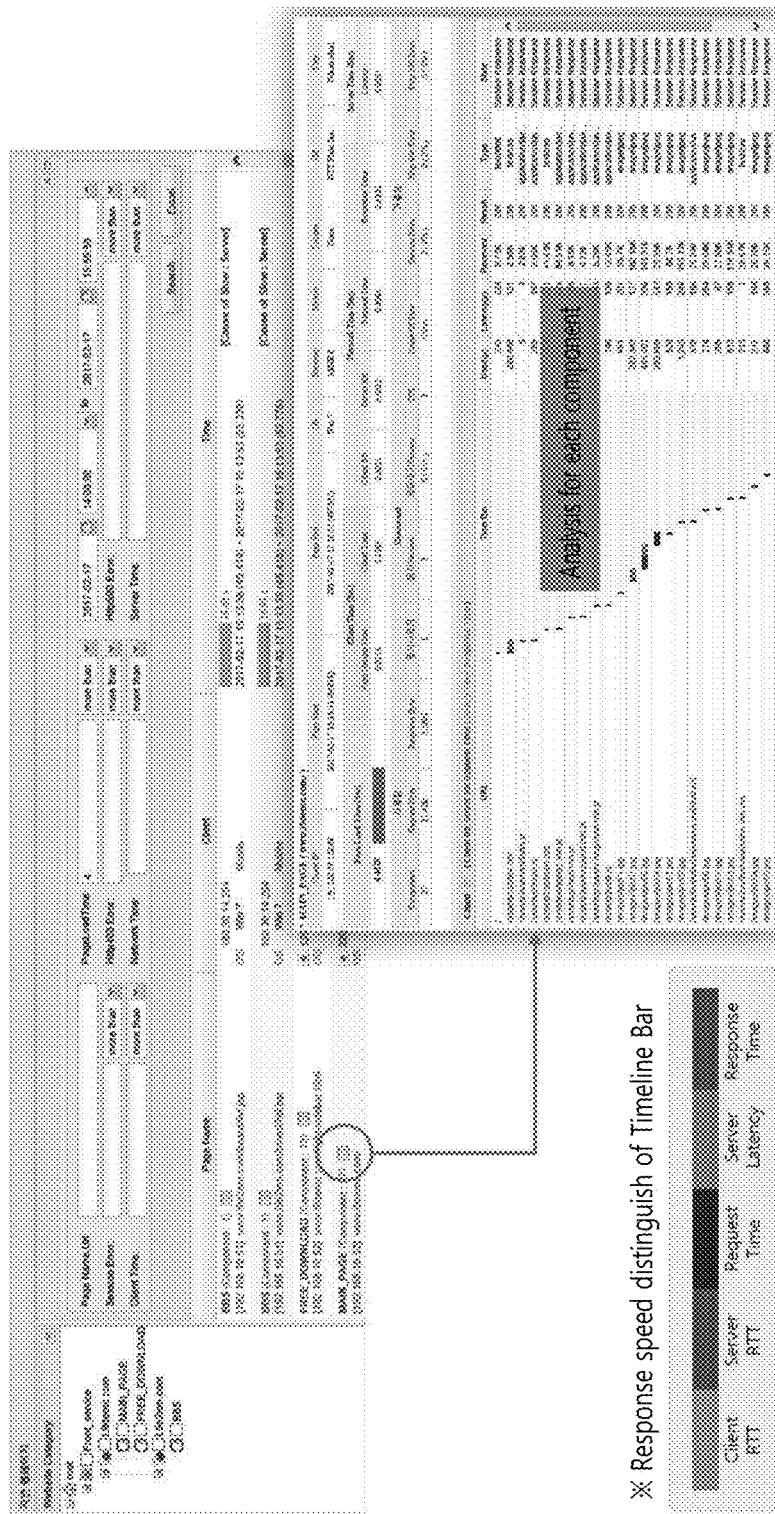
FIG. 24 is a diagram illustrating a screen visualizing a loading time for each web page, a progress of user experienced speed according to it and an analysis page of latency component.

FIG. 24 is a diagram illustrating a screen visualizing a loading time for each web page, a progress of user experienced speed according to it and an analysis page of latency component.

Referring to FIG. 24, a packet mirroring device measures and depicts a loading time for each web page in a web page analysis page. At this time, in the case that a user requests an additional trend analysis by clicking a trend icon, the packet mirroring device provides a change depending on a time of a user experienced speed for the web page in a graph form. In the graph, a normal range is set based on a threshold value for a user experienced speed, and events within the normal range may be expressed in violet color and events otherwise may be expressed in other color. In addition, among the events in abnormal state, latency due to a client time may be expressed in blue color, latency due to a network time may be expressed in green color, latency due to a server time may be expressed in yellow color, and latency due to a plurality of causes may be expressed in grey color. That is, latency due to several causes is expressed depending on time so as to be identified at a glance.

In addition, when an event indicating a specific user experienced speed of a specific time is clicked in the graph, a latency component analysis page associated with the event is generated.

In the analysis page, a web page analysis screen of time and latency speed corresponding to the clicked event is shown, and the related URL access actions are provided in a time bar shape.

Figure 25:
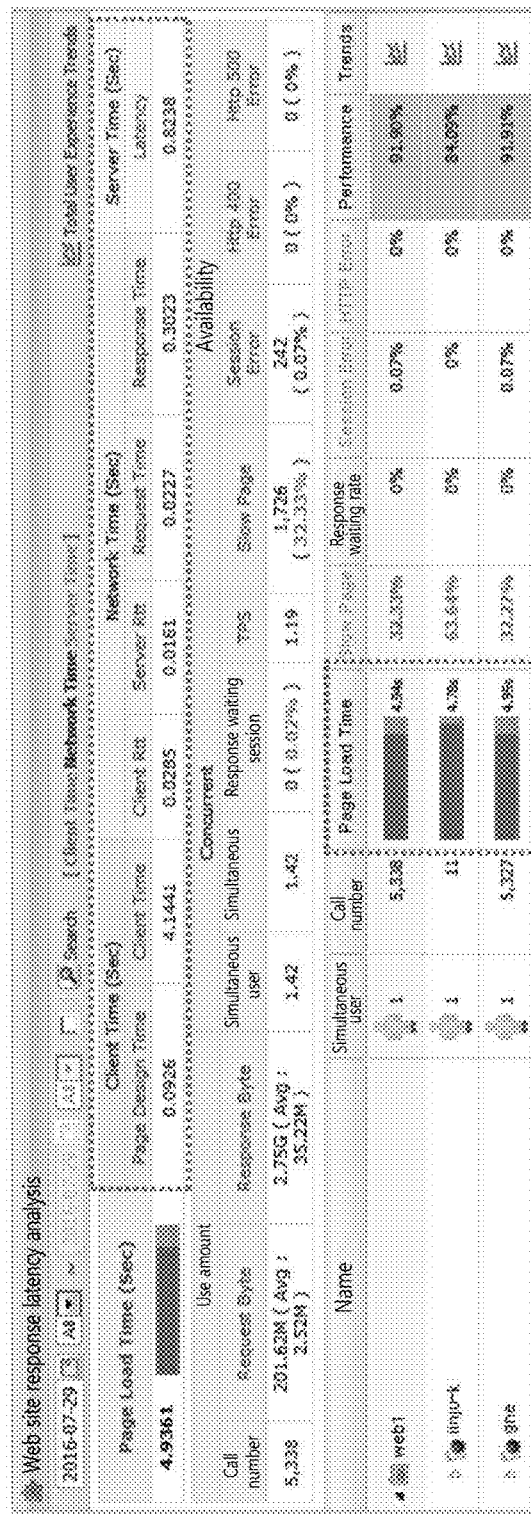
FIG. 25 is a diagram illustrating a page of diagnosing and analyzing a detailed content of a latency web page.

FIG. 25 is a diagram illustrating a page of diagnosing and analyzing a detailed content of a latency web page.

Referring to FIG. 25, a packet mirroring device may generate a detailed diagnosing analysis page for a latency web page (slow page) having a user experienced speed of a specific value or greater. A single web page include a plurality of components. In this case, when the latency web page shows a web page having a user experienced speed of a specific value or greater, and the related client time and time information are displayed, at this time, a total page loading time is shown in the time information. The packet mirroring device may extract a most significant latency cause based on a weight of client time, a weight of network time and a weight of server time among the total page loading time. This is expressed visually with a time bar.

At this time, a detailed analysis for a specific web page may be performed. In response to the detailed analysis request from a user, the packet mirroring device performs an analysis for each component. That is, it is displayed URL information, time bar information, a used time, a response waiting time, an amount of received data, a result code value, a type and state information on each component included in the corresponding web page. At this time, the time bar information may be displayed with being distinguished to cRTT, sRTT, a request time, a server time and a response time.

Figure 26:
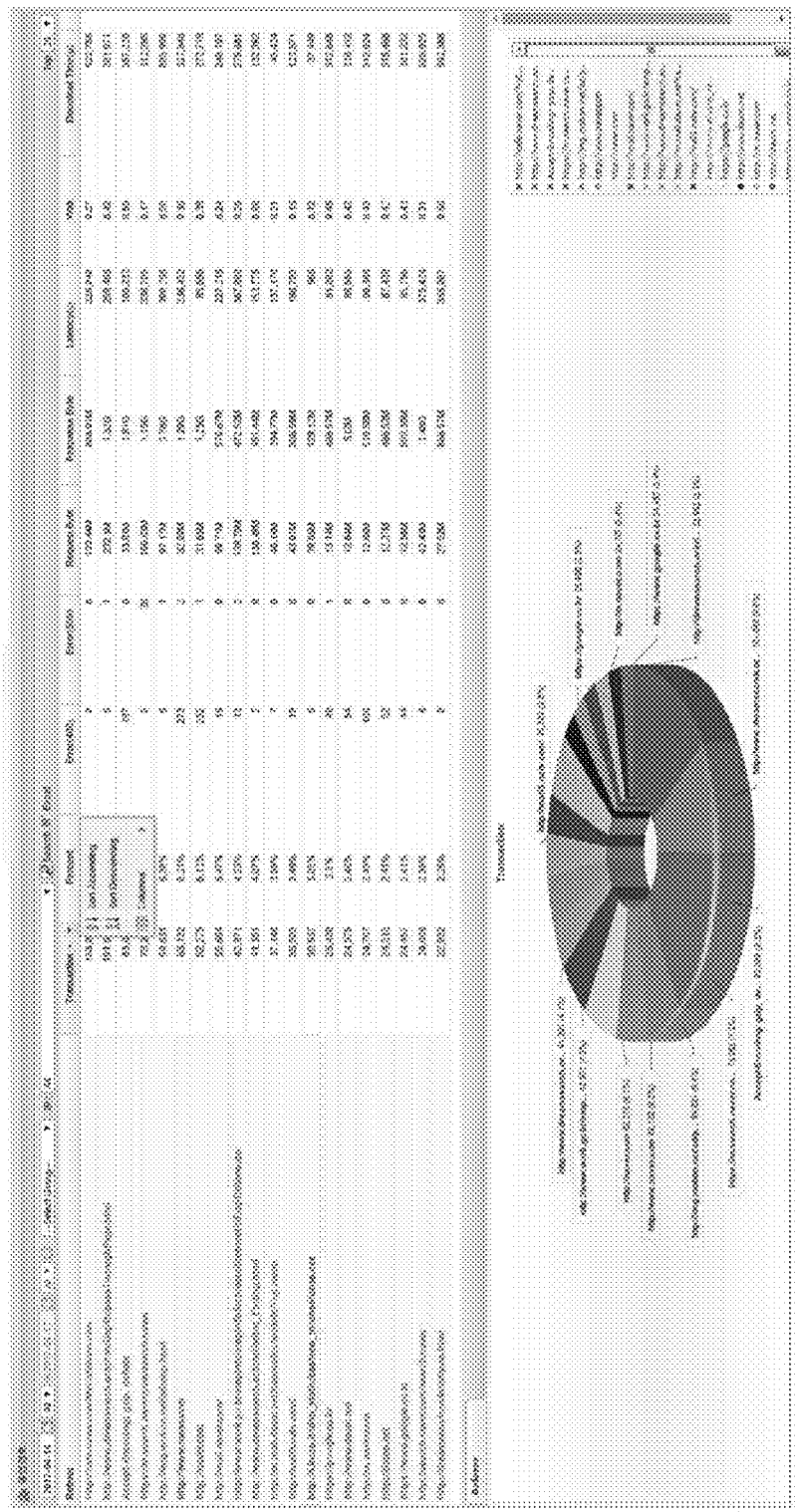
FIG. 26 is a diagram illustrating a page of checking an inflow route using HTTP Referrer information.

FIG. 26 is a diagram illustrating a page of checking an inflow route using HTTP Referrer information.

Referring to FIG. 26, a packet mirroring device may obtain HTTP referrer information of packets in a specific time zone from packets and generate a list by arranging it. The referrer is referred to as a trace remained through a hyperlink in visiting each site when surfing world wide web (www) with a web browser. Through this, it may be identified a route through which a visitor of a web site visits the corresponding site.

As shown in FIG. 26, in returning to an inflow route check request of a specific time zone for a specific web site, the packet mirroring device extracts referrer information from packets of the time zone of the web site and performance related indicators and arranges it. It may be expressed related transaction number information, ratio information of transaction related to the referrer, error information, amount of request data, amount of response data, response waiting time and response waiting session number information, download time information together with the referrer. Particularly, the transactions may be arranged in an ascending order or a descending order.

In addition, in the graph at a bottom of FIG. 26, the packet mirroring device may depict each referrer in a graph form in accordance with a ratio associated with the transaction. Accordingly, a route through which a user accesses to the web site may be identified at a glance.

Figure 27:
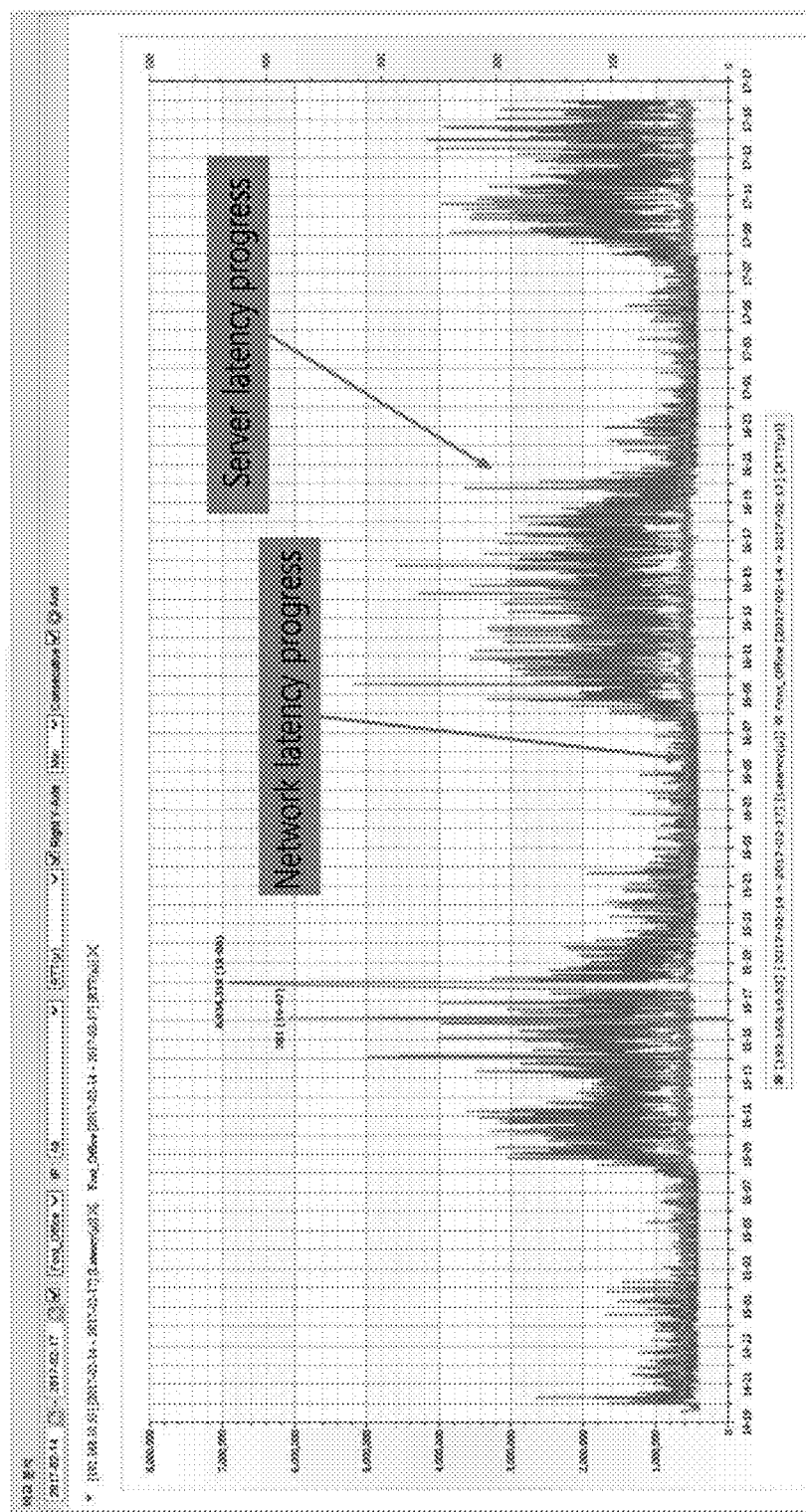
FIG. 27 is a diagram illustrating a page of comparing and analyzing a server indicator and a network indicator.

FIG. 27 is a diagram illustrating a page of comparing and analyzing a server indicator and a network indicator.

Referring to FIG. 27, a packet mirroring device may generate a graph of comparing a server indicator and a network related indicator. For example, the packet mirroring device may compare a response waiting time (latency) value of a specific server with RTT value associated with a network in time sequence as a graph. The packet mirroring device may compare other server related indicators and other network related indicators as well as the response waiting time. For example, the packet mirroring device may compare BPS, TPS, CPS, HPS, and the like, not RTT in time sequence. In addition, the packet mirroring device may extract a highest peak point among the server indicators and the network related indicators through a specific time zone and display a value of the corresponding part.

Figure 28A:
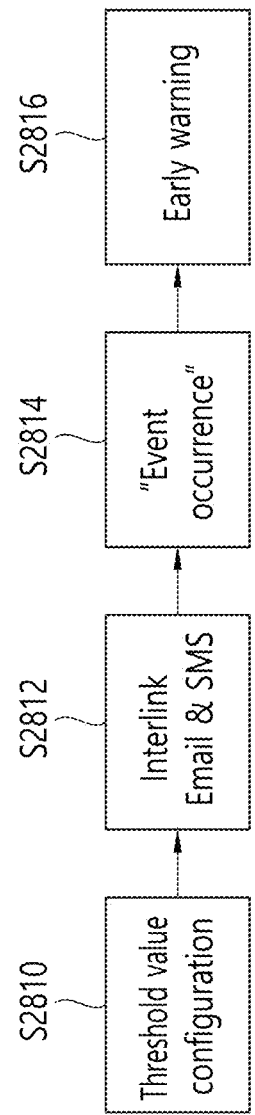
FIG. 28a is a flowchart illustrating a procedure of determining service latency and a failure event alarm.

FIG. 28a is a flowchart illustrating a procedure of determining service latency and a failure event alarm.

Referring to FIG. 28a, a packet mirroring device has various rule sets related to a problem occurrence and a threshold value for applying the rule set. For this, a threshold value configuration through a user interface may be requested (step, S2810). In addition, a configuration for interlink with a network service such as email, SMS, text or SNS is configured (step, S2812). Thereafter, an event occurrence is detected (step, S2814), and a proactive response through an early warning is performed (step, S2816).

According to an embodiment of the present disclosure, when an event occurs, an auditory measure as well as a visual measure may be accompanied. That is, it is controlled such that an action like ring a beep is performed. In addition, when an event occurs, it is controlled that automatic scroll is performed to a server associated with the event. For example, in the case that a latency related problem associated with a response waiting time occurs in a first server, the packet mirroring device may identify the first server in which an event occurs and automatically output a flow map on the event occurrence time of the first server, a server state page, a session list, a user list and/or related web page analysis page.

Figure 28B:
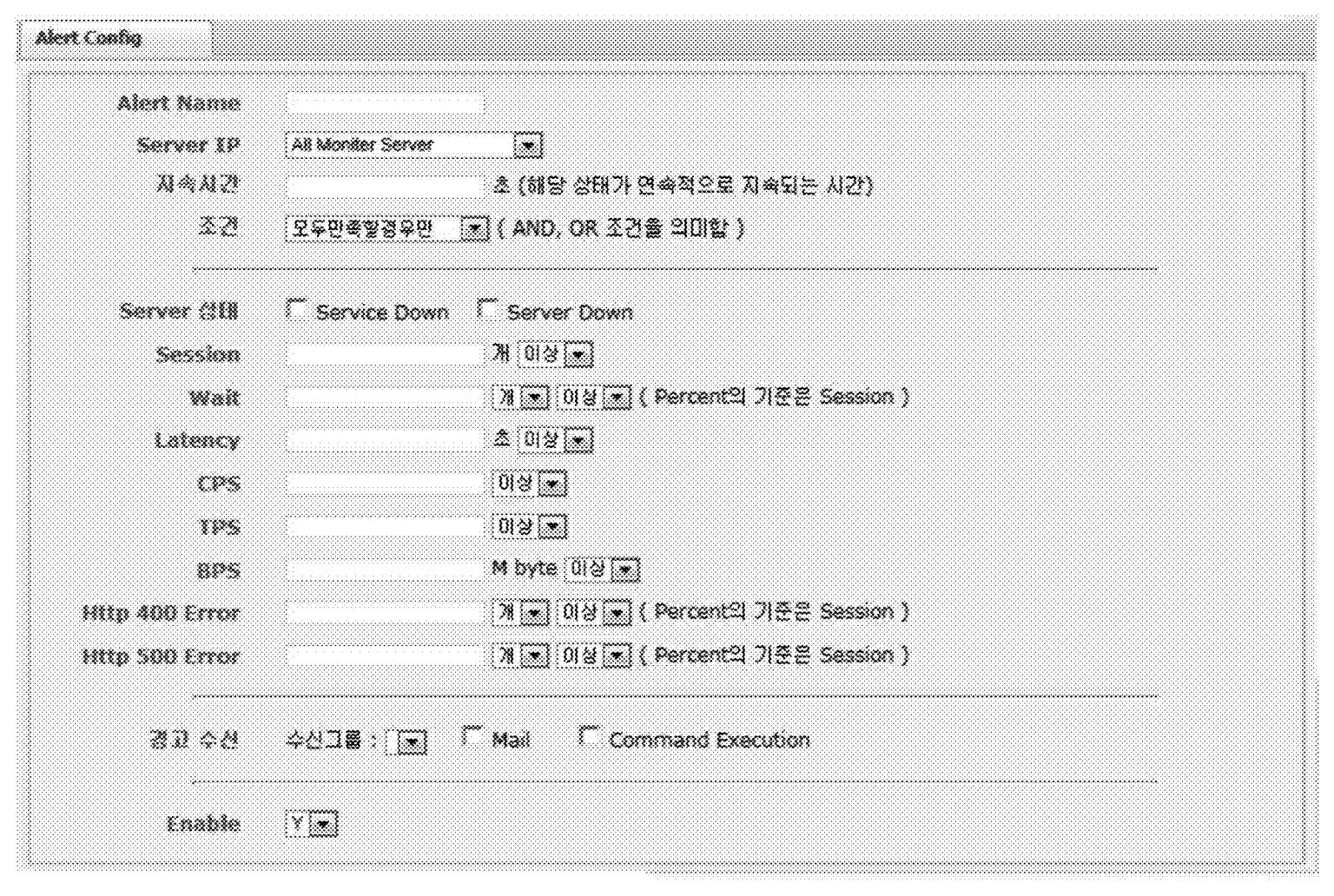

FIG. 28b is a diagram illustrating a threshold configuration page.

Referring to FIG. 28b, a packet mirroring device generates a configuration window associated with an event occurrence and outputs it through a user interface. Thereafter, the packet mirroring device may receive a user input through the user interface and configure a proper rule set and a threshold value associated with the rule set.

First, through the configuration window, a user may set a name of route and input a related server IP. In addition, the user may set a duration threshold value of a problem occurrence condition and select whether to satisfy multiple conditions or a specific ratio.

When a specific event occurs, it is selectable a form of the server state. For example, it may be selected whether the entire service is down or only the server is down. In addition, as described above with reference to FIG. 12, in relation to the problem occurrence, information associated with the number of sessions, a response waiting session number, a response waiting time, CPS, TPS, BPS and errors may be configured. In addition to the performance related indicators exemplified above, an even associated with different indicator may be generated.

That is, the packet mirroring device supports so as to easily configure a response speed, error number/ratio of an application, a response waiting state of a server and an application, a use amount of network and/or information related to a designated event alarm for each recipient group, through the configuration window.

Figure 29A:
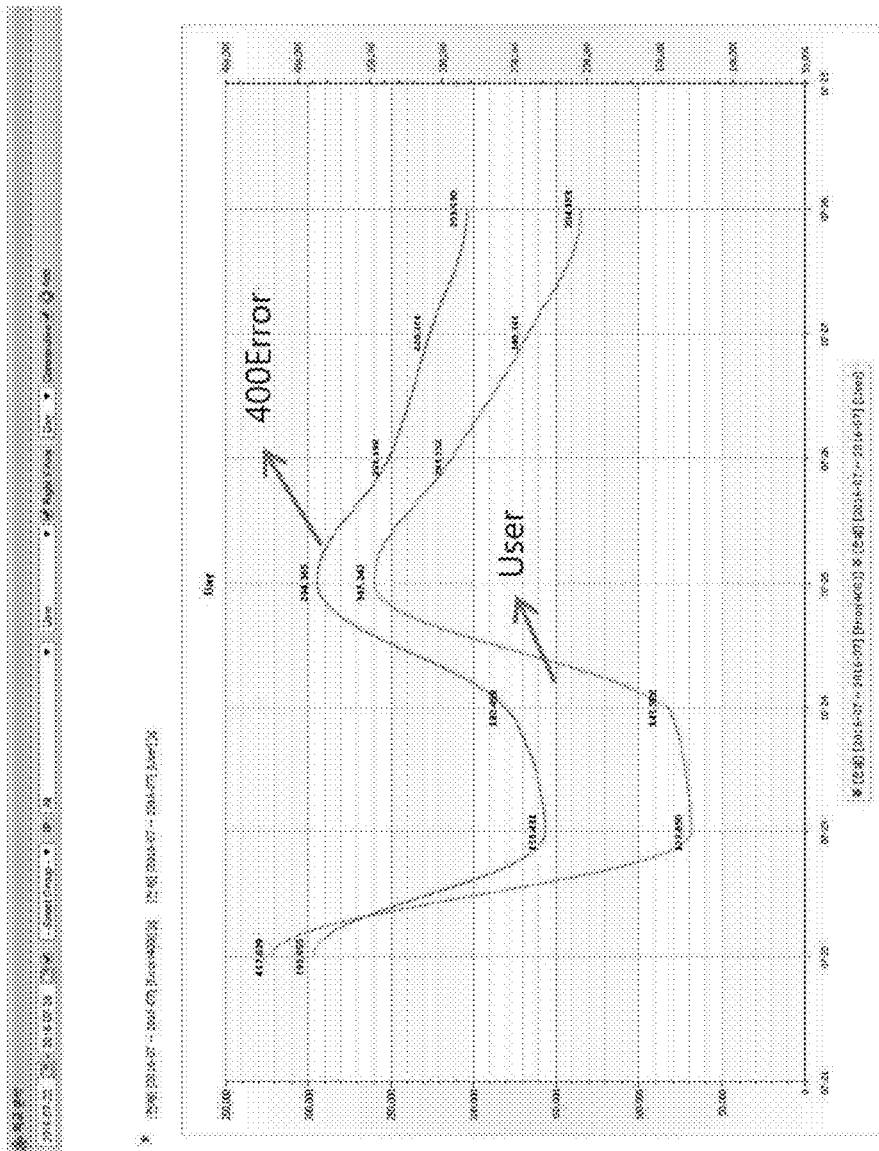
Figure 29B:
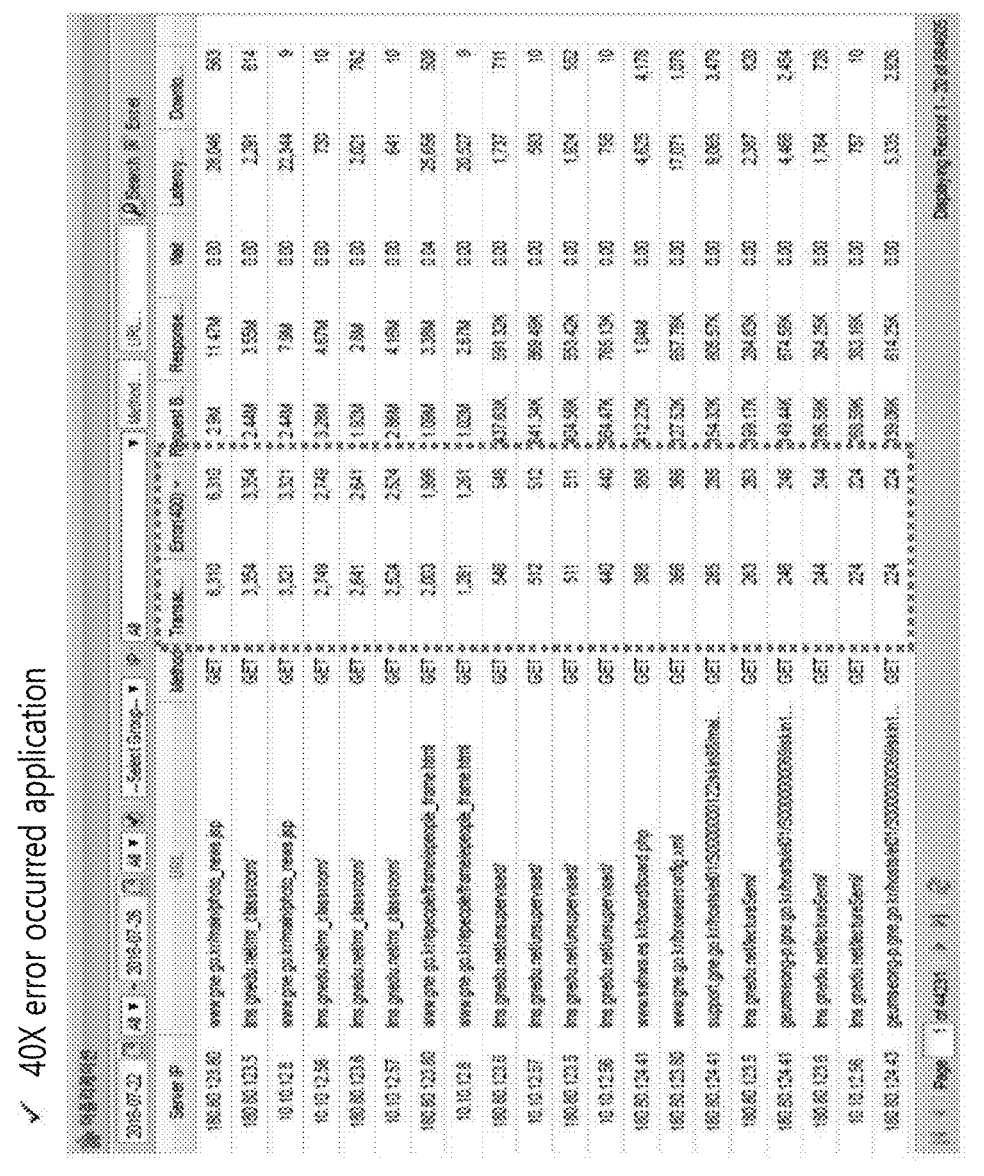

FIG. 29a and FIG. 29b are diagrams illustrating a page related to 40× error analysis.

Referring to FIG. 29a, in response to an analysis request for an error amount occurred on a specific date, a packet mirroring device may generate and display a progress graph for 40× error amount occurred on a date associated with the request. In addition, the distribution of users on the corresponding time is displayed together, and a current state of an occurrence of 40× error according to a user distribution may be visualized in order to be identified as a glance. It is identified that a proportional relation is established between both.

Referring to FIG. 29b, in response to an analysis request for an application in which 40× error is occurred on a specific date, a packet mirroring device may collect information related to 40× error occurred on a related date and display and output the collected contents in a table form. At this time, it may be displayed an IP of the related server, a URL, a method, transaction information, error information, amount of request and response data, a response waiting session number and response waiting time information and download time information together. In the embodiment of FIG. 29b, it is identified that an application in which 40× error is most frequently occurred is "www.gne.go.kr/main/photo_news.jsp". It may be identified a tendency that the same phenomenon occurs in a great number of applications as well as the corresponding application, and the packet mirroring device may determine whether a link problem of a specific page is present based on the phenomenon congested and may control a server or a client associated with the link to be periodically monitored.

The error analysis is not necessarily performed only for 40× error but may be performed for other error such as 50× error.

Figure 30:
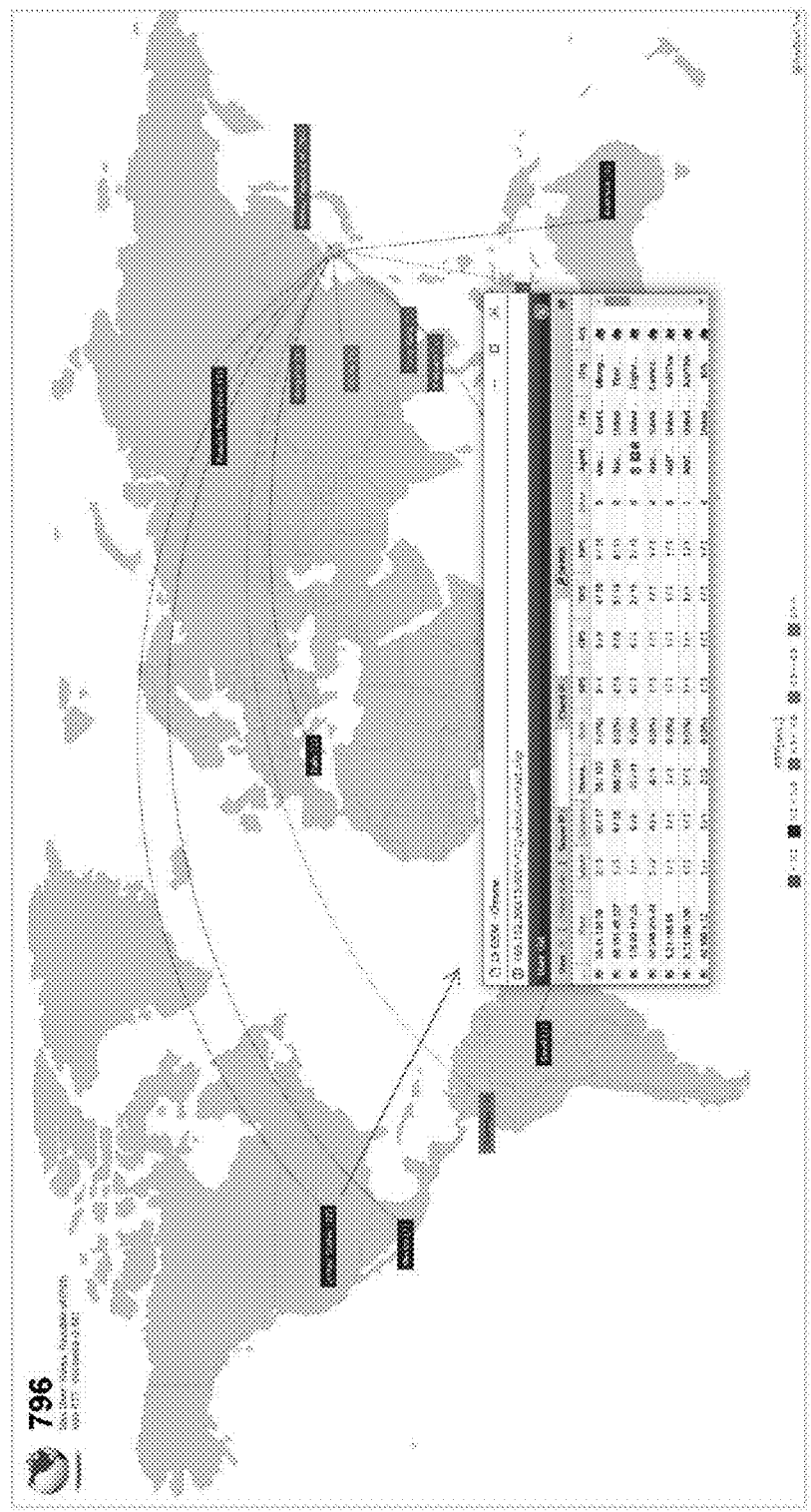
FIG. 30 is a diagram illustrating a page visualizing a service performance in a global map associated with geographical data.

FIG. 30 is a diagram illustrating a page visualizing a service performance in a global map associated with geographical data.

Referring to FIG. 30, a packet mirroring device may store geographical information. For example, the packet mirroring device may store Geographic Information System (GIS) information. The GIS information may be interlinked with information associated with a position of the packet mirroring device according to an embodiment of the present disclosure, and the GIS information, the packet information and/or performance related indicators information may be displayed with interlinked manner.

According to the embodiment of FIG. 30, the packet mirroring device visualizes a current state of a plurality of client that establishes a session in a server present in the country by considering a geographical position. That is, it may be implemented the client number information or a visual expression that corresponds to the client number in a geographical position of the client in a map of the world based on an IP of the client, country information and city information. The visual expression may be implemented as size or color information that corresponds to the client number. Alternatively, the visual expression may be implemented by showing the client number existed in the corresponding region together.

In addition, in response to information display request of the entire clients associated with the corresponding server, the packet mirroring device may extract and display a user list including user information associated with the server. At this time, based on at least a part (e.g., RTT) of network latency indicators, a line denoting a connection between a client and the server may be differently expressed. The difference of expression includes difference of color, thickness, shape, and the like.

According to another embodiment of the present disclosure, it is also available to express a response based on the geographical information on the information request for a user in the embodiment of FIG. 30 as information on servers associated with a specific client and/or information on servers selected by an operator. That is, the interlink with the geographical information is not limited to user information but applicable to server information, session information, URL information, and/or web site information.

Figure 31:
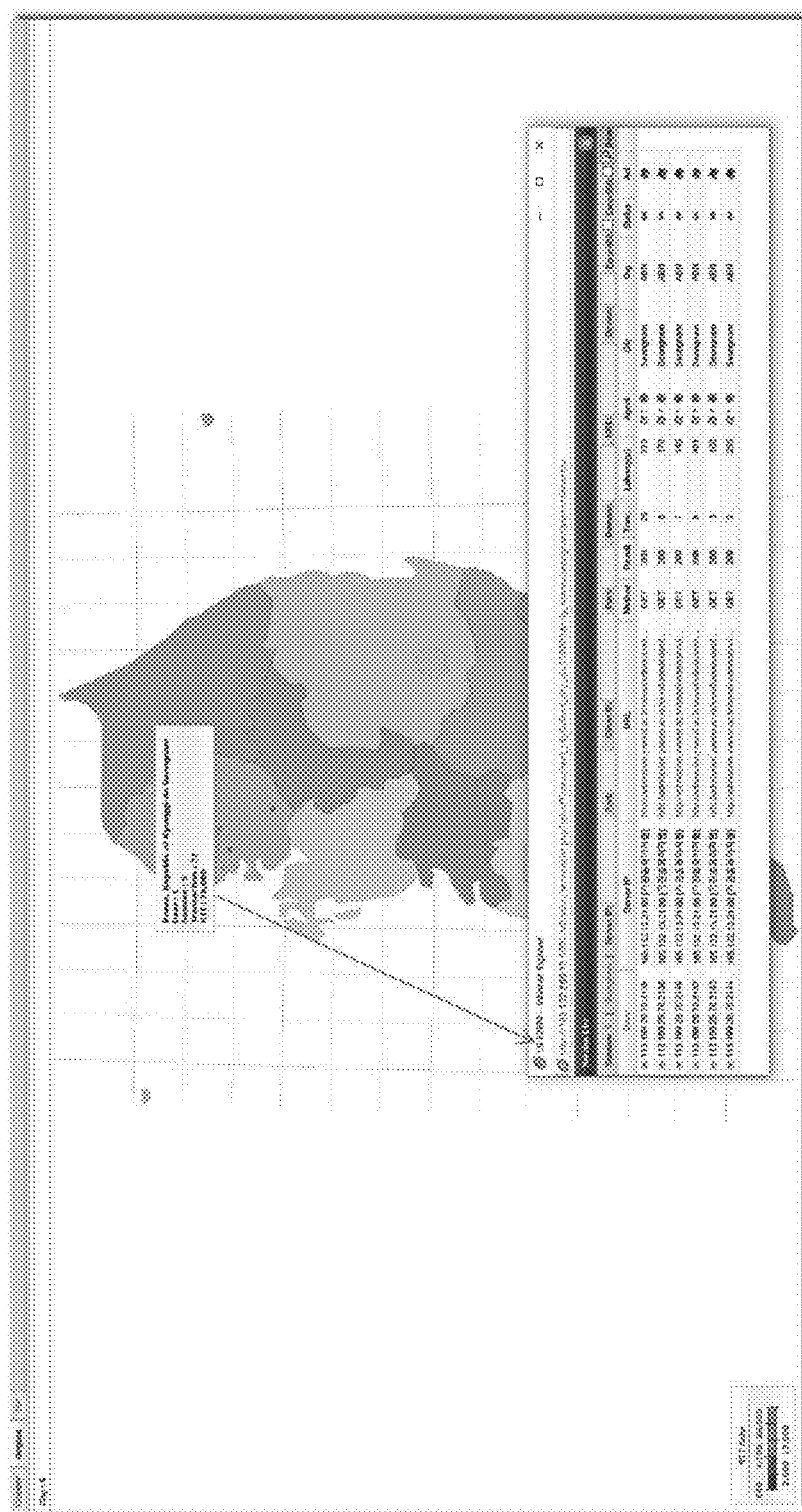
FIG. 31 is a diagram illustrating a page visualizing a service performance in a local map associated with geographical data.

FIG. 31 is a diagram illustrating a page visualizing a service performance in a local map associated with geographical data.

Referring to FIG. 31, when a specific country is clicked in a global map, information associated with a local map of the clicked country may be displayed. That is, the global map and the country map (may be called the local map), and a city map of the lower layer are connected to a hierarchical connection relation, and a user may navigate the geographical map of higher and lower layers through a predetermined input (e.g., a control input such as click, zoom-in, zoom-out, panning). The packet mirroring device may display server information, user information, session information, URL information, and/or web site information in the local map with being interlinked with the geographical data.

That is, the packet mirroring device may express the data associated with the geographical data such as an IP of client, client port information, country information of client, organization information (org information), ISP information (isp_id), city information (city_id) and/or a server IP, a server port, a server country, a server city (may be prestored information) which are obtained through a packet or prestored by mapping it in a real map. At this time, through RTT or other latency related indicators, a service speed in a specific region may be identified at a glance. For example, the packet mirroring device may compare an average value (or maximum value and/or minimum value) of RTT value of a client of a specific region with a preconfigured threshold value (may be plural) and distinguish it into a specific section, and then, display the corresponding region with a visual expression corresponding to the distinguished section. Alternatively, after mapping a position of a client of a specific region is mapped to a point, and a visual expression corresponding to the distinguished section may be applied to the corresponding point. At this time, when information request for the specific region or the corresponding point is input, the packet mirroring device may return the associated session information, client information, server information, URL information and/or web page information.

Figure 32:
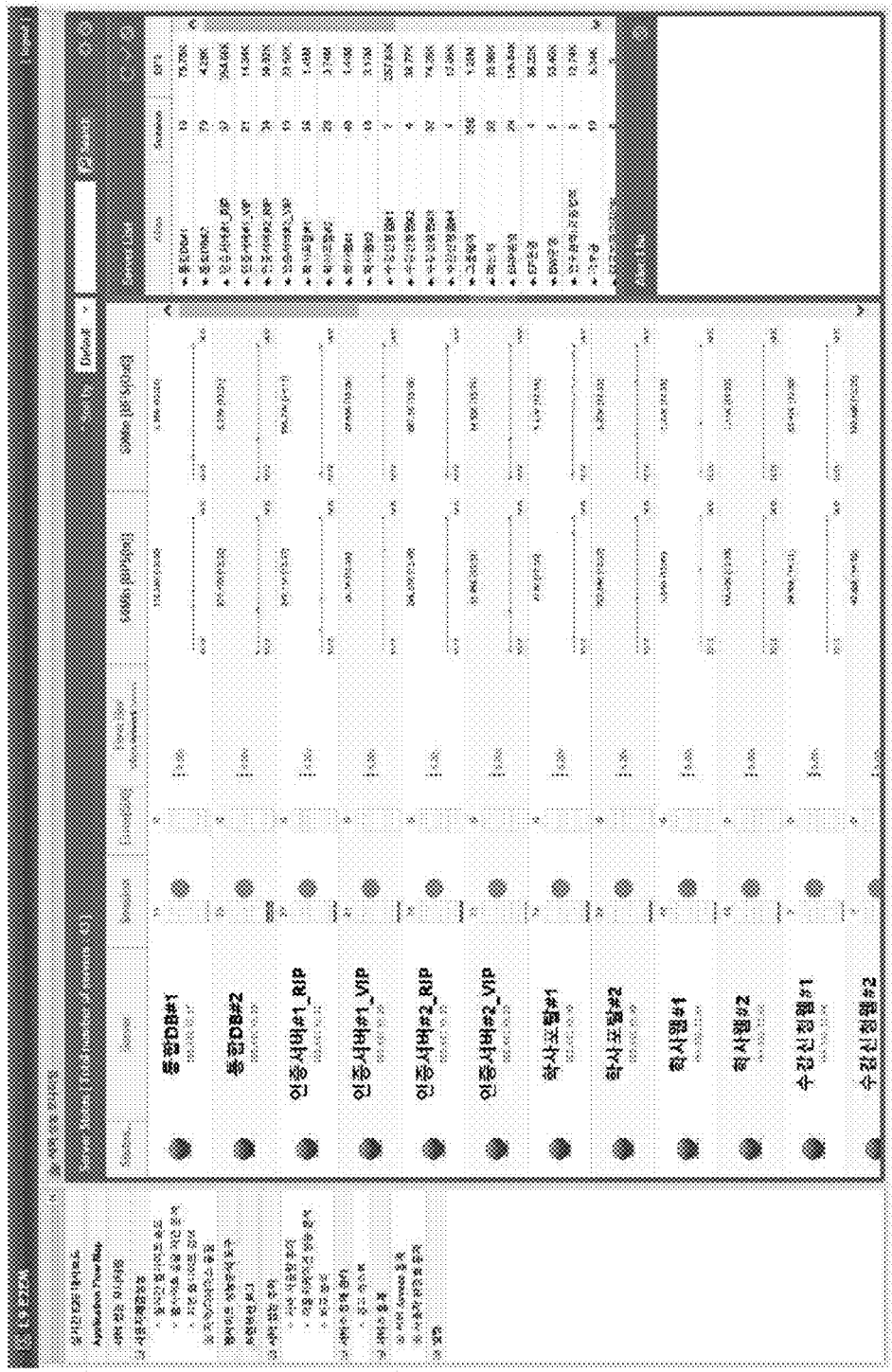
FIG. 32 is a diagram illustrating a page monitoring and analyzing a performance for each server.

FIG. 32 is a diagram illustrating a page monitoring and analyzing a performance for each server.

Referring to FIG. 32, a packet mirroring device may display a server state based on servers associated with a specific service (e.g., authentication of university, registration of class related service). In relation to this, the packet mirroring device generates and outputs a visual expression (including an expression expressed by filled part of a predetermine ratio in an empty box) indicating a ratio of connected session among currently available sessions and whether an error occurs for a session associated with a specific server. In addition, in the server state page, a time bar distinguishably showing a client time, a network time and a server time may be displayed together, and speed related indicators (BPS, TPS, etc.) from a current timing to a past specific timing may also be displayed together.

Figure 33:
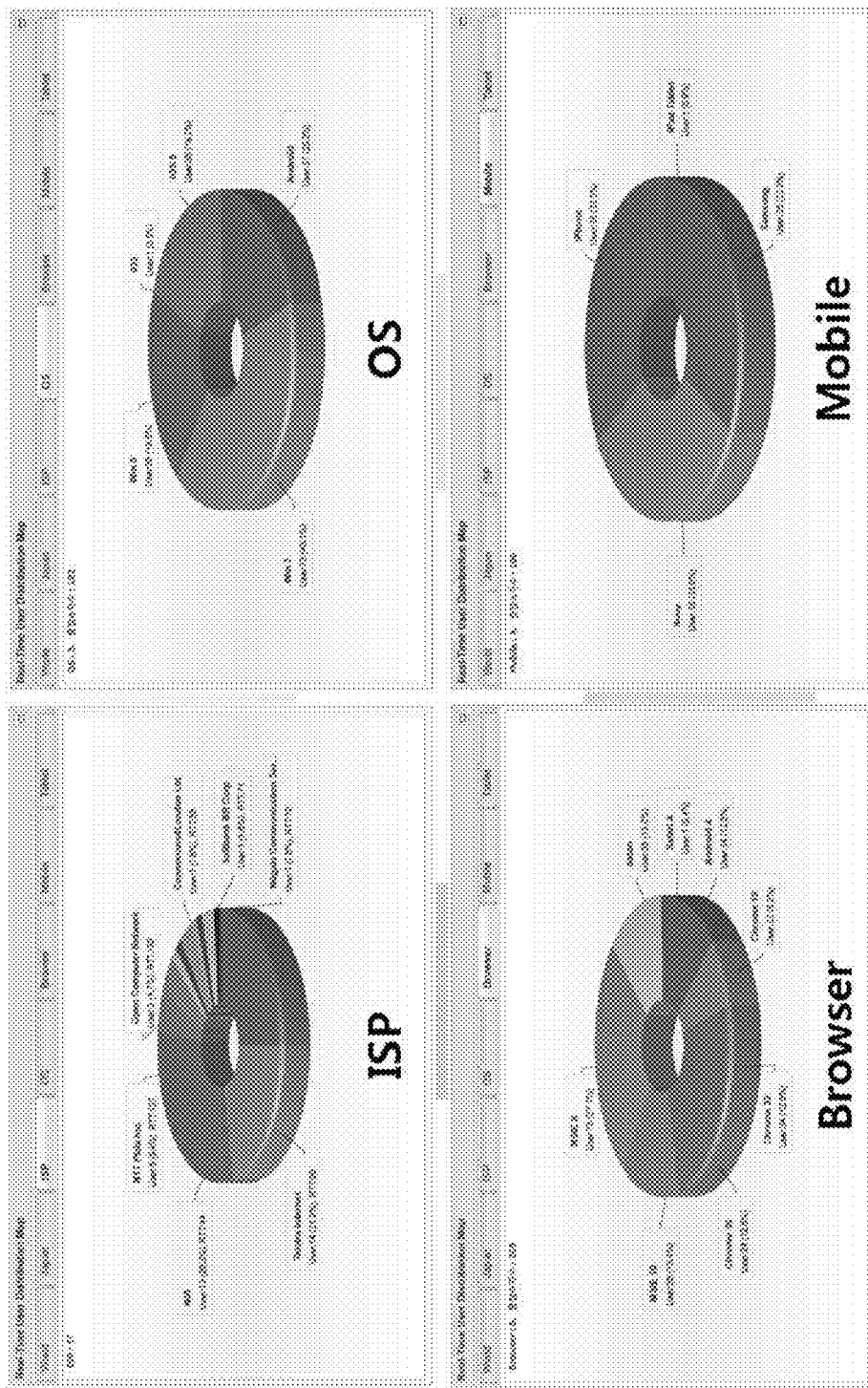
FIG. 33 is a diagram illustrating a page showing an access distribution for each environment of a user.

FIG. 33 is a diagram illustrating a page showing an access distribution for each environment of a user.

Referring to FIG. 33, a packet mirroring device extracts information related to a user attribute in a mirrored packet and generates related information. Accordingly, the packet mirroring device may generate statistical material for each environment of a user terminal associated with a current server to manage, a URL and/or session in a specific time or real time. At this time, it may be utilized org information, city_id information, isp_id information, os_id information, browser_id information, mobile_id information and/or telcom_id information.

For example, a distribution of users currently related in a graph based on a user ISP. Alternatively, a distribution of related users may be displayed for each OS, for each web browser, for each machine type, for each communication company and for each mobile device type. At this time, when a specific distribution part (e.g., chrome 39 in the web browser graph) in the graph is clicked, it may be connected such that a list of users associated with a client that uses the specific distribution part is displayed. The connection relation between such analysis pages is stored through metadata and changeable through a user configuration.

Figure 34A:
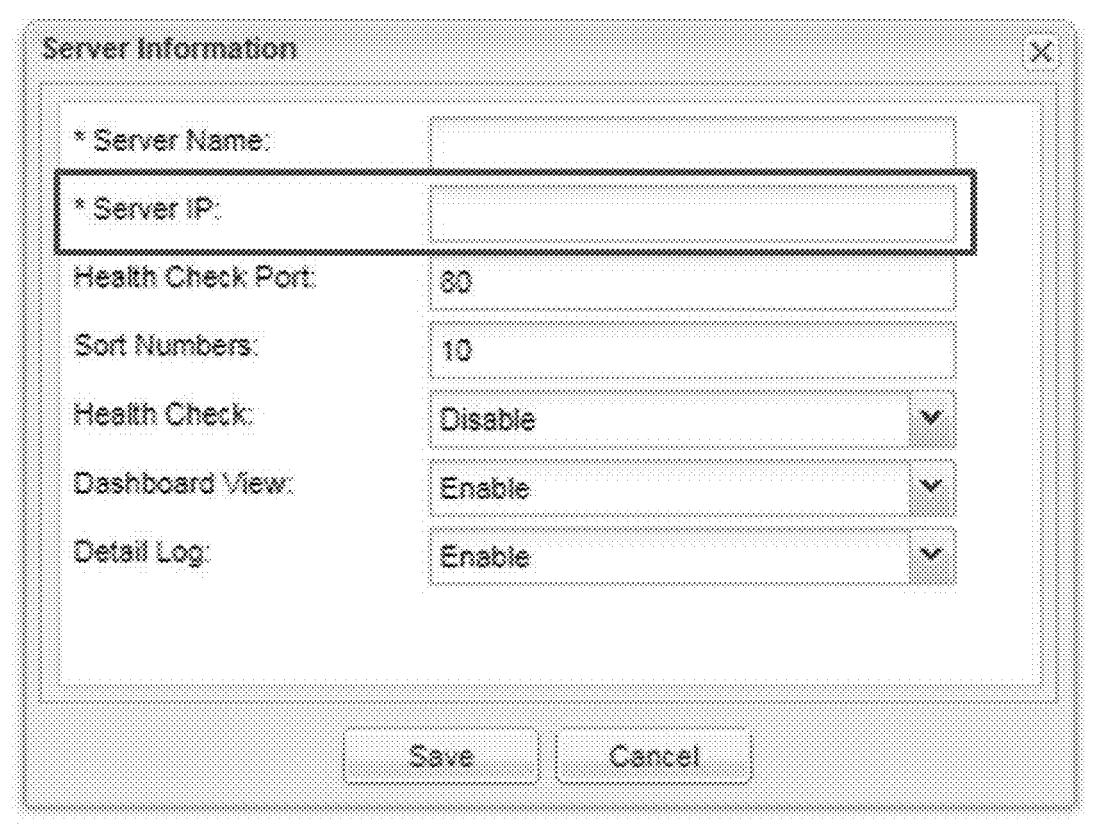
Figure 34B:
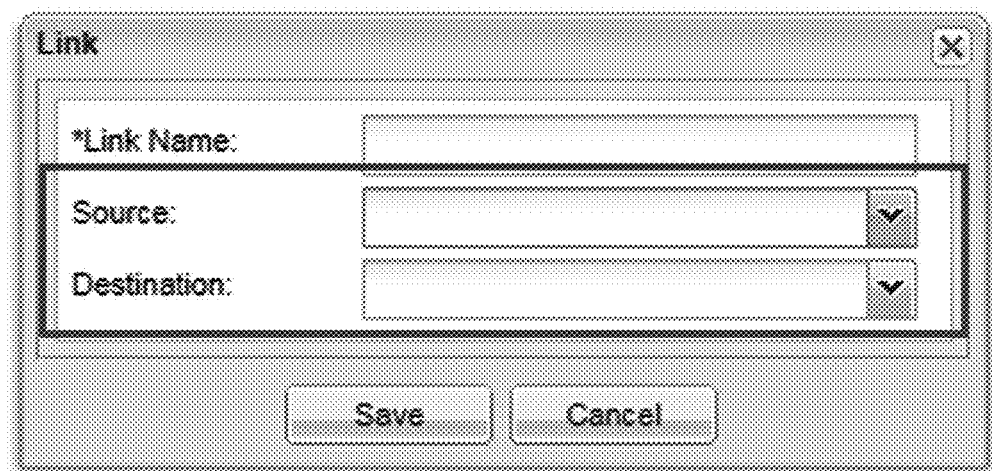

FIG. 34a and FIG. 34b are diagrams illustrating a page for a new device and a link registration.

Referring to FIG. 34a, in order to register a new device and a link to a packet mirroring device, first, a user (or network manager/operator) may directly input server information. For the server device input, a server name, a server IP, a port, a sort number and the like may be required.

In addition, when the device is registered, it is selected (source IP and destination IP) in a link (source-destination) form, and these links automatically configures a flow from a user to each step wise server by mutual connection information. That is, after input for device information, through the step of configuring a link, a final step wise flow map may be generated.

However, the packet mirroring device according to an embodiment of the present disclosure monitors and diagnoses a performance and security problem by applying a packet mirroring scheme for all IP based device connected to a network. At this time, there may be difficulty in registering numerous devices more than a few hundreds and a few thousands one by one, and in the case that a new device is added, immediate registration process is unavailable. Accordingly, a method for automatic registration of a new entity according to another embodiment of the present disclosure is described in detail below with reference to FIG. 35 to FIG. 39.

In this case, in relation to the part of automatic registration of a new entity of a packet mirroring device, the packet mirroring device may be implemented as an apparatus for automatic registration of a new entity, and in this case, the apparatus does not necessarily use a mirrored packet. The apparatus may obtain information related to a packet in different scheme, and after obtaining information defining an address and a specific entity such as a destination IP and a source IP among the obtained packet related information, may register a new entity by comparing the obtained information with network entity information (including a server list, etc.) that the apparatus for automatic registration of a new entity secures in advance.

Figure 35:
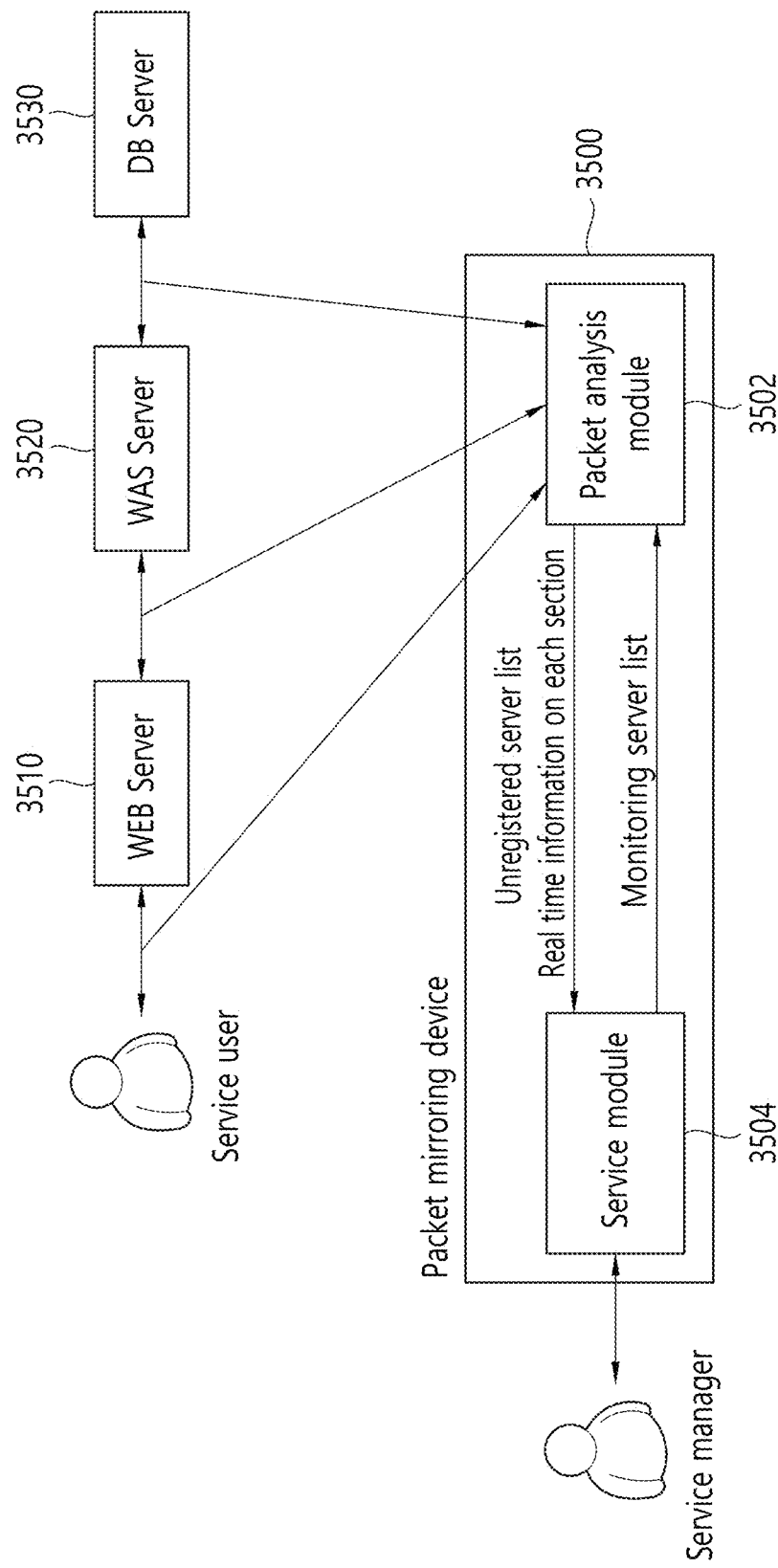
FIG. 35 is a block diagram for describing a configuration of performing an operation for automatic registration of a new device in a packet mirroring device according to another embodiment of the present disclosure.

FIG. 35 is a block diagram for describing a configuration of performing an operation for automatic registration of a new device in a packet mirroring device according to another embodiment of the present disclosure. As shown in FIG. 35, the packet mirroring device 3500 according to another embodiment of the present disclosure may include a packet analysis module 3502 and a service module 3504. The packet mirroring device 3500 may further include a database (now shown) that stores information related to a packet and a database (now shown) that stores network entity information like a server list.

Referring to FIG. 35, the packet analysis module 3502 collects mirrored packets for a packet between a service user and a web server 3510, a packet between the web server 3510 and a WAS server 3520 and a packet between the WAS server 3520 and a DB server 3530 and generates about 120 performance related indicators by analyzing the collected packets. Through this, section wise real time information may be provided to the service module 3504. At this time, a list for unregistered servers among the collected packets is also provided to the service module 3504. That is, the unregistered servers may be extracted by comparing the server list registered by an operator in advance with an IP of a server written in a destination IP of the mirrored packet, and this is provided to the service module 3504.

As described above, the service module 3504 performs various statistical material, search, inquiry and alarm function based on the performance related indicators generated in the packet analysis module 3502. Additionally, the service module 3504 performs an automatic registration based on the unregistered server list received from the packet analysis module 3502 and regenerate a monitoring server list and provides it to the packet analysis module 3502.

There may be two types of methods for registering a new device. There may be method of registration automatically without any special input from a manager and a method for a new device to be existed as a candidate, and the new device candidate becomes a new device by a decision of the manager. Through such methods, a new device may be automatically registered in a prestored server list and a flow map, and a link may be automatically configured.

According to the embodiment of the present disclosure, not only a destination IP in a packet is used, but a source IP may be registered as a new device. In addition, a registration to a client as well as a registration to a server may be considered. In this case, a comparison with a user list may be required.

Figure 36A:
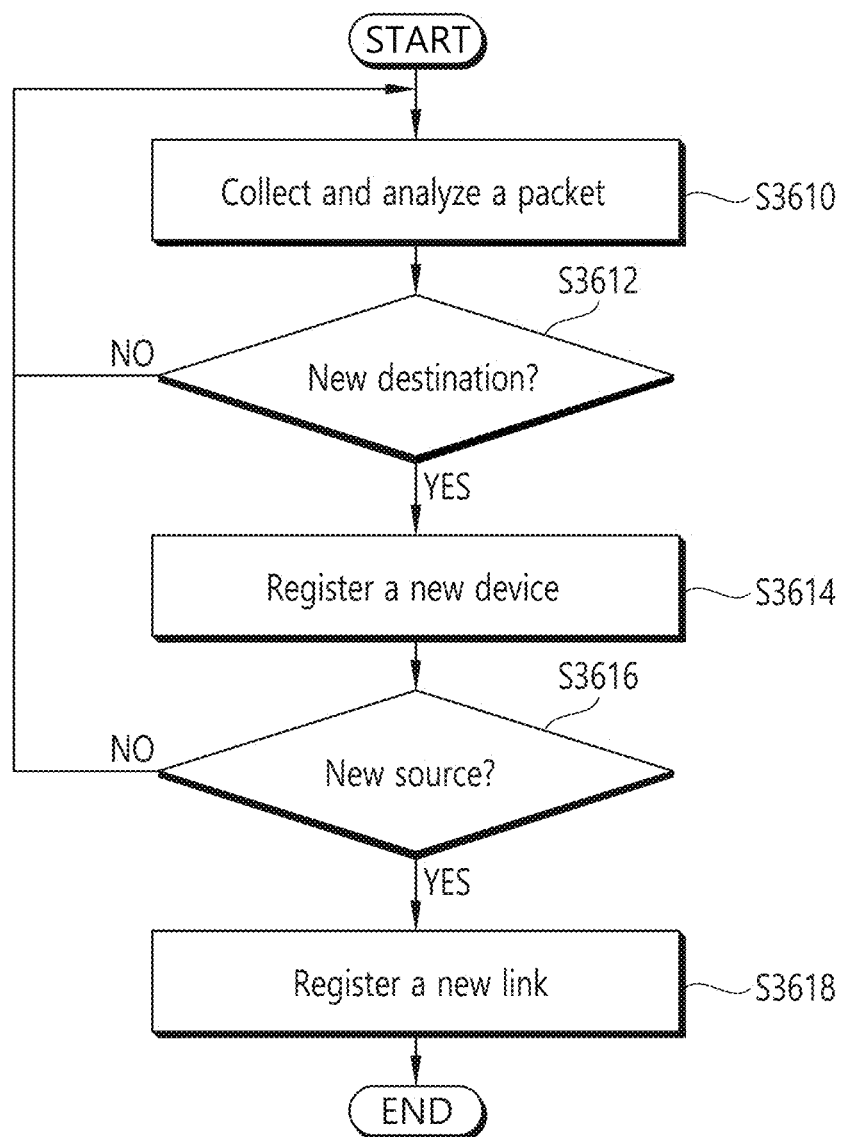
FIG. 36a to FIG. 36c are flowchart illustrating a procedure for registering a new device and a new link in a packet mirroring device according to another embodiment of the present disclosure.
Figure 36B:
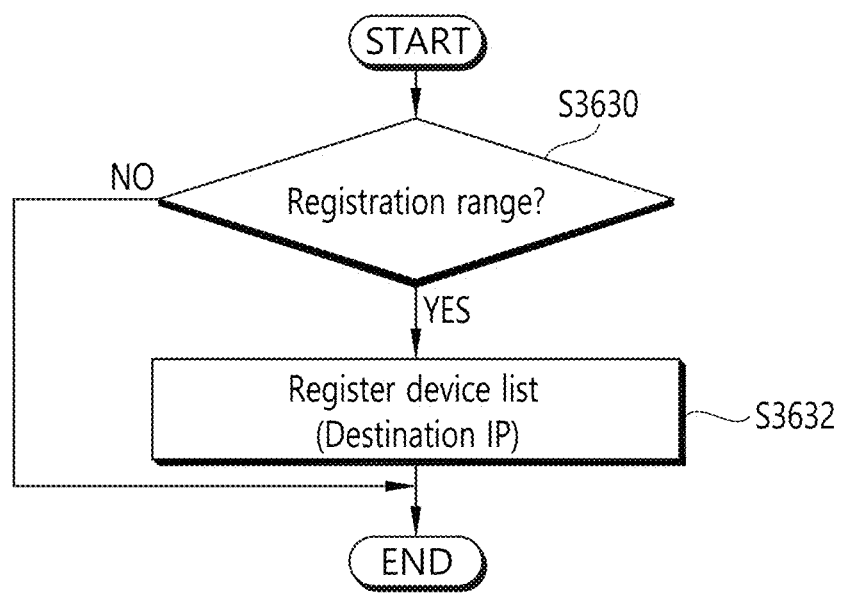
Figure 36C:
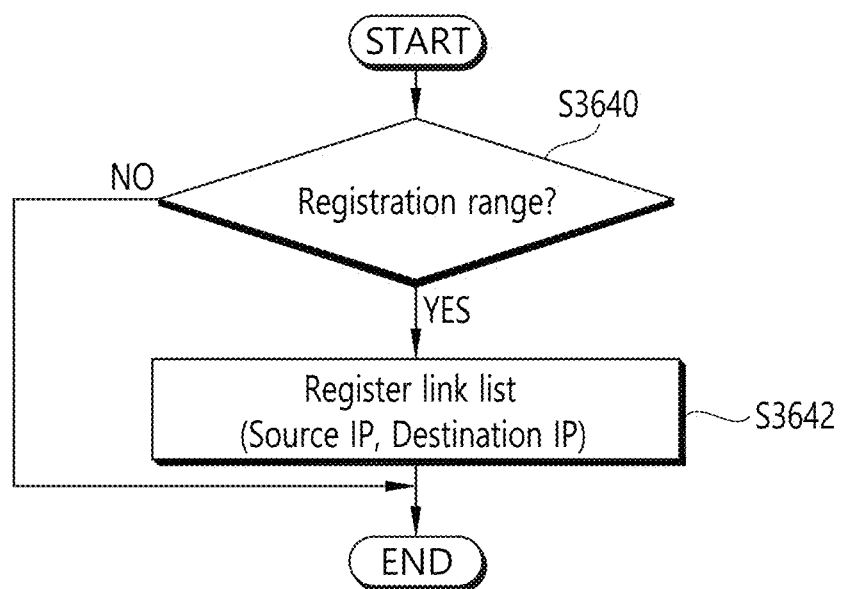

FIG. 36a to FIG. 36c are flowchart illustrating a procedure for registering a new device and a new link in a packet mirroring device according to another embodiment of the present disclosure.

Referring to FIG. 36a, in the entire process, the packet mirroring device collects and analyzes a mirrored packet (step, S3610). This may be performed in the packet analysis module. In addition, it is compared with the prestored server list or server information and compared whether a destination in the packet is a new destination (step, S3612). In the case that it is a new destination, the device is registered as a new device (step, S3614). In addition, it is determined whether a source device associated with the registered new device is a new source (step, S3616). In the case that the new device is a new source device, the new device is registered as a new link (step, S3618). According to the embodiment of the present disclosure, even in the case that the source device is not new, the links of the existing client and the new server device may also be registered as a new link. For example, the link between the source device existed in the prestored user list and the newly registered server device may also be considered as a new link.

Referring to FIG. 36b, in a process associated with a new device registration, the packet mirroring device determines whether the device is belonged to a registration range based on information (e.g., IP information) of the new device (step, S3630). Here, the registration range represents a target device IP region that the packet mirroring device is going to process. This may be preconfigured. For example, in the case that the registration range is 192.47.33.12 to 192.49.33.44, an IP of the new device is compared with the registration range IP range and determined. As a result of the determination, it belongs to the registration range, the device is registered in a destination IP form (step, S3632).

Referring to FIG. 36c, in a process associated with a new device registration, the packet mirroring device determines whether the device is belonged to a registration range based on link information with the source device associated with the new device (step, S3640). As described above, the registration range may represent a target device IP region. As a result of the determination, in the case that the link with the source device is also belonged to the registration range, the new device and the source device are registered in a source IP and destination IP forms in a link list (step, S3642). At this time, the link is registered with being interlinked with links of the existing flow map. That is, the new device may be added as a new server in the existing flow map through the link related information (source IP—destination IP) and display a connection with the existing or new source. According to another embodiment, the new device may be added as a client device in the existing flow map.

Figure 37A:
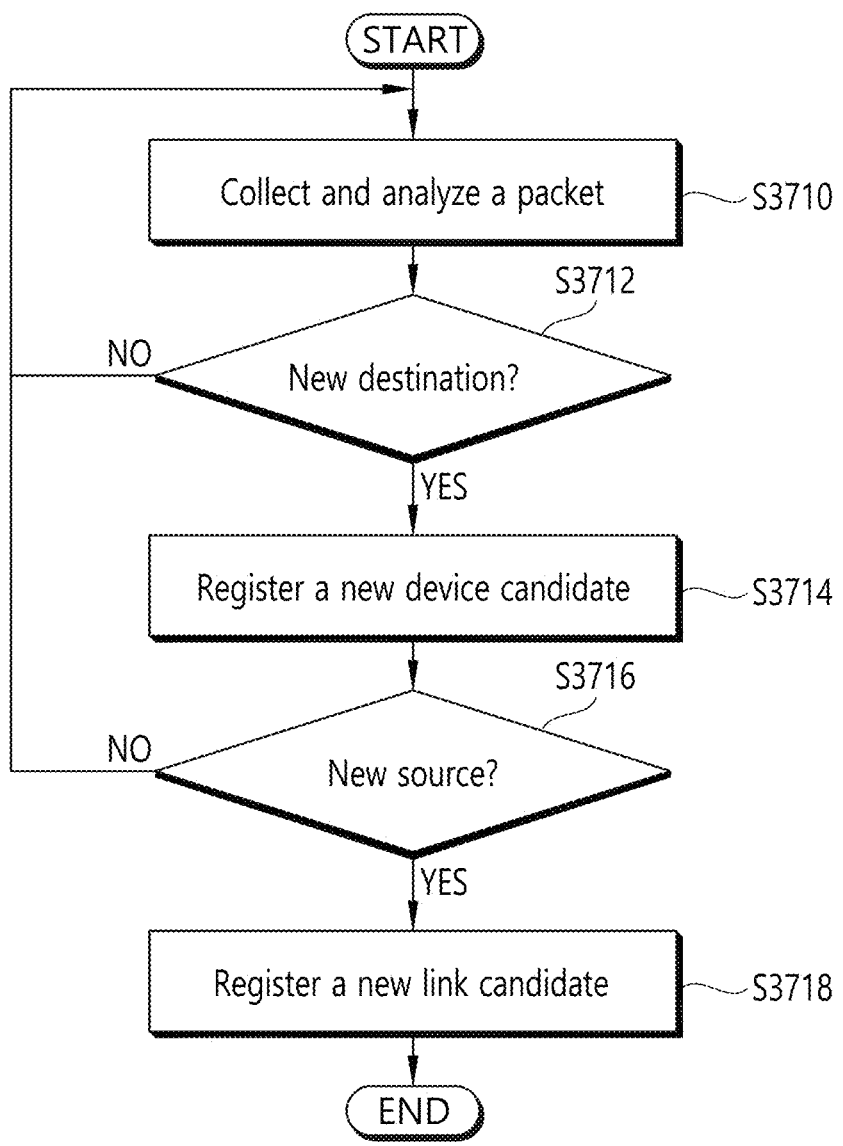
FIG. 37a to FIG. 37c are flowchart illustrating a procedure for registering a new device and a new link selectively in a packet mirroring device according to another embodiment of the present disclosure.
Figure 37B:
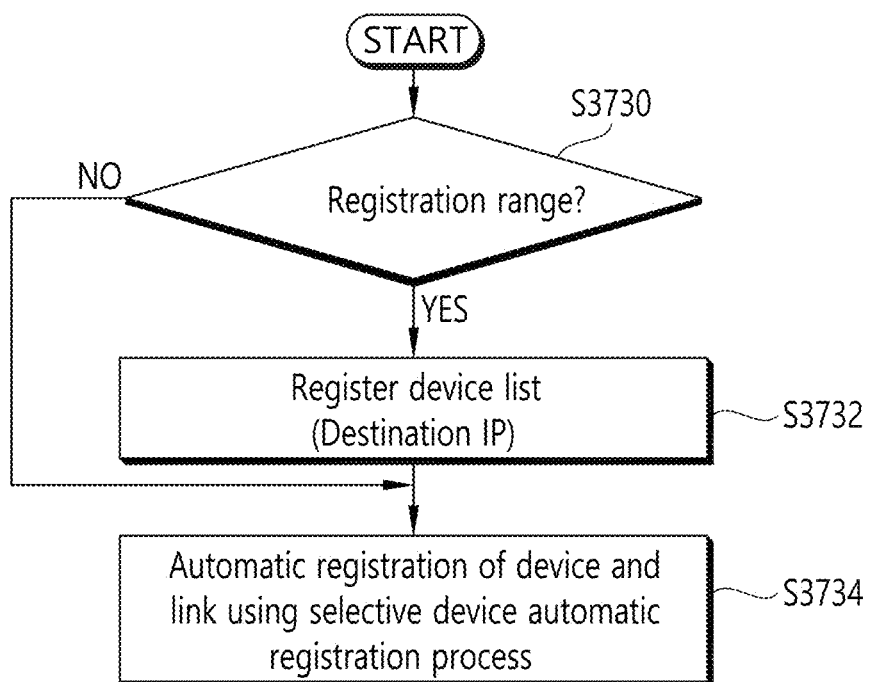
Figure 37C:
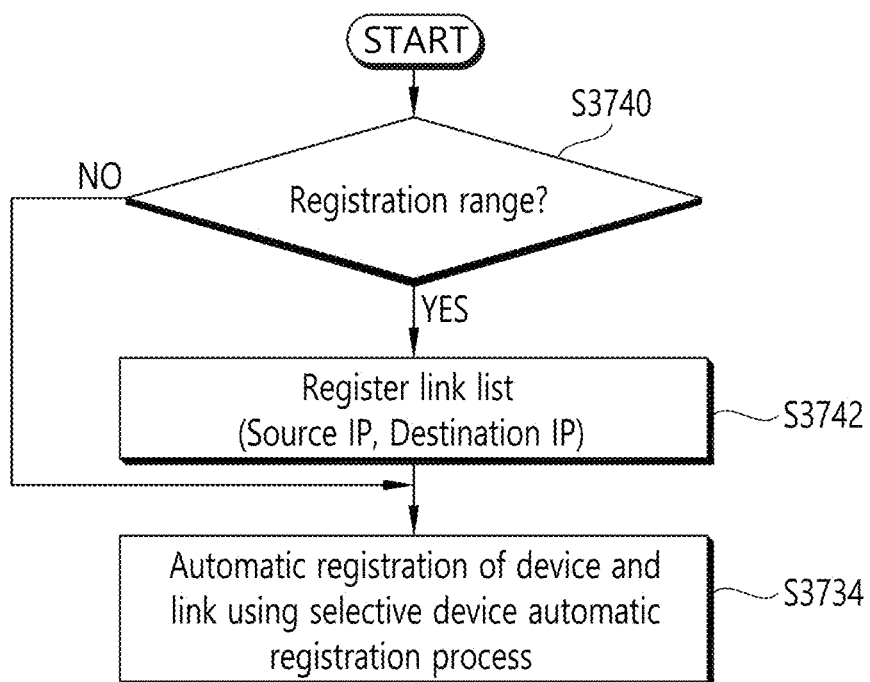

FIG. 37a to FIG. 37c are flowchart illustrating a procedure for registering a new device and a new link selectively in a packet mirroring device according to another embodiment of the present disclosure.

Referring to FIG. 37a, in the entire process, the packet mirroring device collects and analyzes a mirrored packet (step, S3710). In addition, it is compared with the prestored server list or server information and compared whether a destination in the packet is a new destination (step, S3712). In the case that it is a new destination, the device is registered as a new device (step, S3714). In addition, it is determined whether a source device associated with the registered new device is a new source (step, S3716). In the case that the new device is a new source device, the new device is registered as a new link candidate (step, S3718).

Referring to FIG. 37b, in a process associated with a new device registration, the packet mirroring device determines whether the device is belonged to a registration range based on information (e.g., IP information) of the new device (step, S3730). As described above, the registration range may represent a target device IP region that the packet mirroring device is going to process. As a result of the determination, it belongs to the registration range, the candidate is registered in a device candidate list in a destination IP form (step, S3732). Thereafter, passing to a selective device automatic registration process, the device is automatically registered (step, S3734). The selective device automatic registration process is described below with reference to FIG. 38.

Referring to FIG. 37c, in a process associated with a new device registration, the packet mirroring device determines whether the device is belonged to a registration range based on link information with the source device associated with the new device candidate (step, S3740). As a result of the determination, in the case that the link with the source device is also belonged to the registration range, the new device and the source device are registered in a source IP and destination IP forms in a link list (step, S3742). Thereafter, passing to a selective device automatic registration process, the device is automatically registered (step, S3734).

Figure 38:
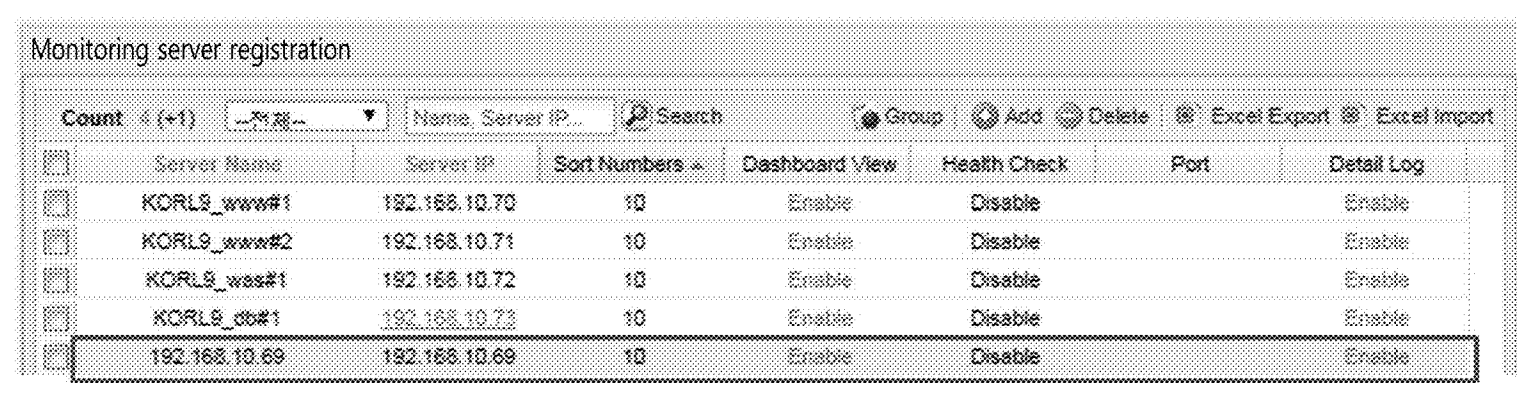

FIG. 38 is a diagram illustrating a selective device automatic registration page.

Referring to FIG. 38, as a result of the comparison with the existing registered server list and determination on whether it is belonged to the registration range, the packet mirroring device displays a monitoring server registration screen for a candidate device which is regarded as a new device candidate. A manager may identify that a new device is existed through the screen and determine whether to register the corresponding device. The monitoring server registration screen includes information input parts such as a server name, a server IP, a sort number, a dashboard view (this represents whether a flow map is shown) and a health check. The new server name is shown with a server IP and changeable by a user input. When the user registers the device, a link may be automatically configured by using relation information with the existing source.

Figure 39:
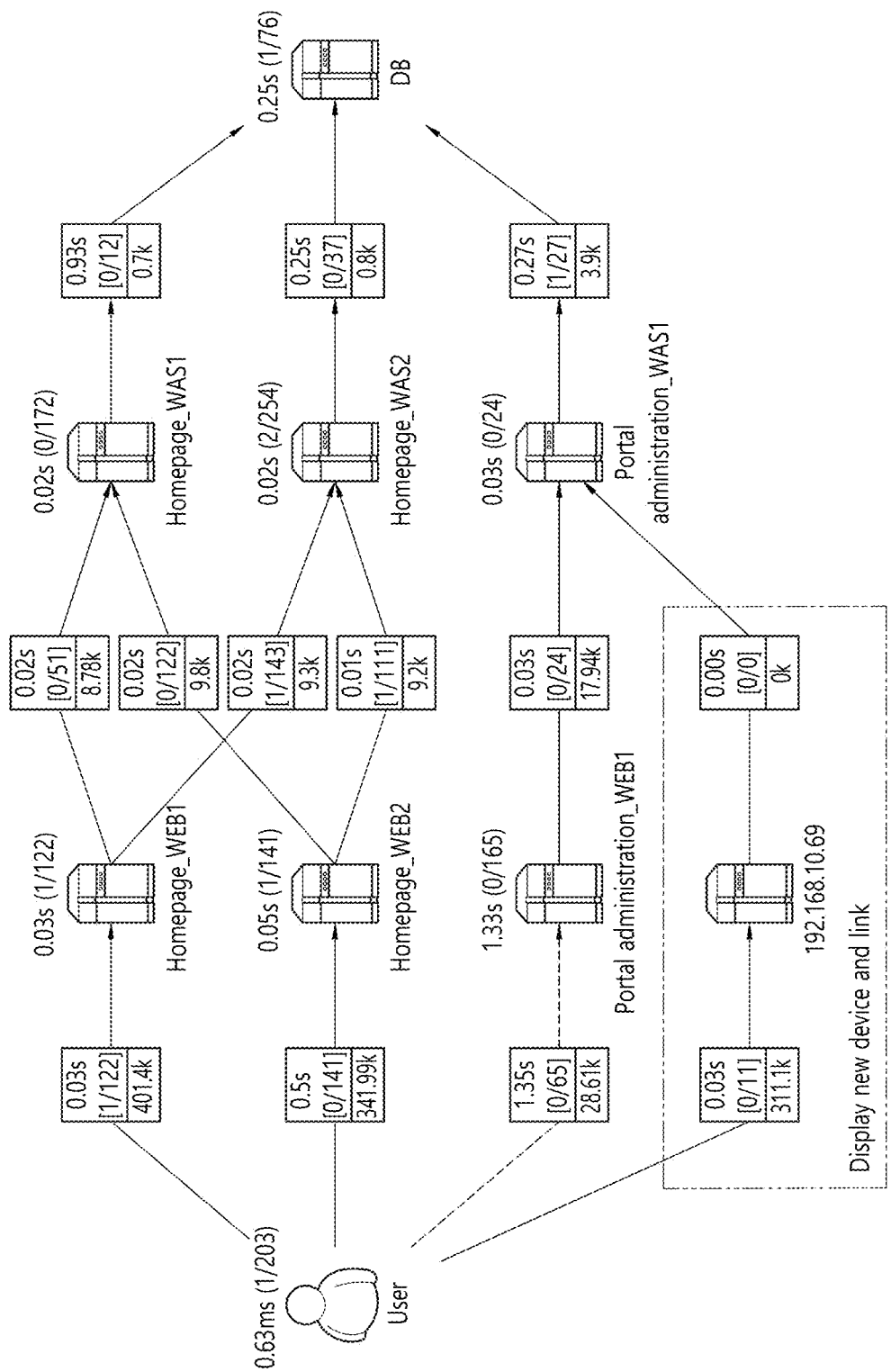
FIG. 39 is a diagram illustrating a flow map visualizing a newly generated link and device by an automatic device registration.

FIG. 39 is a diagram illustrating a flow map visualizing a newly generated link and device by an automatic device registration.

Referring to FIG. 39, when a new device is automatically registered with the method described above, a packet mirroring device may identify that a link is added in addition to the existing links. At this time, the packet mirroring device may identify a relation with other server except the client based on the packets exchanged with other servers and generate a link between server-server.

According to another embodiment of the present disclosure, a new device may include a device related to Internet of Things (IoT). For example, the new device may include various types of sensors such as a temperature sensor, a luminance sensor and an acceleration sensor and an image processing device such as a CCTV and an IP camera. Through this, various types of devices may be registered in the packet mirroring device for network management according to an embodiment of the present disclosure and utilized for security, intrusion prevention and warning owing to abnormal sign determination.

Figure 40:
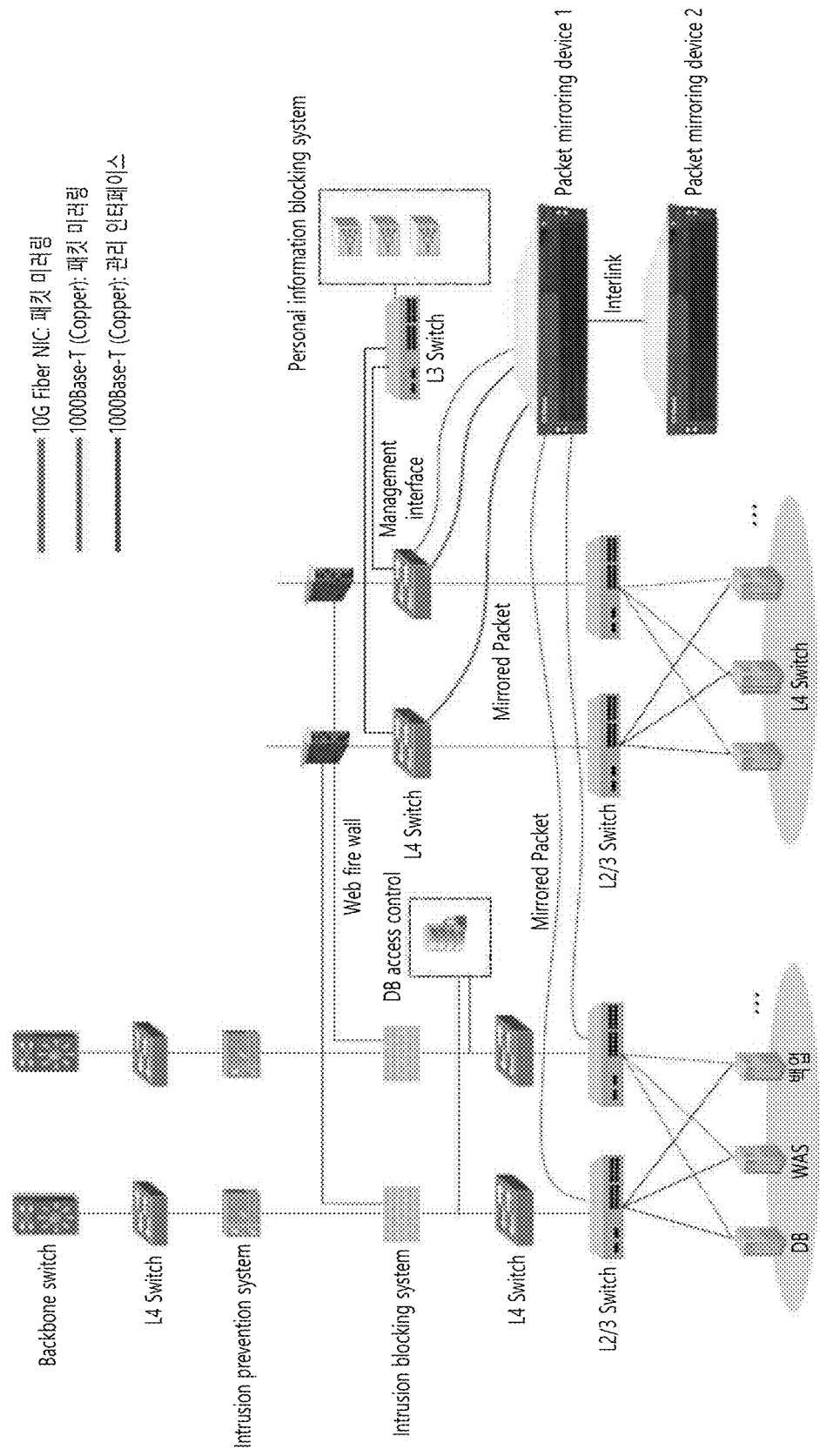
FIG. 40 is a diagram for describing a system connection relation of a plurality of packet mirroring devices according to another embodiment of the present disclosure.

FIG. 40 is a diagram for describing a system connection relation of a plurality of packet mirroring devices according to another embodiment of the present disclosure.

Referring to FIG. 40, a packet mirroring device may be connected to a L2/L3 switch and a L4 switch. The entire network system including the packet mirroring device includes a backbone switch connected to internet network, a L4 switch connected to the backbone switch, a firewall system (intrusion prevention system) and an intrusion blocking system connected to the L4 switch, a L4 switch connected to the intrusion blocking system and a L2/L3 switch connected to the L4 switch. Here, different two L4 switches may be connected as a branch in the intrusion blocking system, and the two L4 switches are connected to a L3 system. Packet mirroring device 1 collects a packet from the L2/L3 switch and the L4 switch. In this case, from the L2/L3 switch, packet mirroring is performed using 1000Base-T standard and the mirrored packet may be received. From the L4 switch, packet mirroring is performed using 10G Fiber NIC, and the mirrored packet may be received. In this case, a management interface of 1000Base-T is connected to one of the two L4 switches, and a signal associated with management for switching operation and management for packet mirroring operation may be transmitted and received.

According to the embodiment of the present disclosure, the switches connected to packet mirroring device 1 may communicate with each other in different standards. Particularly, with respect to connection media, various types of media including a copper cable and a fiber may be used in accordance with communication characteristics.

The packet mirroring device 1 may be configured to be interlinked with packet mirroring device 2. Operations may be separately configured such that the packet mirroring device 1 performs packet collection and analysis, and the packet mirroring device 2 performs performance statistics and search task. In this case, since the L2/L3 switch is complexly connected to a web server, a WAS server and a DB server, network service performance indicators for each section may be calculated for web server—WAS server section and WAS server—DB server section.

Figure 41:
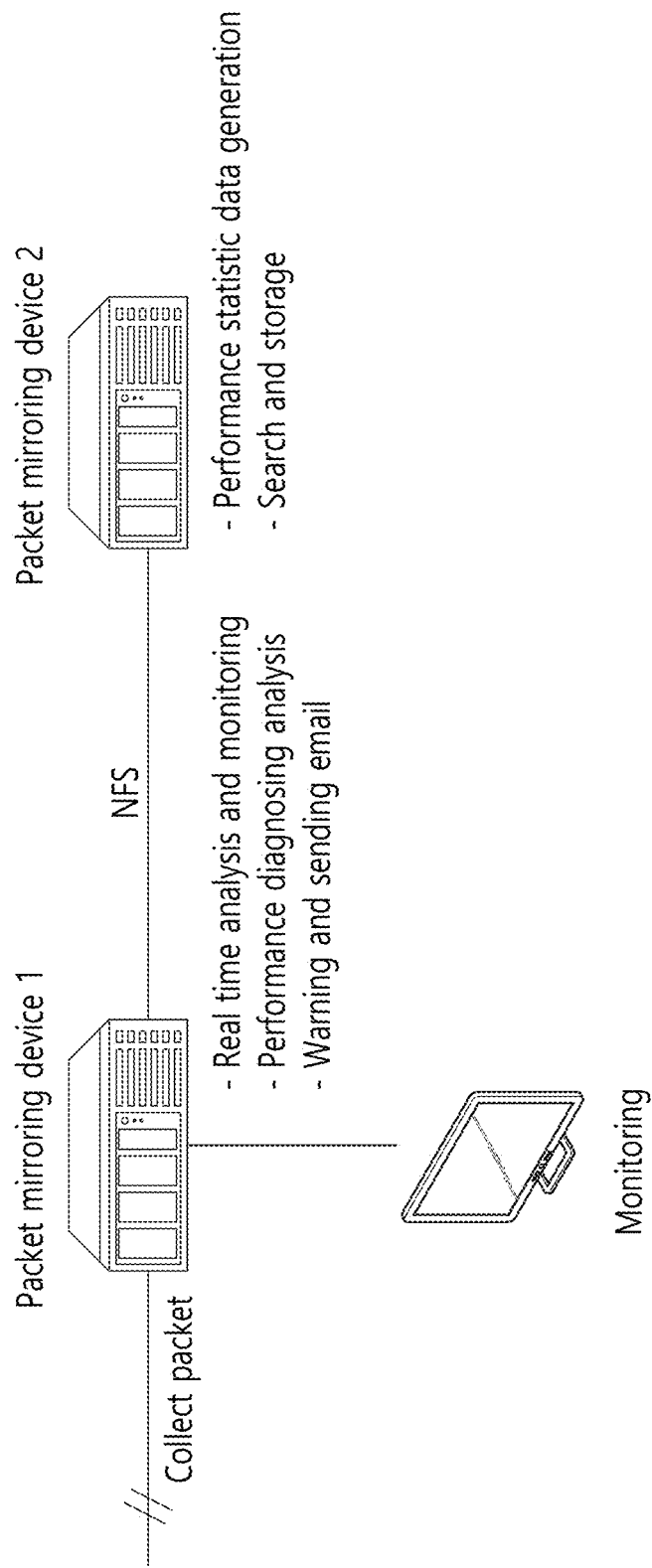
FIG. 41 is a diagram illustrating a configuration of performing different functions depending on connection relations of a plurality of packet mirroring devices according to still another embodiment of the present disclosure.

FIG. 41 is a diagram illustrating a configuration of performing different functions depending on connection relations of a plurality of packet mirroring devices according to still another embodiment of the present disclosure.

Referring to FIG. 41, the packet mirroring device 1 collects a mirrored packet with being connected to a switch. The packet mirroring device 1 collects packet information on each section such as client—web server section, web—WAS section and WAS—DB section and analyzes and monitors performance of network service for each section in real time. This may be interlinked with the packet mirroring device 2 that collects statistics associated with performance and perform analysis of it.

The packet mirroring device 2 communicates with the packet mirroring device 1 through a short range wireless communication such as Near Field Communication (NFC) or a wired communication. In addition, the packet mirroring device 2 generates statistics data periodically by using raw data in relation to packet transmitted from the packet mirroring device 1 and data associated with the analyzed performance related indicators. A specific statistic may be generated in a unit of 1 hour. Thereafter, the packet mirroring device 2 may perform functions of inquiry, search and store the statistics data.

In the drawing, only the packet mirroring device 1 is connected, but the packet mirroring device 1 and/or the packet mirroring device 2 may be connected to a display means and may display the related data to be watched by a user.

Figure 42:
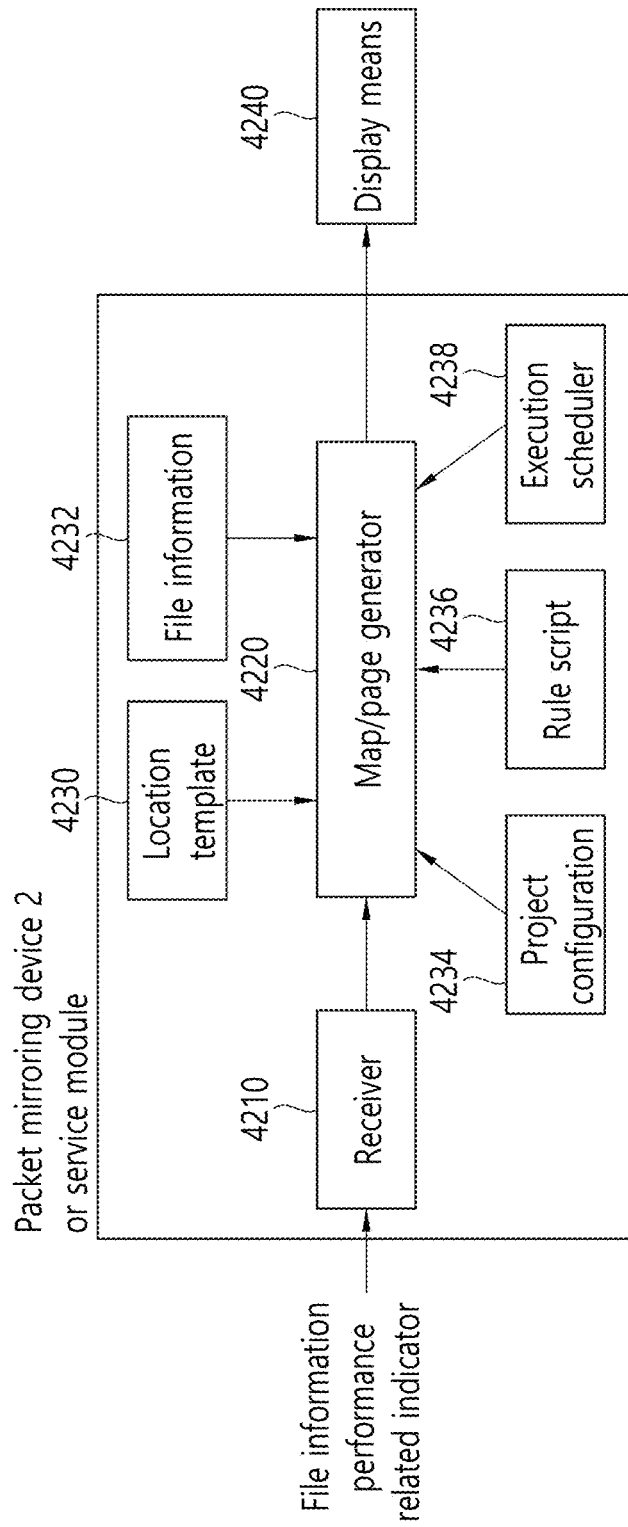
FIG. 42 is a block diagram illustrating a packet mirroring device or the service module of FIG. 5 according to an embodiment of the present disclosure.

FIG. 42 is a block diagram illustrating a packet mirroring device or the service module of FIG. 5 according to an embodiment of the present disclosure. As shown in FIG. 42, the packet mirroring device or the service module according to an embodiment of the present disclosure may include a receiver 4210 and a map/page generator 4220.

Referring to FIG. 42, the receiver 4210 may receive law data information of a packet mirrored from the packet mirroring device (not shown) or the analysis database (refer to reference numeral 522 of FIG. 5) and data associated with performance related indicators. Thereafter, the receiver 4210 provides the received data to the map/page generator 4220.

The map/page generator 4220 may integrate packet data and/or performance related indicators received based on location template information 4230, tile information 4232, project configuration information 4234, rule script 4236 and execution scheduler information 4238 and generate a flow map or an analysis page data.

The location template information 4230 may include arrangement information of various types of pages. For example, the location template information 4230 may include various types of information of an arrangement of a plurality of analysis pages (e.g., a server list, a session list, a user list, a URL list, a web page analysis page, etc.) in a single entire display canvas. In addition, the template information may include connection relation information between map/page. Associated with a hierarchical page configuration based on drill-down, it may be determined on which layer a certain analysis page is arrange (a default type may be configurable and multiple types may be configurable), and a template may be defined, which has a map/page arrangement of the determined type and a connection relation between map/page. According to another embodiment of the present disclosure, when a specific type of template desired by a manager is generated, the same map/page configuration may be easily rearranged by loading the same template later.

The tile information 4232 stores background information of a user interface. For example, the tile information 4232 stores background information used as a background of a flow map, and when the map/page generator 4220 generates map/page date, it is visualized with the stored background.

The project configuration information 4234 includes various types of configuration information of a project that generates dynamic contents in the map/page generator 4220.

The rule script 4236 defines basic arrangement information of various types of objects (e.g., a device object, a server object and/or a link object, etc.) displayed in the map/page, colors and fonts of visual expressions to be displayed in the map/page, and the like. In the configuration information of the rule script 4236, a management such as generation of a new configuration, storage and deletion of the existing configuration may be performed by a rule system.

In addition, since a period of the received data may be changeable, the map/page generator 4220 may perform map/page generation by changing a data reception period and/or a page generation period automatically/manually by a predefined schedule with the execution scheduler information 4238. The execution scheduler information 4238 may sequential include task order information from a step of extracting data required for analysis from the received data to generating map and/or analysis page.

The map and/or page data generated through the map/page generator may be output through a display means 4240 like a monitor. Alternatively, the map and/or page data may be provided to another packet mirroring device and generate another type of data by processing map and/or page data provided by the interlinked packet mirroring device. The display means 4240 may be included in the packet mirroring device or existed separately like an external monitor.

The system or device described herein may be implemented using hardware components, software components, and/or a combination thereof. For example, the system, device and constituent element described in the embodiments may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of executing instructions and responding to it. The processing device may run an operating system (OS) and one or more software applications that run on the OS. In addition, the processing device also may access, store, manipulate, process, and create data in response to execution of the software. For the convenience of understanding, the description of a processing device is used as singular; however, a person skilled in the art may be appreciated that the processing device may include multiple processing elements and/or multiple types of processing elements. For example, the processing device may include multiple processors or a processor and a controller. In addition, different processing configurations are possible, such as parallel processors.

The software may include a computer program, a code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, in a propagated signal wave capable of providing instructions or data to or being interpreted by the processing device. The software also may be distributed over network coupled computer systems so that the software is stored and executed in a distributed manner. The software and data may be stored in one or more computer readable recording mediums.

The method according to the embodiments may be implemented as program instructions form executable by various computer means and recorded in a computer-readable media. The computer-readable media may also include, alone or in combination with the program instructions, data files, data structures, and the like. The program instructions recorded in the medium may be those specially designed and constructed for the embodiments, or they may be of the kind well-known and available to those skill in the computer software arts. Examples of computer-readable media include magnetic media such as hard disks, floppy disks, and magnetic tape; optical media such as CD ROM and DVD; magneto-optical media such as floptical disks; and hardware devices that are specially configured to store and perform program instructions, such as ROM, RAM, flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While the embodiments and implementations have been described herein with a limited embodiments and drawings, other embodiments and modifications may be available for those skilled in the art from the description. For example, even in the case that the descriptions described above are performed in different order from the method described above, and/or the constituent elements such as the described system structure, device, circuit, and the like is coupled or combined in different from the method described above, or replaced by other constituent elements or equivalence or substituted, a proper result may be attained.

Accordingly, other implementations, other embodiments and equivalence to claims are pertained in the scope of claims described below.

What is claimed is:

1. A method for diagnosing network performance in an apparatus connected to a switching device provided between a first entity and a second entity, the method comprising:
    obtaining at least one mirrored packet for at least one packet transmitted between the first entity and the second entity based on mirroring from the switching device;
    calculating performance related indicators representing performance of a network service associated with the first entity and the second entity based on at least a part of information included in the at least one mirrored packet;
    storing the calculated performance related indicators; and
    determining whether a problem of the network service occurs based on at least a part of the performance related indicators,
    wherein the determining whether the network service problem occurs includes:
        comparing at least one of bits per second (BPS) information representing a transmission bit size of a data per second and connections per second (CPS) information representing a number of new sessions connected per second with at least one of a threshold value associated with the BPS information and a threshold value associated with the CPS information; and
        when at least one of the CPS information and the BPS information is greater than at least one of the threshold value associated with the CPS information and the threshold value associated with the BPS information, determining a problem of BPS excess or CPS excess to occur.

2. The method of claim 1, wherein the information element included in the at least one mirrored packet includes a source IP, a destination IP and time information.

3. The method of claim 1,
    wherein the first entity includes a client, and
    wherein the second entity includes a server.

4. The method of claim 3, wherein the calculating of the performance related indicators includes:
    extracting information on a first time T1 when a first packet arrives at the apparatus from the client, from a mirrored packet for the first packet transmitted from the client to the server;
    extracting information on a second time T2 when a first response packet arrives at the apparatus from the server, from a mirrored packet of the first response packet from the server for the first packet; and
    calculating a server round trip time (sRTT) based on the information on the first time T1 and the information on the second time T2.

5. The method of claim 4, wherein the calculating of the performance related indicators further includes:
    extracting information on a third time T3 when a second response packet arrives at the apparatus from the client, from a mirrored packet of the second response packet from the client; and
    calculating a client round trip time (cRTT) based on the information on the second time T2 and the information on the third time T3.

6. The method of claim 5, further comprising calculating at least one of:
    a request time representing a time until a request is received at the server, when the client requests a response data to the server;
    a latency representing a response latency time until the server receives a first data associated with the response data from a Uniform Resource Locator (URL) associated with the request;
    a response time representing a time for the server to transmit the response data to the client; and
    a used time representing a time after the client transmits a request for the response data to the server to a time until receiving all data associated with the response data,
    wherein the method uses at least one of the information on the first time T1, the information on the second time T2, the information on the third time T3, information on a fourth time T4 when a last data of the response data that the client requests from the server arrives at the apparatus from the server, the server round trip time (sRTT) and the client round trip time (cRTT).

7. The method of claim 6, wherein the calculating of the performance related indicators further includes:
    calculating a page loading time for a predetermined web page based on a client time consumed by the client, a network time consumed by the network and a server time consumed by the server.

8. The method of claim 7,
    wherein the network time includes the sRTT, the cRTT, the request time and the response time, and
    wherein the server time includes the latency.

9. The method of claim 3, wherein the performance related indicators include a wait information representing a session number in a state of fail to receive a response for the request sent by the client.

10. The method of claim 3, wherein the performance related indicators include at least one of:
    User Per Second (UPS) information representing a number of clients connected per second;
    Connection Per Second (CPS) information representing a number of new sessions connected per second; and
    Transaction Per Second (TPS) information representing a number of transactions that occur per second.

11. The method of claim 1, wherein the determining whether the network service problem occurs includes:
comparing at least one of latency information that represents a response latency time until the server receives a first data associated with the response data from a Uniform Resource Locator (URL) associated with a request for the response data of the client for the server and wait information that represents a session number of a state of fail to receive a response for the request sent by the client with at least one of a threshold value associated with the response waiting time and a threshold value associated with the response waiting session number; and
when at least one of the latency information and the wait information is greater than at least one of the threshold value associated with the response waiting time and the threshold value associated with the response waiting session number, determining a problem of traffic latency or traffic excess to occur.

12. The method of claim 1, wherein the determining whether the network service problem occurs includes:
comparing at least one of amount of occurrence of 40× error per predetermined time and amount of occurrence of 50× error per predetermined time with at least one of threshold value associated with the 40× error and a threshold value associated with the 50× error; and
when at least one of amount of occurrence of 40× error per predetermined time and the amount of occurrence of 50× error per predetermined time is greater than at least one of the threshold value associated with the 40× error and the threshold value associated with the 50× error, determining 40× or 50× error to occur.

13. The method for diagnosing a network performance of claim 1, further comprising:
notifying, by using at least one of text message, email and Social Network Service (SNS), a preregistered user of a first account for managing the network, when a problem occurrence of the network service is detected based on at least one of the performance related indicators.

14. The method for diagnosing a network performance of claim 1, wherein the first entity is a first server, and the second entity is a second server.

15. The method of claim 1, wherein at least one of the first server and the second server includes at least one of a web server, a Web Application Server (WAS) server and a database (DB) server.

16. The method of claim 1, wherein when a packet mirrored for a packet associated with the first entity, the second entity and a third entity which are connected in series is obtained, a performance related indicator for each of a section between the first entity and the second entity and a section between the second entity and the third entity is calculated independently.

17. The method of claim 16, further comprising:
generating a flow map by objectifying the first entity, the second entity and the third entity on a visualization space based on the performance related indicator for each section.

18. The method of claim 1, wherein the performance related indicators are calculated and stored in real time by monitoring packets which are transmitted between the first entity and the second entity in real time.

19. An apparatus for diagnosing network performance connected to a switching device provided between a first entity and a second entity, the apparatus comprising:
a port for obtaining at least one mirrored packet for at least one packet transmitted between the first entity and the second entity based on mirroring from the switching device;
a packet analysis module for calculating performance related indicators representing performance of a network service associated with the first entity and the second entity based on at least a part of information included in the at least one mirrored packet and determining whether a problem of the network service occurs based on at least a part of the performance related indicators; and
a storage for storing the calculated performance related indicators,
wherein the packet analysis module is configured to
compare at least one of bits per second (BPS) information representing a transmission bit size of a data per second and connections per second (CPS) information representing a number of new sessions connected per second with at least one of a threshold value associated with the BPS information and a threshold value associated with the CPS information, and
when at least one of the CPS information and the BPS information is greater than at least one of the threshold value associated with the CPS information and the threshold value associated with the BPS information, determine a problem of BPS excess or CPS excess to occur.

20. A system for diagnosing network performance, the system comprising:
a switching device provided between a first entity and a second entity; and
an apparatus for diagnosing network performance for obtaining at least one mirrored packet for at least one packet transmitted between the first entity and the second entity based on mirroring from the switching device, calculating performance related indicators representing performance of a network service associated with the first entity and the second entity based on at least a part of information included in the at least one mirrored packet, determining whether a problem of the network service occurs based on at least a part of the performance related indicators, and storing the calculated performance related indicators,
wherein the apparatus for diagnosing network performance is configured to
compare at least one of bits per second (BPS) information representing a transmission bit size of a data per second and connections per second (CPS) information representing a number of new sessions connected per second with at least one of a threshold value associated with the BPS information and a threshold value associated with the CPS information, and
when at least one of the CPS information and the BPS information is greater than at least one of the threshold value associated with the CPS information and the threshold value associated with the BPS information, determine a problem of BPS excess or CPS excess to occur.

* * * * *